US011379113B2

(12) United States Patent
Winer et al.

(10) Patent No.: US 11,379,113 B2
(45) Date of Patent: Jul. 5, 2022

(54) TECHNIQUES FOR SELECTING TEXT

(71) Applicant: Apple Inc., Cupertino, CA (US)

(72) Inventors: Morgan Winer, Sunnyvale, CA (US); Patrick L. Coffman, San Francisco, CA (US); Dylan Ross Edwards, San Jose, CA (US); Stephen O. Lemay, Palo Alto, CA (US); Toby Paterson, San Francisco, CA (US); Marcos Alonso, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/786,718

(22) Filed: Feb. 10, 2020

(65) Prior Publication Data

US 2020/0379637 A1 Dec. 3, 2020

Related U.S. Application Data

(60) Provisional application No. 62/856,021, filed on Jun. 1, 2019.

(51) Int. Cl.
*G06F 3/0482* (2013.01)
*G06F 3/04883* (2022.01)
*G06F 3/0486* (2013.01)

(52) U.S. Cl.
CPC ........ *G06F 3/04883* (2013.01); *G06F 3/0482* (2013.01); *G06F 3/0486* (2013.01)

(58) Field of Classification Search
CPC .. G06F 3/04883; G06F 3/0482; G06F 3/0486; G06F 40/166; G06F 3/04842; G06F 3/0485
See application file for complete search history.

(56) References Cited

U.S. PATENT DOCUMENTS 5,471,578 A 11/1995 Moran et al.
5,495,566 A 2/1996 Kwatinetz
(Continued)

FOREIGN PATENT DOCUMENTS

CN 1129889 A 8/1996
CN 1293807 A 5/2001
(Continued)

OTHER PUBLICATIONS

Notice of Allowance received for U.S. Appl. No. 15/851,320, dated Apr. 22, 2020, 20 pages.
(Continued)

*Primary Examiner* — Jennifer N Welch
*Assistant Examiner* — Amy P Hoang
(74) *Attorney, Agent, or Firm* — Dentons US LLP

(57) ABSTRACT

The present disclosure generally relates to selecting text. An example method includes displaying, a focus indicator at a first location; while displaying the focus indicator, detecting a gesture at a first touch location that corresponds to the focus indicator; while detecting the gesture, detecting movement of the gesture to a second touch location; in response to detecting movement of the gesture to the second touch location: in accordance with a determination that the second touch location is in a first direction, moving the focus indicator to a second indicator location; in accordance with a determination that the second touch location is in a second direction, moving the focus indicator to a third location; while the focus indicator is at a fourth location, detecting liftoff of the gesture; and in response to detecting the liftoff, maintaining display of the focus indicator at the fourth location.

24 Claims, 42 Drawing Sheets

(56) References Cited

U.S. PATENT DOCUMENTS

| | | |
|---|---|---|
| 5,511,148 A | 4/1996 | Wellner |
| 5,651,107 A | 7/1997 | Frank et al. |
| 5,721,939 A | 2/1998 | Kaplan |
| 5,732,227 A | 3/1998 | Kuzunuki et al. |
| 5,760,773 A | 6/1998 | Berman et al. |
| 5,815,142 A | 9/1998 | Allard et al. |
| 5,825,352 A | 10/1998 | Bisset et al. |
| 5,880,743 A | 3/1999 | Moran et al. |
| 5,910,801 A | 6/1999 | Rosenburg et al. |
| 5,967,996 A | 10/1999 | Kadota et al. |
| 6,121,960 A | 9/2000 | Carroll et al. |
| 6,323,846 B1 | 11/2001 | Westerman et al. |
| 6,433,801 B1 | 8/2002 | Moon et al. |
| 6,525,749 B1 | 2/2003 | Moran et al. |
| 6,888,536 B2 | 5/2005 | Westerman et al. |
| 6,891,551 B2 | 5/2005 | Keely et al. |
| 6,938,222 B2 | 8/2005 | Hullender et al. |
| 7,030,861 B1 | 4/2006 | Westerman et al. |
| 7,047,503 B1 | 5/2006 | Parrish et al. |
| 7,305,630 B2 | 12/2007 | Hullender et al. |
| 7,453,439 B1 | 11/2008 | Kushler et al. |
| 7,536,656 B2 | 5/2009 | Hullender et al. |
| 7,665,028 B2 | 2/2010 | Cummins et al. |
| 7,705,830 B2 | 4/2010 | Westerman et al. |
| 7,743,348 B2 | 6/2010 | Robbins et al. |
| 7,818,691 B2 | 10/2010 | Irvine |
| 7,900,145 B2 | 3/2011 | Blinnikka |
| 8,077,153 B2 | 12/2011 | Benko et al. |
| 8,201,109 B2 | 6/2012 | Van Os et al. |
| 8,255,830 B2 | 8/2012 | Ording et al. |
| 8,510,665 B2 | 8/2013 | Ording et al. |
| 8,584,050 B2 | 11/2013 | Ording et al. |
| 8,650,507 B2 | 2/2014 | Westerman et al. |
| 8,661,362 B2 | 2/2014 | Kocienda et al. |
| 8,756,534 B2 | 6/2014 | Ording et al. |
| 8,773,358 B2 | 7/2014 | Rubanovich et al. |
| 2002/0036623 A1 | 3/2002 | Kano et al. |
| 2002/0097270 A1 | 7/2002 | Keely et al. |
| 2002/0111990 A1 | 8/2002 | Wood et al. |
| 2002/0175955 A1 | 11/2002 | Gourdol et al. |
| 2003/0014382 A1 | 1/2003 | Iwamoto et al. |
| 2003/0154207 A1 | 8/2003 | Naito |
| 2004/0135818 A1* | 7/2004 | Thomson ............ G06F 3/04886 715/823 |
| 2004/0174399 A1 | 9/2004 | Wu et al. |
| 2005/0005241 A1 | 1/2005 | Hunleth et al. |
| 2005/0052427 A1 | 3/2005 | Wu et al. |
| 2005/0076300 A1 | 4/2005 | Martinez |
| 2005/0111736 A1 | 5/2005 | Hullender et al. |
| 2005/0190059 A1 | 9/2005 | Wehrenberg |
| 2005/0192924 A1 | 9/2005 | Drucker et al. |
| 2005/0229117 A1 | 10/2005 | Hullender et al. |
| 2006/0005151 A1 | 1/2006 | Altman |
| 2006/0017692 A1 | 1/2006 | Wehrenberg et al. |
| 2006/0022955 A1 | 2/2006 | Kennedy |
| 2006/0026521 A1 | 2/2006 | Hotelling et al. |
| 2006/0101354 A1 | 5/2006 | Hashimoto et al. |
| 2006/0125803 A1 | 6/2006 | Westerman et al. |
| 2006/0132456 A1 | 6/2006 | Anson |
| 2007/0033544 A1 | 2/2007 | Fleisher et al. |
| 2007/0055945 A1 | 3/2007 | Weber et al. |
| 2007/0073652 A1 | 3/2007 | Taboada et al. |
| 2007/0109281 A1 | 5/2007 | Simmons et al. |
| 2007/0157085 A1 | 7/2007 | Peters |
| 2007/0234235 A1 | 10/2007 | Scott |
| 2007/0238489 A1 | 10/2007 | Scott |
| 2007/0260981 A1 | 11/2007 | Kim et al. |
| 2008/0002888 A1 | 1/2008 | Yuan |
| 2008/0036743 A1 | 2/2008 | Westerman et al. |
| 2008/0082317 A1 | 4/2008 | Rosart et al. |
| 2008/0098331 A1 | 4/2008 | Novick et al. |
| 2008/0126387 A1 | 5/2008 | Blinnikka |
| 2008/0165142 A1 | 7/2008 | Kocienda et al. |
| 2008/0168349 A1 | 7/2008 | Lamiraux et al. |
| 2008/0259040 A1 | 10/2008 | Ording et al. |
| 2009/0109182 A1 | 4/2009 | Fyke et al. |
| 2009/0228792 A1 | 9/2009 | Van Os et al. |
| 2009/0292989 A1 | 11/2009 | Matthews et al. |
| 2010/0011310 A1 | 1/2010 | Rainisto et al. |
| 2010/0156813 A1 | 6/2010 | Duarte et al. |
| 2010/0235726 A1 | 9/2010 | Ording et al. |
| 2010/0235734 A1 | 9/2010 | Ording et al. |
| 2010/0235778 A1 | 9/2010 | Kocienda et al. |
| 2010/0235784 A1 | 9/2010 | Ording et al. |
| 2010/0235793 A1 | 9/2010 | Ording et al. |
| 2011/0258537 A1 | 10/2011 | Rives et al. |
| 2012/0185787 A1 | 7/2012 | Lisse et al. |
| 2012/0254795 A1 | 10/2012 | Van Os et al. |
| 2013/0002719 A1 | 1/2013 | Ide |
| 2013/0285928 A1* | 10/2013 | Thorsander ........... G06F 3/0488 345/173 |
| 2014/0173484 A1* | 6/2014 | Hicks .................... G06F 3/0482 715/769 |
| 2015/0186351 A1* | 7/2015 | Hicks .................. G06F 3/04842 715/232 |
| 2016/0274686 A1* | 9/2016 | Alonso Ruiz ....... G06F 3/04883 |
| 2018/0181276 A1 | 6/2018 | Kocienda et al. |
| 2018/0210639 A1* | 7/2018 | Adams ................ G06F 3/04883 |
| 2021/0117063 A1 | 4/2021 | Kocienda et al. |

FOREIGN PATENT DOCUMENTS

| | | |
|---|---|---|
| CN | 1328280 A | 12/2001 |
| CN | 101068411 A | 11/2007 |
| CN | 109426410 A | 3/2019 |
| DE | 10127356 A1 | 12/2001 |
| EP | 0917038 A2 | 5/1999 |
| EP | 1067507 A1 | 1/2001 |
| EP | 1025489 B1 | 6/2004 |
| EP | 1850217 A2 | 10/2007 |
| EP | 1855185 A2 | 11/2007 |
| EP | 3336712 A1 | 6/2018 |
| JP | 4-47358 A | 2/1992 |
| JP | 5-189149 A | 7/1993 |
| JP | 6-282400 A | 10/1994 |
| JP | 2000-200277 A | 7/2000 |
| JP | 2001-350587 A | 12/2001 |
| JP | 2002-508543 A | 3/2002 |
| JP | 2002-171328 A | 6/2002 |
| JP | 2003-241879 A | 8/2003 |
| JP | 2005-257819 A | 9/2005 |
| JP | 2007-072233 A | 3/2007 |
| JP | 2008-243221 A | 10/2008 |
| KR | 10-2006-0118811 A | 11/2006 |
| KR | 10-0754731 B1 | 9/2007 |
| KR | 10-2007-0107462 A | 11/2007 |
| KR | 10-2010-0039253 A | 4/2010 |
| WO | 1999/49383 A1 | 9/1999 |
| WO | 2004/031933 A1 | 4/2004 |
| WO | 2007/037806 A1 | 4/2007 |
| WO | 2008/013658 A2 | 1/2008 |
| WO | 2008/030879 A2 | 3/2008 |

OTHER PUBLICATIONS

Office Action received for European Patent Application No. 19202840. 5, dated Dec. 8, 2020, 6 pages.

Apple iPhone Apps, "First Look—MagicPad", Available online at: https://vimeo.com/1424256, Jul. 28, 2008, 5 pages.

Corrected Notice of Allowance received for U.S. Appl. No. 12/565,754, dated Nov. 14, 2017, 2 pages.

Corrected Notice of Allowance received for U.S. Appl. No. 12/565,755, dated Nov. 15, 2017, 2 pages.

Decision on Request for Rehearing received for U.S. Appl. No. 12/565,757, dated Feb. 21, 2018, 10 pages.

Decision to Grant received for European Patent Application No. 11192108.6, dated May 27, 2016, 2 pages.

Decision to Grant received for European Patent Application No. 12154861.4, dated Jun. 14, 2019, 2 pages.

Decision to Refuse received for European Patent Application No. 09154312.4, dated Dec. 6, 2016, 13 pages.

(56) References Cited

OTHER PUBLICATIONS

Decision to Refuse received for European Patent Application No. 10712823.3, dated Aug. 13, 2019, 30 pages.
Extended European Search Report (includes Partial European Search Report and European Search Opinion) received for European Patent Application No. 09154312.4, dated Aug. 20, 2009, 10 pages.
Extended European Search Report (includes Partial European Search Report and European Search Opinion) received for European Patent Application No. 12154861.4, dated Jun. 2, 2015, 10 pages.
Extended European Search Report received for European Patent Application No. 11192108.6, dated May 9, 2012, 6 pages.
Extended European Search Report received for European Patent Application No. 16170727.8, dated Sep. 7, 2016, 14 pages.
Final Office Action received for U.S. Appl. No. 12/565,754, dated May 22, 2014, 9 pages.
Final Office Action received for U.S. Appl. No. 12/042,313, dated Apr. 18, 2013, 8 pages.
Final Office Action received for U.S. Appl. No. 12/042,313, dated Aug. 31, 2011, 10 pages.
Final Office Action received for U.S. Appl. No. 12/242,852, dated Sep. 21, 2011, 6 pages.
Final Office Action received for U.S. Appl. No. 12/565,750 dated Mar. 26, 2012, 12 pages.
Final Office Action received for U.S. Appl. No. 12/565,751 dated Jun. 22, 2012, 18 pages.
Final Office Action received for U.S. Appl. No. 12/565,753 dated Aug. 15, 2012, 11 pages.
Final Office Action received for U.S. Appl. No. 12/565,754, dated Dec. 20, 2012, 19 pages.
Final Office Action received for U.S. Appl. No. 12/565,755 dated Jan. 3, 2013, 13 pages.
Final Office Action received for U.S. Appl. No. 12/565,757 dated Aug. 15, 2012, 10 pages.
Final Office Action received for U.S. Appl. No. 12/565,757 dated Jun. 7, 2018, 17 pages.
Final Office Action received for U.S. Appl. No. 12/565,757, dated Apr. 18, 2014, 11 pages.
Final Office Action received for U.S. Appl. No. 12/565,757, dated Mar. 26, 2015, 12 pages.
Final Office Action received for U.S. Appl. No. 13/493,955, dated Aug. 20, 2015, 27 pages.
Holman et al., "PaperWindows: Interaction Techniques for Digital Paper", Papers: Physical Interaction, CHI-2005, Apr. 2-7, 2005, pp. 591 to 599.
Intention to Grant received for European Patent Application No. 11192108.6, dated Jan. 5, 2016, 6 pages.
Intention to Grant received for European Patent Application No. 12154861.4, dated Jan. 29, 2019, 8 pages.
International Preliminary Report on Patentability received for PCT Patent Application No. PCT/US2008/086542, dated Sep. 7, 2010, 9 pages.
International Preliminary Report on Patentability received for PCT Patent Application No. PCT/US2009/035177, dated Sep. 7, 2010, 11 pages.
International Preliminary Report on Patentability received for PCT Patent Application No. PCT/US2010/026947, dated Sep. 29, 2011, 11 pages.
International Search Report and Written Opinion received for PCT Patent Application No. PCT/US2008/086542, dated Nov. 12, 2009, 11 pages.
International Search Report and Written Opinion received for PCT Patent Application No. PCT/US2009/035177, dated Sep. 10, 2009, 16 pages.
International Search Report and Written Opinion received for PCT Patent Application No. PCT/US2010/026947, dated Jun. 22, 2011, 15 pages.
Kottke et al., "New iPhone Features", available at <http://web.archive.org/web/20070705203857/http://www.kottke.org/07/07/new-iphone-features>, Jul. 1, 2007, 19 pages.

Lonelysandwich, "iPhone Copy and Paste", Available at http://www.vimeo.com/266383, Aug. 8, 2007, 6 pages.
Naver blog, "Useful shortcuts to know in MS word", Available online at: https://blog.naver.com/fleeguy/90000103488, Dec. 7, 2005, 2 pages (Official Copy Only) (See Communication under 37 CFR § 1.98(a) (3)).
Nikkei PC 21, "Feature 2, Troublesome Work One Shot Execution! Ready-to-Use One Line Text Macro: Re-Use a Text of Web Site", NIKKEI Business Publication, Inc., vol. 13, No. 3, Feb. 1, 2008, pp. 66-67 (Official Copy Only) (See Communication under 37 CFR § 1.98(a) (3)).
Non-Final Office Action received for U.S. Appl. No. 12/042,313 dated Sep. 27, 2012, 11 pages.
Non-Final Office Action received for U.S. Appl. No. 12/565,754, dated Dec. 27, 2013, 21 pages.
Non-Final Office Action received for U.S. Appl. No. 12/042,313, dated Dec. 7, 2010, 10 pages.
Non-Final Office Action received for U.S. Appl. No. 12/242,852, dated Mar. 18, 2011, 13 pages.
Non-Final Office Action received for U.S. Appl. No. 12/565,750, dated Sep. 26, 2011, 11 pages.
Non-Final Office Action received for U.S. Appl. No. 12/565,751 dated Mar. 1, 2012, 18 pages.
Non-Final Office Action received for U.S. Appl. No. 12/565,752 dated Jan. 27, 2012, 15 pages.
Non-Final Office Action received for U.S. Appl. No. 12/565,753 dated Mar. 13, 2012, 13 pages.
Non-Final Office Action received for U.S. Appl. No. 12/565,753, dated Aug. 5, 2013, 7 pages.
Non-Final Office Action received for U.S. Appl. No. 12/565,754 dated Jun. 12, 2012, 23 pages.
Non-Final Office Action received for U.S. Appl. No. 12/565,755 dated Jul. 26, 2012, 13 pages.
Non-Final Office Action received for U.S. Appl. No. 12/565,756 dated Feb. 2, 2012, 13 pages.
Non-Final Office Action received for U.S. Appl. No. 12/565,757 dated Mar. 2, 2012, 13 pages.
Non-Final Office Action received for U.S. Appl. No. 12/565,757, dated Dec. 20, 2013, 9 pages.
Non-Final Office Action received for U.S. Appl. No. 12/565,757, dated Sep. 3, 2014, 9 pages.
Non-Final Office Action received for U.S. Appl. No. 12/565,759 dated Aug. 2, 2012, 10 pages.
Non-Final Office Action received for U.S. Appl. No. 12/565,760 dated Jan. 27, 2012, 21 pages.
Non-Final Office Action received for U.S. Appl. No. 13/493,955, dated Oct. 24, 2014, 28 pages.
Non-Final Office Action received for U.S. Appl. No. 13/493,955, dated Jan. 11, 2016, 18 pages.
Notice of Allowance received for Canadian Patent Application No. 2,755,796, dated Oct. 14, 2015, 1 page.
Notice of Allowance received for Canadian Patent Application No. 2,927,608, dated Jan. 22, 2019, 1 page.
Notice of Allowance received for Chinese Patent Application No. 201210295979.0, dated Jun. 14, 2016, 3 pages (2 pages of English Translation and 1 page of Official Copy).
Notice of Allowance received for Japanese Patent Application No. 2014-000636, dated Feb. 13, 2015, 6 pages (3 pages English Translation and 3 pages of Official Copy).
Notice of Allowance received for Japanese Patent Application No. 2015-051254, dated Oct. 7, 2016, 3 pages (Official Copy Only) (See Communication under 37 CFR § 1.98(a) (3)).
Notice of Allowance received for Japanese Patent Application No. 2016-217409, dated Apr. 13, 2018, 4 pages (1 page of English Translation and 3 pages of Official Copy).
Notice of Allowance received for Korean Patent Application No. 10-2013-7028483, dated Aug. 19, 2014, 3 pages (Official Copy Only) (See Communication under 37 CFR § 1.98(a) (3)).
Notice of Allowance received for Korean Patent Application No. 10-2013-7034234, dated Feb. 9, 2017, 5 pages (2 pages of English Translation and 3 pages of Official Copy).

(56) References Cited

OTHER PUBLICATIONS

Notice of Allowance received for Korean Patent Application No. 10-2017-7011291, dated Jun. 1, 2018, 4 pages (1 page of English Translation and 3 pages of Official Copy).
Notice of Allowance received for Korean Patent Application No. 10-2018-7025545, dated Aug. 20, 2019, 5 pages (2 pages of English Translation and 3 pages of Official Copy).
Notice of Allowance received for U.S. Appl. No. 12/565,753, dated Jan. 31, 2014, 8 pages.
Notice of Allowance received for U.S. Appl. No. 12/042,313, dated Oct. 2, 2013, 8 pages.
Notice of Allowance received for U.S. Appl. No. 12/242,852 dated Apr. 27, 2012, 8 pages.
Notice of Allowance received for U.S. Appl. No. 12/242,852 dated Jan. 9, 2012, 4 pages.
Notice of Allowance received for U.S. Appl. No. 12/565,750 dated Jul. 3, 2012, 15 pages.
Notice of Allowance received for U.S. Appl. No. 12/565,750, dated Apr. 4, 2011, 5 pages.
Notice of Allowance received for U.S. Appl. No. 12/565,750, dated Jan. 27, 2011, 7 pages.
Notice of Allowance received for U.S. Appl. No. 12/565,752 dated Jun. 5, 2012, 7 pages.
Notice of Allowance received for U.S. Appl. No. 12/565,752, dated Jul. 11, 2013, 10 pages.
Notice of Allowance received for U.S. Appl. No. 12/565,754, dated Aug. 11, 2017, 5 pages.
Notice of Allowance received for U.S. Appl. No. 12/565,755, dated Sep. 12, 2017, 6 pages.
Notice of Allowance received for U.S. Appl. No. 12/565,756 dated May 31, 2012, 5 pages.
Notice of Allowance received for U.S. Appl. No. 12/565,756, dated Oct. 15, 2013, 7 pages.
Notice of Allowance received for U.S. Appl. No. 12/565,759, dated Apr. 8, 2013, 9 pages.
Notice of Allowance received for U.S. Appl. No. 12/565,760 dated Jun. 11, 2012, 11 pages.
Notice of Allowance received for U.S. Appl. No. 12/565,760 dated Oct. 2, 2012, 9 pages.
Notice of Allowance Received for U.S. Appl. No. 13/493,955, dated Nov. 8, 2016, 8 pages.
Office Action received for Canadian Patent Application No. 2,755,796, dated Oct. 22, 2014, 4 pages.
Office Action received for Canadian Patent Application No. 2,927,608, dated Feb. 22, 2018, 5 pages.
Office Action received for Canadian Patent Application No. 2,927,608, dated Mar. 9, 2017, 5 pages.
Office Action received for Chinese Patent Application No. 201210295979.0, dated Mar. 23, 2015, 13 pages (6 pages of English Translation and 7 pages of Official Copy).
Office Action received for Chinese Patent Application No. 201210295979.0, dated May 5, 2014, 12 pages (6 pages of English Translation and 6 pages of Official Copy).
Office Action received for Chinese Patent Application No. 201210295979.0, dated Nov. 30, 2015, 9 pages (4 pages English Translation and 5 pages Official copy).
Office Action received for European Application No. 09154312.4, dated Feb. 5, 2010, 1 page.
Office Action received for European Patent Application No. 09154312.4, dated Oct. 8, 2013, 4 pages.
Office Action received for European Patent Application No. 10712823.3, dated Nov. 20, 2012, 6 pages.
Office Action received for European Patent Application No. 10712823.3, dated Oct. 28, 2015, 6 pages.
Office Action received for European Patent Application No. 12154861.4, dated Aug. 28, 2018, 8 pages.
Office Action received for European Patent Application No. 16170727.8, dated May 16, 2019, 6 pages.

Office Action received for Japanese Patent Application No. 2015-051254, dated Mar. 18, 2016, 12 pages (6 pages of English Translation and 6 pages of Official Copy).
Office Action received for Japanese Patent Application No. 2016-217409, dated Sep. 19, 2017, 6 pages (3 pages of English Translation and 3 pages of Official Copy).
Office Action received for Korean Patent Application No. 10-2013-7034234, dated Dec. 10, 2015, 7 pages (3 pages English Translation and 4 pages Official Copy).
Office Action received for Korean Patent Application No. 10-2013-7034234, dated Oct. 26, 2016, 8 pages (4 pages of English Translation and 4 pages of Official Copy).
Office Action received for Korean Patent Application No. 10-2017-7011291, dated Feb. 20, 2018, 8 pages (3 pages of English Translation and 5 pages of Official Copy).
Office Action received for Korean Patent Application No. 10-2017-7011291, dated Jul. 14, 2017,10 pages (4 pages of English Translation and 6 pages of Official Copy).
Office Action received for Korean Patent Application No. 10-2018-7025545, dated Jul. 11, 2019, 6 pages (3 pages of English Translation and 3 pages of Official Copy).
Office Action received for Korean Patent Application No. 10-2018-7025545, dated Sep. 28, 2018, 10 pages (4 pages of English Translation and 6 pages of Official Copy).
Office Action received for Korean Patent Application No. 10-2019-7034003, dated Jan. 17, 2020, 10 pages (4 pages of English Translation and 6 pages of Official Copy).
Partial European Search Report received for European Patent Application No. 09154312.4 dated Jun. 3, 2009, 4 pages.
Ritchie, Rene, "App Review + Q&A: MagicPad Brings Rich Text and Cut and Paste to the iPhone", Online available at http://www.imore.com/app-review-qa-magicpad-brings-rich-text-and-cut-and-paste-to-the-iphone, Aug. 5, 2008, 6 pages.
Shen et al., "Informing the Design of Direct-Touch Tabletops", IEEE Computer Graphics and Applications, Sep./Oct. 2006, pp. 36-46.
Summons to Attend Oral Proceedings received for European Patent Application No. 09154312.4, mailed on Apr. 13, 2016, 5 pages.
Summons to Attend Oral Proceedings received for European Patent Application No. 10712823.3, mailed on Dec. 4, 2018, 6 pages.
Summons to Attend Oral Proceedings received for European Patent Application No. 10712823.3, mailed on Jun. 7, 2019, 11 pages.
Summons to Attend Oral Proceedings received for European Patent Application No. 10712823.3, mailed on May 14, 2019, 5 pages.
Corrected Notice of Allowance received for U.S. Appl. No. 15/851,320, dated May 21, 2020, 2 pages.
Extended European Search Report Received for European Patent Application No. 19202840.5, dated Mar. 30, 2020, 8 pages.
Notice of Allowance received for Canadian Patent Application No. 3,050,448, dated Nov. 4, 2020, 1 page.
International Search Report and Written Opinion received for PCT Patent Application No. PCT/US2020/035546, dated Oct. 15, 2020, 24 pages.
Notice of Allowance received for Korean Patent Application No. 10-2019-7034003, dated Nov. 10, 2020, 6 pages (1 pages of English Translation and 5 pages of Official Copy).
Invitation to Pay Additional Fees received for PCT Patent Application No. PCT/US2020/035546, dated Aug. 24, 2020, 16 pages.
Office Action received for Korean Patent Application No. 10-2019-7034003, dated Sep. 17, 2020, 9 pages (4 pages of English Translation and 5 pages of Official Copy).
Summons to Attend Oral Proceedings received for European Patent Application No. 16170727.8, dated Feb. 12, 2021, 10 pages.
Brief Communication Regarding Oral Proceedings received for European Patent Application No. 16170727.8, dated Sep. 14, 2021, 1 page.
Decision to Refuse received for European Patent Application No. 16170727.8, dated Oct. 7, 2021, 12 pages.
Minutes of the Oral Proceedings received for European Patent Application No. 16170727.8, dated Sep. 23, 2021, 6 pages.
Office Action received for Korean Patent Application No. 10-2021-7004239, dated Apr. 16, 2021, 9 pages (4 pages of English Translation and 5 pages of Official Copy).

(56) References Cited

OTHER PUBLICATIONS

Siracusa John, "Mac OS X 10.4 Tiger: Spotlight", Apr. 29, 2005, 16 pages.
International Preliminary Report on Patentability received for PCT Patent Application No. PCT/US2020/035546, dated Dec. 16, 2021, 17 pages.

* cited by examiner

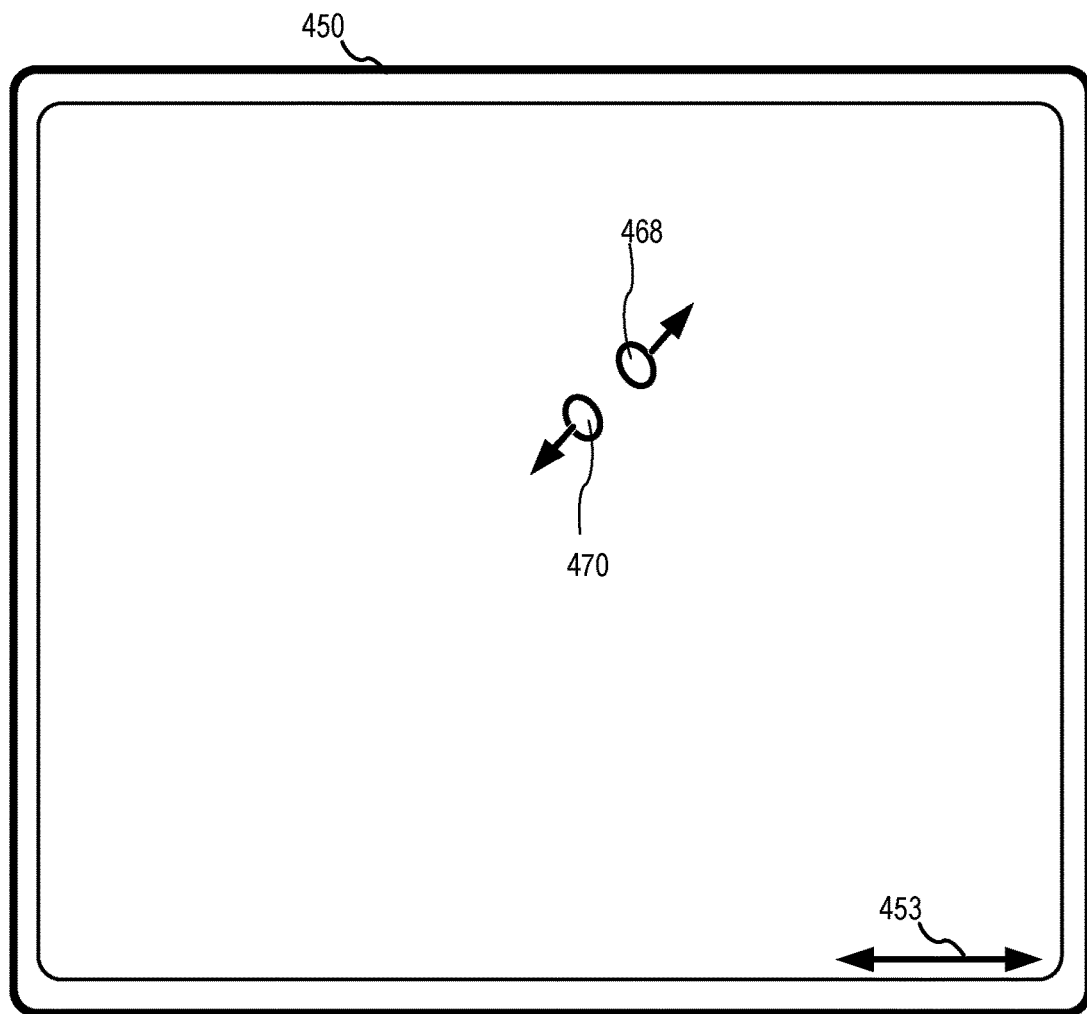
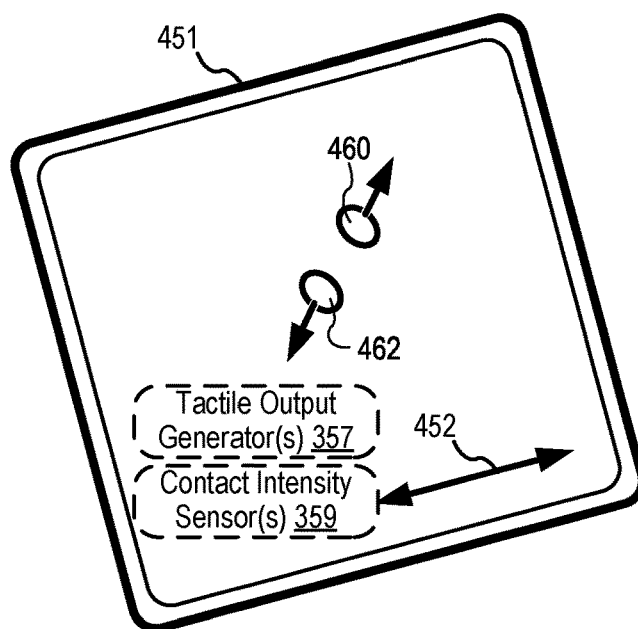
FIG. 4B

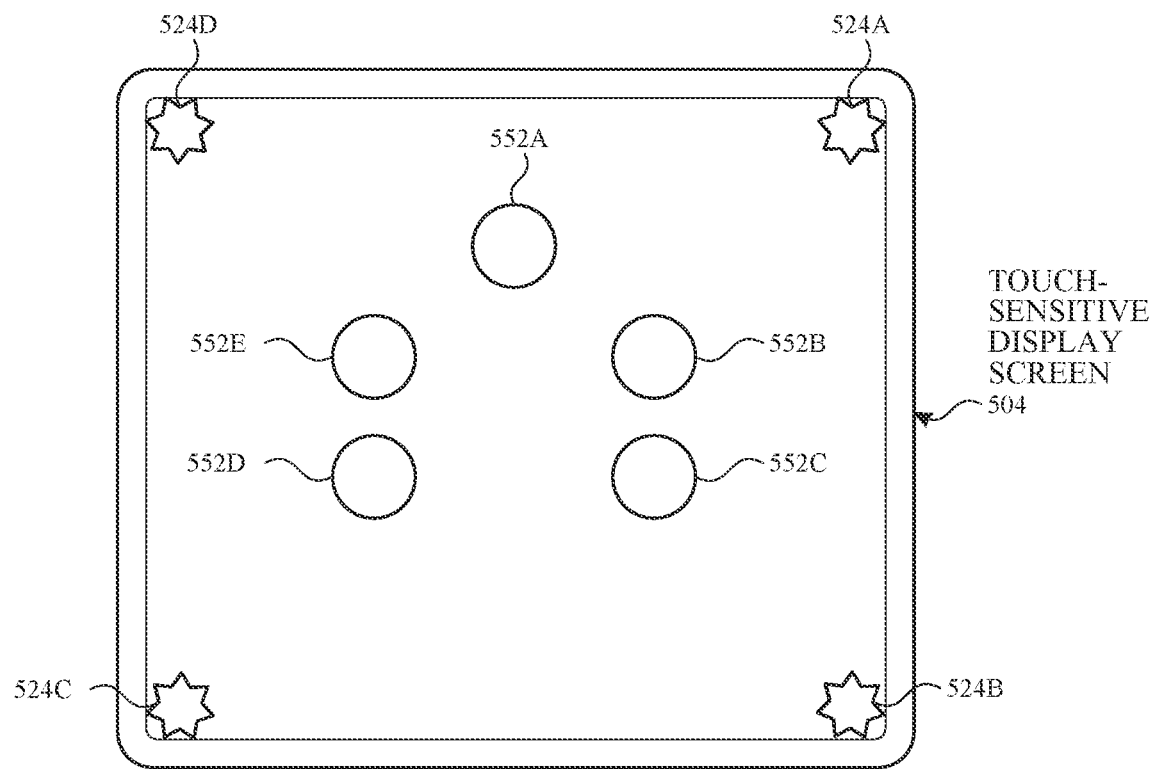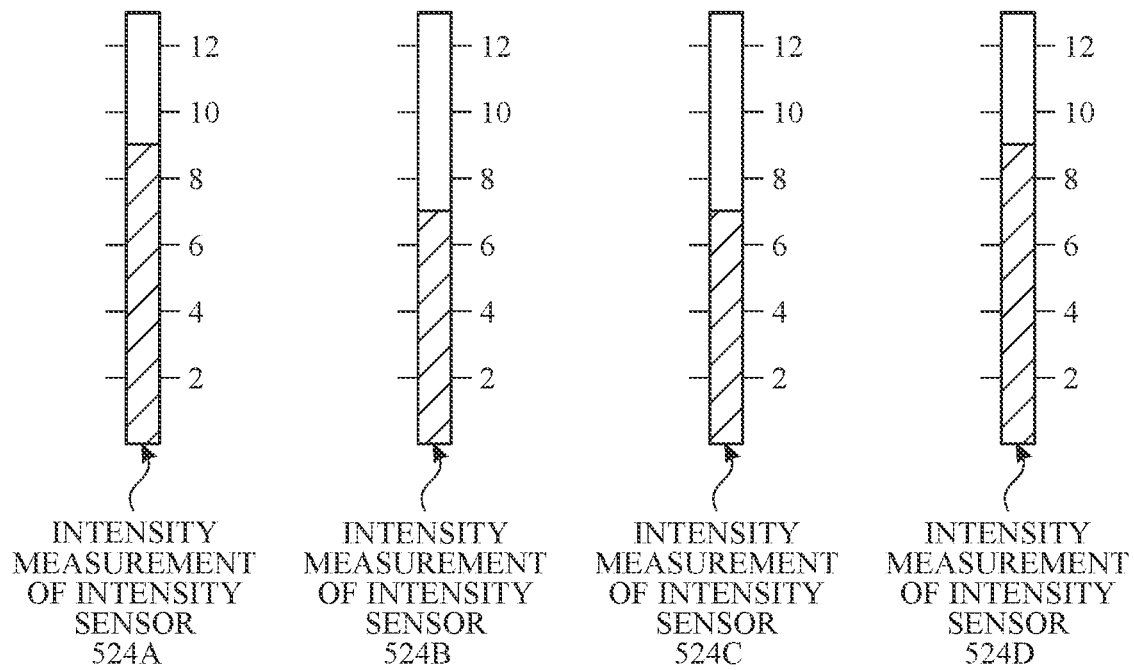
FIG. 5C

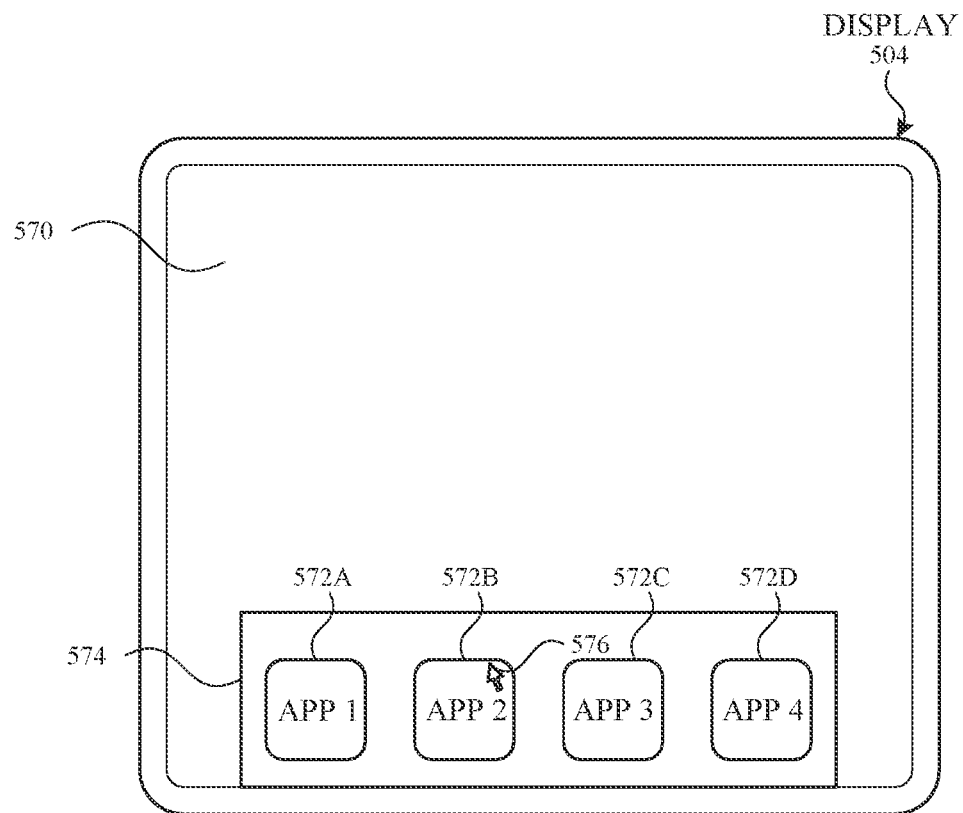
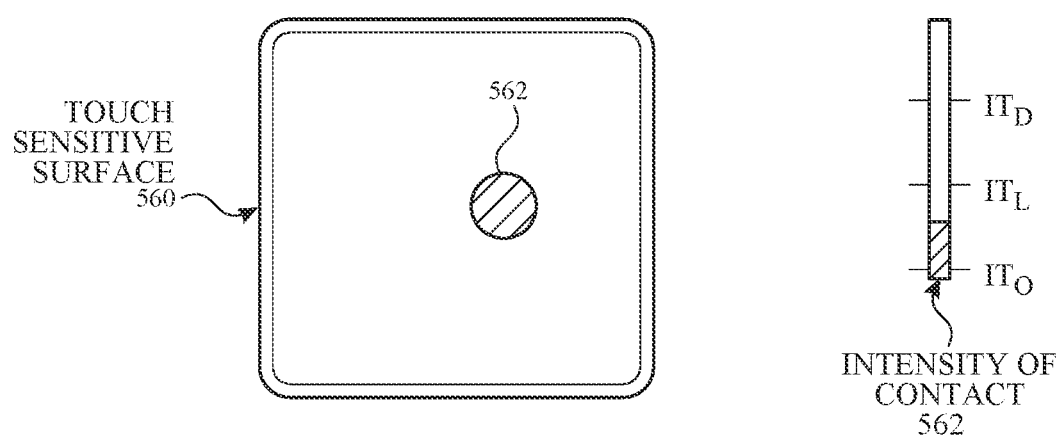
FIG. 5E

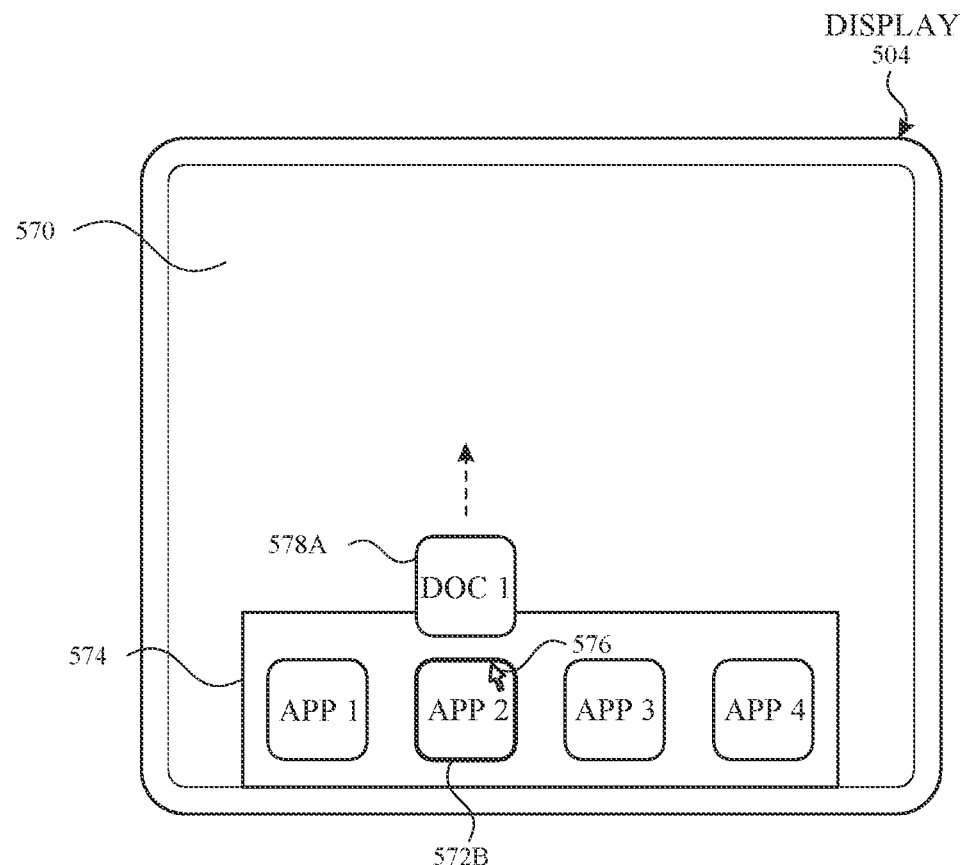
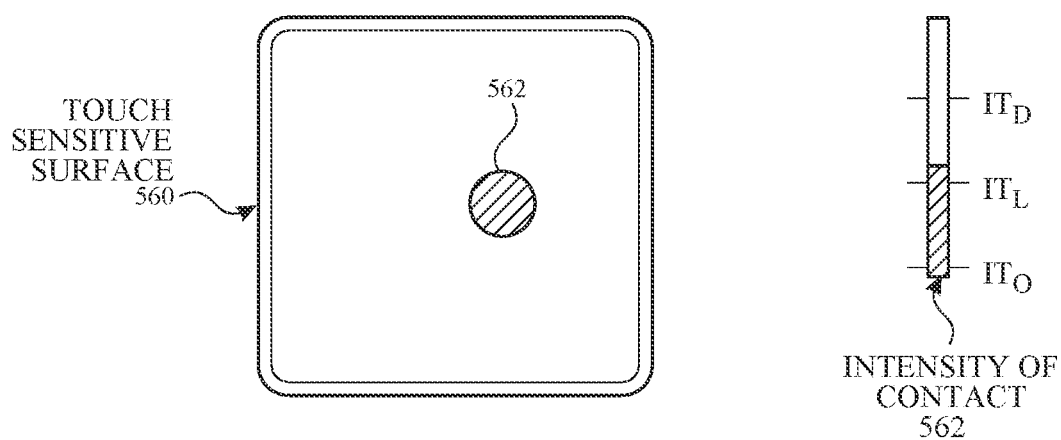
FIG. 5F

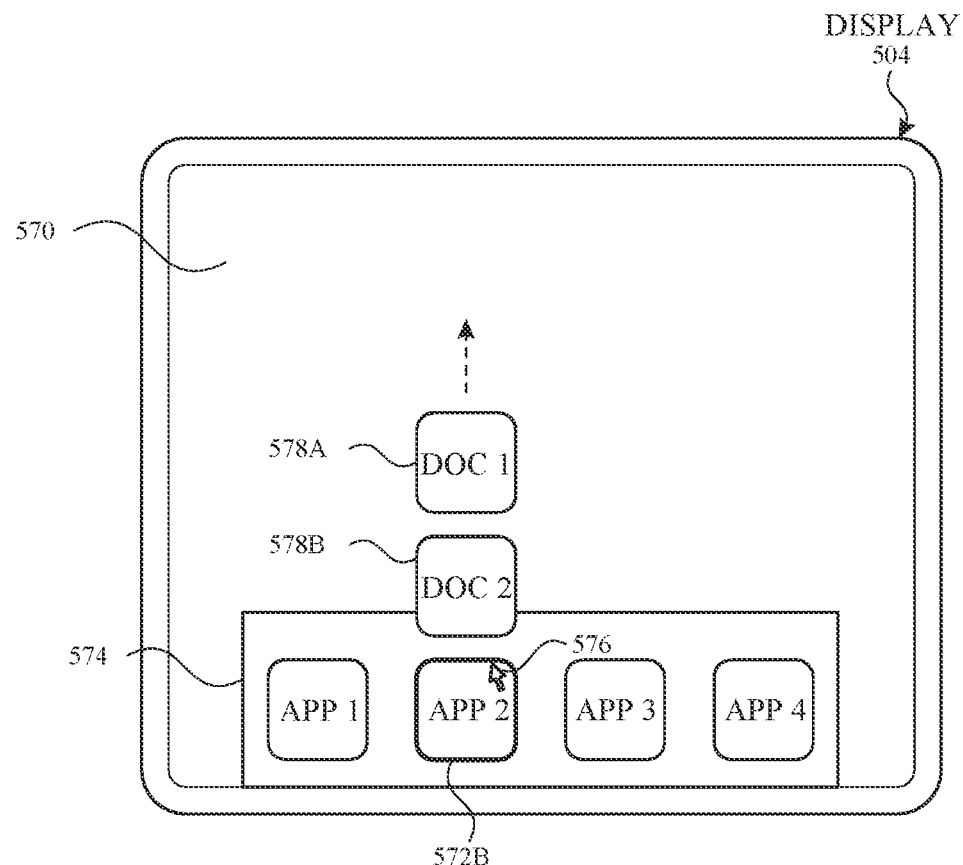
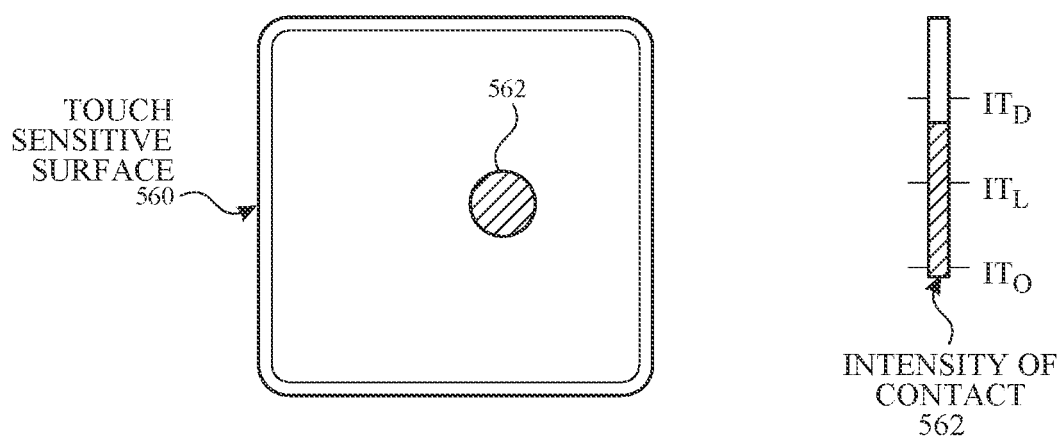
FIG. 5G

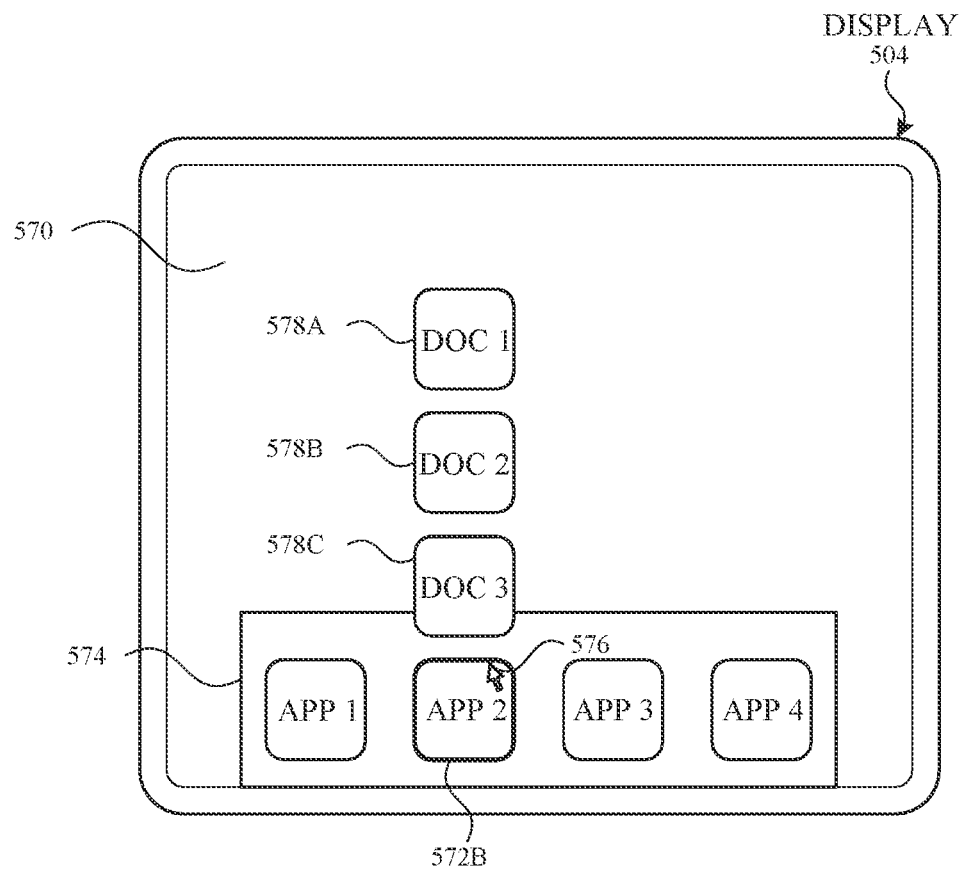
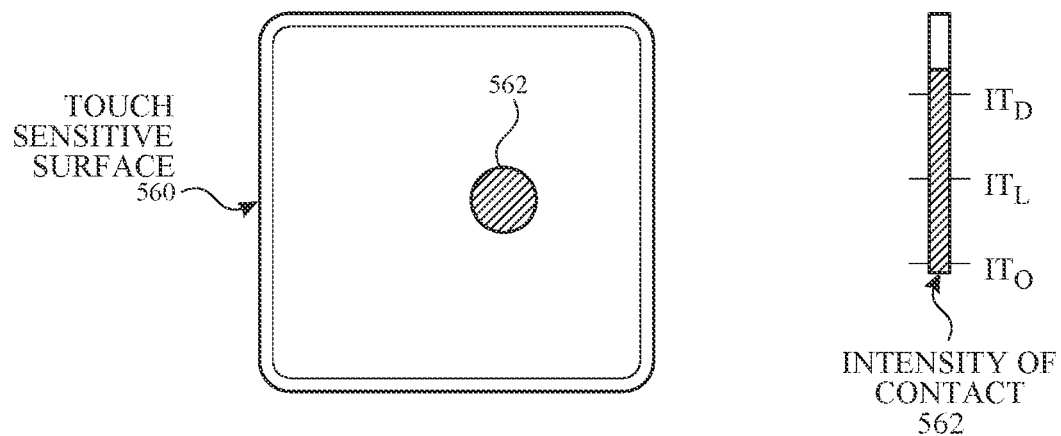
FIG. 5H

700

702
display, via the touch-sensitive display device, a focus indicator at a first indicator location on the touch-sensitive display device

722
wherein the touch-sensitive display has an upper edge and a lower edge

704
while displaying the focus indicator at the first indicator location, detect a touch gesture at a first touch location that corresponds to the focus indicator

706
while continuing to detect the touch gesture on the touch-sensitive display device, detect movement of the touch gesture to a second touch location that is different from the first touch location

708
in response to detecting the movement of the touch gesture to the second touch location:

710
in accordance with a determination that the second touch location is in a first direction relative to the first touch location, move the focus indicator to a second indicator location that has a first spatial relationship to the second touch location

712
in accordance with a determination that the second touch location is in a second direction relative to the first touch location, move the focus indicator to a third indicator location that has a second spatial relationship, different from the first spatial relationship, to the second touch location

*FIG. 7A*

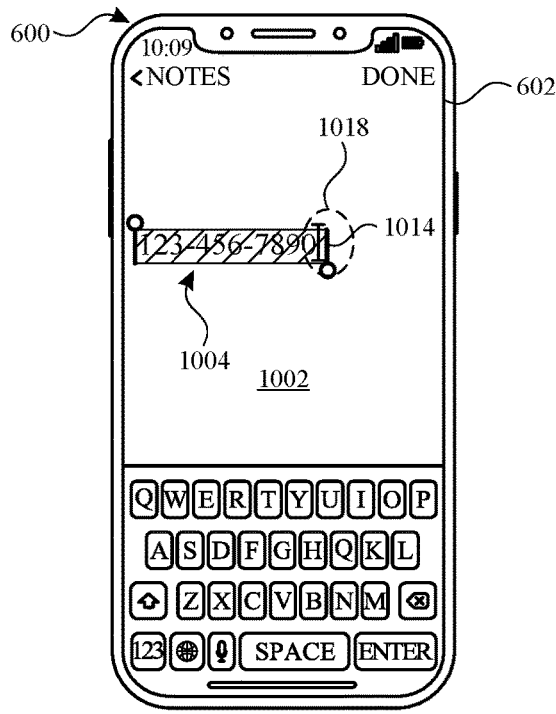
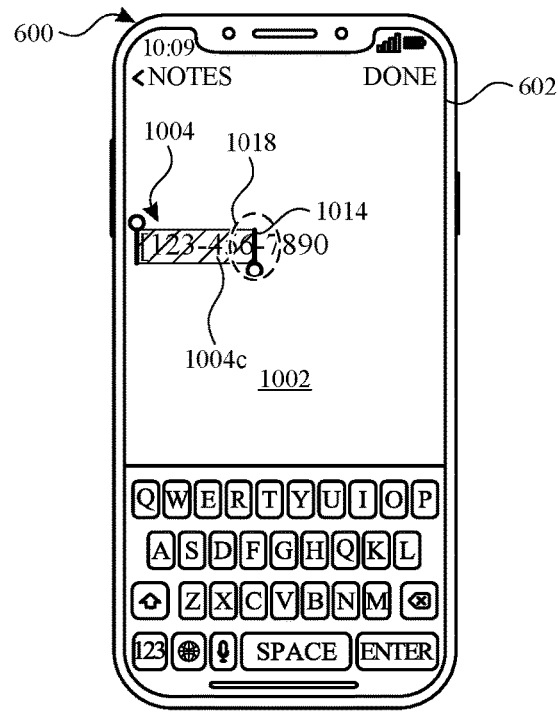
FIG. 10E  FIG. 10F
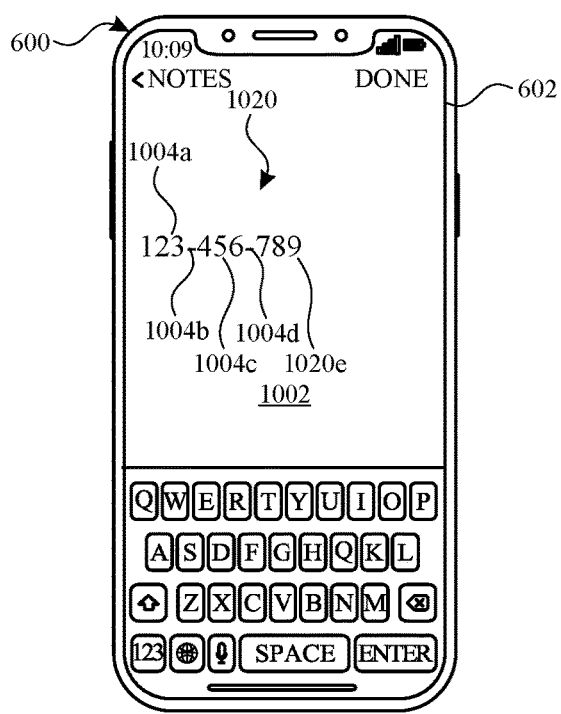
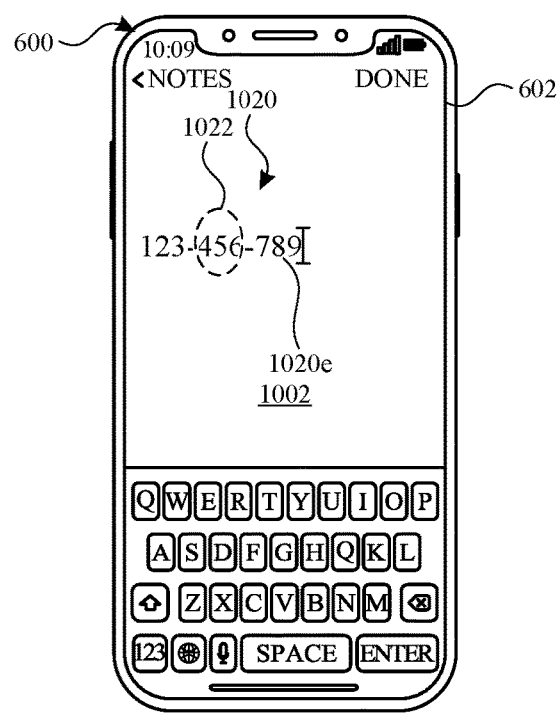
FIG. 10G  FIG. 10H

1100

1102
display, via the display device, a first set of characters, a second set of characters, and a special character between the first set of characters and the second set of characters

1104
receive user input corresponding to selection of the first set of characters

1106
in response to receiving the user input:

1108
in accordance with a determination that a set of grouping criteria are met, visually distinguish the first set of characters and the second set of characters

1110
in accordance with a determination that the set of grouping criteria are not met:

1112
visually distinguish the first set of characters

1114
forgoing visually distinguishing the second set of characters

1302
display, via the display device, a document, the document including: a first paragraph of selectable text, a second paragraph of selectable text, a third paragraph of selectable text, a first new line character between the first paragraph and the second paragraph, and a second new line character between the second paragraph and the third paragraph

1304
receive first user input corresponding to selection of the second paragraph

1306
in response to receiving the first user input:

1308
selecting the second paragraph

1310
forgoing selection of the first new line character

1312
forgoing selection of the second new line character

1314
while the second paragraph is selected and while the first new line character and the second new line character are not selected, receive second user input corresponding to a request to delete the second paragraph (A)

*FIG. 13A*

TECHNIQUES FOR SELECTING TEXT

CROSS-REFERENCE TO RELATED APPLICATIONS

This application claims priority to U.S. Application No. 62/856,021, filed Jun. 1, 2019, entitled "TECHNIQUES FOR SELECTING TEXT", the entire contents of which is hereby incorporated by reference.

FIELD

The present disclosure relates generally to computer user interfaces, and more specifically to techniques for selecting text.

BACKGROUND

Electronic devices, including portable electronic devices, provide a variety of functions including, for example, text manipulation. To manipulate text, a user must be able to select text.

BRIEF SUMMARY

Some techniques for selecting text using electronic devices, however, are generally cumbersome and inefficient. For example, some existing techniques use a complex and time-consuming user interfaces. Existing techniques require more time than necessary, wasting user time and device energy. This latter consideration is particularly important in battery-operated devices.

Accordingly, the present technique provides electronic devices with faster, more efficient methods and interfaces for selecting text. Such methods and interfaces optionally complement or replace other methods for selecting text. Such methods and interfaces reduce the cognitive burden on a user and produce a more efficient human-machine interface. For battery-operated computing devices, such methods and interfaces conserve power and increase the time between battery charges.

Example methods are disclosed herein. An example method includes, at an electronic device with a touch-sensitive display device: displaying, via the touch-sensitive display device, a focus indicator at a first indicator location on the touch-sensitive display device; while displaying the focus indicator at the first indicator location, detecting a touch gesture at a first touch location that corresponds to the focus indicator; while continuing to detect the touch gesture on the touch-sensitive display device, detecting movement of the touch gesture to a second touch location that is different from the first touch location; in response to detecting the movement of the touch gesture to the second touch location: in accordance with a determination that the second touch location is in a first direction relative to the first touch location, moving the focus indicator to a second indicator location that has a first spatial relationship to the second touch location; in accordance with a determination that the second touch location is in a second direction relative to the first touch location, moving the focus indicator to a third indicator location that has a second spatial relationship, different from the first spatial relationship, to the second touch location; while the focus indicator is at a fourth indicator location, detecting liftoff of the touch gesture; and in response to detecting the liftoff, maintaining display of the focus indicator at the fourth indicator location.

Example non-transitory computer-readable storage media are described herein. An example non-transitory computer-readable storage medium stores one or more programs configured to be executed by one or more processors of an electronic device with a touch-sensitive display device, the one or more programs including instructions for: displaying, via the touch-sensitive display device, a focus indicator at a first indicator location on the touch-sensitive display device; while displaying the focus indicator at the first indicator location, detecting a touch gesture at a first touch location that corresponds to the focus indicator; while continuing to detect the touch gesture on the touch-sensitive display device, detecting movement of the touch gesture to a second touch location that is different from the first touch location; in response to detecting the movement of the touch gesture to the second touch location: in accordance with a determination that the second touch location is in a first direction relative to the first touch location, moving the focus indicator to a second indicator location that has a first spatial relationship to the second touch location; in accordance with a determination that the second touch location is in a second direction relative to the first touch location, moving the focus indicator to a third indicator location that has a second spatial relationship, different from the first spatial relationship, to the second touch location; while the focus indicator is at a fourth indicator location, detecting liftoff of the touch gesture; and in response to detecting the liftoff, maintaining display of the focus indicator at the fourth indicator location.

Example transitory computer-readable storage media are described herein. An example transitory computer-readable storage medium stores one or more programs configured to be executed by one or more processors of an electronic device with a touch-sensitive display device, the one or more programs including instructions for: displaying, via the touch-sensitive display device, a focus indicator at a first indicator location on the touch-sensitive display device; while displaying the focus indicator at the first indicator location, detecting a touch gesture at a first touch location that corresponds to the focus indicator; while continuing to detect the touch gesture on the touch-sensitive display device, detecting movement of the touch gesture to a second touch location that is different from the first touch location; in response to detecting the movement of the touch gesture to the second touch location: in accordance with a determination that the second touch location is in a first direction relative to the first touch location, moving the focus indicator to a second indicator location that has a first spatial relationship to the second touch location; in accordance with a determination that the second touch location is in a second direction relative to the first touch location, moving the focus indicator to a third indicator location that has a second spatial relationship, different from the first spatial relationship, to the second touch location; while the focus indicator is at a fourth indicator location, detecting liftoff of the touch gesture; and in response to detecting the liftoff, maintaining display of the focus indicator at the fourth indicator location.

Example electronic devices are described herein. An example electronic device includes a touch-sensitive display device; one or more processors; and memory storing one or more programs configured to be executed by the one or more processors, the one or more programs including instructions for: displaying, via the touch-sensitive display device, a focus indicator at a first indicator location on the touch-sensitive display device; while displaying the focus indicator at the first indicator location, detecting a touch gesture at a first touch location that corresponds to the focus indicator; while continuing to detect the touch gesture on the touch-sensitive display device, detecting movement of the touch gesture to a second touch location that is different from the first touch location; in response to detecting the movement of the touch gesture to the second touch location: in accordance with a determination that the second touch location is in a first direction relative to the first touch location, moving the focus indicator to a second indicator location that has a first spatial relationship to the second touch location; in accordance with a determination that the second touch location is in a second direction relative to the first touch location, moving the focus indicator to a third indicator location that has a second spatial relationship, different from the first spatial relationship, to the second touch location; while the focus indicator is at a fourth indicator location, detecting liftoff of the touch gesture; and in response to detecting the liftoff, maintaining display of the focus indicator at the fourth indicator location.

An example electronic device includes a touch-sensitive display device; means for displaying, via the touch-sensitive display device, a focus indicator at a first indicator location on the touch-sensitive display device; means for, while displaying the focus indicator at the first indicator location, detecting a touch gesture at a first touch location that corresponds to the focus indicator; means for, while continuing to detect the touch gesture on the touch-sensitive display device, detecting movement of the touch gesture to a second touch location that is different from the first touch location; means for, in response to detecting the movement of the touch gesture to the second touch location: in accordance with a determination that the second touch location is in a first direction relative to the first touch location, moving the focus indicator to a second indicator location that has a first spatial relationship to the second touch location; in accordance with a determination that the second touch location is in a second direction relative to the first touch location, moving the focus indicator to a third indicator location that has a second spatial relationship, different from the first spatial relationship, to the second touch location; means for, while the focus indicator is at a fourth indicator location, detecting liftoff of the touch gesture; and means for, in response to detecting the liftoff, maintaining display of the focus indicator at the fourth indicator location.

An example method includes, at an electronic device with a touch-sensitive display device: displaying, via the touch-sensitive display device, content include a plurality of sets of characters; while displaying the plurality of sets of characters, detecting a touch gesture at a first location corresponding to a set of characters of the plurality of sets of characters; in response to detecting the touch gesture: visually distinguishing the set of characters; and displaying a first indicator at a first end of the set of characters and a second indicator at a second end of the set of characters; while continuing to detect the touch gesture on the display device, detecting movement of the touch gesture; and in response to detecting the movement: visually distinguishing one or more additional characters of the plurality of sets of characters; and moving, based on one or more characteristics of the movement, the second indicator to an end of the one or more additional characters.

An example non-transitory computer-readable storage medium stores one or more programs configured to be executed by one or more processors of an electronic device with a touch-sensitive display device, the one or more programs including instructions for: displaying, via the touch-sensitive display device, content include a plurality of sets of characters; while displaying the plurality of sets of characters, detecting a touch gesture at a first location corresponding to a set of characters of the plurality of sets of characters; in response to detecting the touch gesture: visually distinguishing the set of characters; and displaying a first indicator at a first end of the set of characters and a second indicator at a second end of the set of characters; while continuing to detect the touch gesture on the display device, detecting movement of the touch gesture; and in response to detecting the movement: visually distinguishing one or more additional characters of the plurality of sets of characters; and moving, based on one or more characteristics of the movement, the second indicator to an end of the one or more additional characters.

An example transitory computer-readable storage medium stores one or more programs configured to be executed by one or more processors of an electronic device with a touch-sensitive display device, the one or more programs including instructions for: displaying, via the touch-sensitive display device, content include a plurality of sets of characters; while displaying the plurality of sets of characters, detecting a touch gesture at a first location corresponding to a set of characters of the plurality of sets of characters; in response to detecting the touch gesture: visually distinguishing the set of characters; and displaying a first indicator at a first end of the set of characters and a second indicator at a second end of the set of characters; while continuing to detect the touch gesture on the display device, detecting movement of the touch gesture; and in response to detecting the movement: visually distinguishing one or more additional characters of the plurality of sets of characters; and moving, based on one or more characteristics of the movement, the second indicator to an end of the one or more additional characters.

An example electronic device includes a touch-sensitive display device; one or more processors; and memory storing one or more programs configured to be executed by the one or more processors, the one or more programs including instructions for: displaying, via the touch-sensitive display device, content include a plurality of sets of characters; while displaying the plurality of sets of characters, detecting a touch gesture at a first location corresponding to a set of characters of the plurality of sets of characters; in response to detecting the touch gesture: visually distinguishing the set of characters; and displaying a first indicator at a first end of the set of characters and a second indicator at a second end of the set of characters; while continuing to detect the touch gesture on the display device, detecting movement of the touch gesture; and in response to detecting the movement: visually distinguishing one or more additional characters of the plurality of sets of characters; and moving, based on one or more characteristics of the movement, the second indicator to an end of the one or more additional characters.

An example electronic device includes a touch-sensitive display device; means for displaying, via the touch-sensitive display device, content include a plurality of sets of characters; means for, while displaying the plurality of sets of characters, detecting a touch gesture at a first location corresponding to a set of characters of the plurality of sets of characters; means for, in response to detecting the touch gesture: visually distinguishing the set of characters; and displaying a first indicator at a first end of the set of characters and a second indicator at a second end of the set of characters; means for, while continuing to detect the touch gesture on the display device, detecting movement of the touch gesture; and means for, in response to detecting the movement: visually distinguishing one or more additional characters of the plurality of sets of characters; and moving, based on one or more characteristics of the movement, the second indicator to an end of the one or more additional characters.

An example method includes, at an electronic device with a display device: displaying, via the display device, a first set of characters, a second set of characters, and a special character between the first set of characters and the second set of characters; receiving user input corresponding to selection of the first set of characters; and in response to receiving the user input: in accordance with a determination that a set of grouping criteria are met, visually distinguishing the first set of characters and the second set of characters; and in accordance with a determination that the set of grouping criteria are not met: visually distinguishing the first set of characters; and forgoing visually distinguishing the second set of characters.

An example non-transitory computer-readable storage medium stores one or more programs configured to be executed by one or more processors of an electronic device with a display device, the one or more programs including instructions for: displaying, via the display device, a first set of characters, a second set of characters, and a special character between the first set of characters and the second set of characters; receiving user input corresponding to selection of the first set of characters; and in response to receiving the user input: in accordance with a determination that a set of grouping criteria are met, visually distinguishing the first set of characters and the second set of characters; and in accordance with a determination that the set of grouping criteria are not met: visually distinguishing the first set of characters; and forgoing visually distinguishing the second set of characters.

An example transitory computer-readable storage medium stores one or more programs configured to be executed by one or more processors of an electronic device with a display device, the one or more programs including instructions for: displaying, via the display device, a first set of characters, a second set of characters, and a special character between the first set of characters and the second set of characters; receiving user input corresponding to selection of the first set of characters; and in response to receiving the user input: in accordance with a determination that a set of grouping criteria are met, visually distinguishing the first set of characters and the second set of characters; and in accordance with a determination that the set of grouping criteria are not met: visually distinguishing the first set of characters; and forgoing visually distinguishing the second set of characters.

An example electronic device includes a display device; one or more processors; and memory storing one or more programs configured to be executed by the one or more processors, the one or more programs including instructions for: displaying, via the display device, a first set of characters, a second set of characters, and a special character between the first set of characters and the second set of characters; receiving user input corresponding to selection of the first set of characters; and in response to receiving the user input: in accordance with a determination that a set of grouping criteria are met, visually distinguishing the first set of characters and the second set of characters; and in accordance with a determination that the set of grouping criteria are not met: visually distinguishing the first set of characters; and forgoing visually distinguishing the second set of characters.

An example electronic device includes a display device; means for displaying, via the display device, a first set of characters, a second set of characters, and a special character between the first set of characters and the second set of characters; means for receiving user input corresponding to selection of the first set of characters; and means for, in response to receiving the user input: in accordance with a determination that a set of grouping criteria are met, visually distinguishing the first set of characters and the second set of characters; and in accordance with a determination that the set of grouping criteria are not met: visually distinguishing the first set of characters; and forgoing visually distinguishing the second set of characters.

An example method includes, at an electronic device with a display device: displaying, via the display device, a document, the document including: a first paragraph of selectable text, a second paragraph of selectable text, a third paragraph of selectable text, a first new line character between the first paragraph and the second paragraph, and a second new line character between the second paragraph and the third paragraph; receiving first user input corresponding to selection of the second paragraph; in response to receiving the first user input: selecting the second paragraph; forgoing selection of the first new line character; and forgoing selection of the second new line character; while the second paragraph is selected and while the first new line character and the second new line character are not selected, receiving second user input corresponding to a request to delete the second paragraph; and in response to receiving the second user input: deleting the second paragraph; and deleting a new line character selected from a group consisting of the first new line character and the second new line character.

An example non-transitory computer-readable storage medium stores one or more programs configured to be executed by one or more processors of an electronic device with a display device, the one or more programs including instructions for: displaying, via the display device, a document, the document including: a first paragraph of selectable text, a second paragraph of selectable text, a third paragraph of selectable text, a first new line character between the first paragraph and the second paragraph, and a second new line character between the second paragraph and the third paragraph; receiving first user input corresponding to selection of the second paragraph; in response to receiving the first user input: selecting the second paragraph; forgoing selection of the first new line character; and forgoing selection of the second new line character; while the second paragraph is selected and while the first new line character and the second new line character are not selected, receiving second user input corresponding to a request to delete the second paragraph; and in response to receiving the second user input: deleting the second paragraph; and deleting a new line character selected from a group consisting of the first new line character and the second new line character.

An example transitory computer-readable storage medium stores one or more programs configured to be executed by one or more processors of an electronic device with a display device, the one or more programs including instructions for: displaying, via the display device, a document, the document including: a first paragraph of selectable text, a second paragraph of selectable text, a third paragraph of selectable text, a first new line character between the first paragraph and the second paragraph, and a second new line character between the second paragraph and the third paragraph; receiving first user input corresponding to selection of the second paragraph; in response to receiving the first user input: selecting the second paragraph; forgoing selection of the first new line character; and forgoing selection of the second new line character; while the second paragraph is selected and while the first new line character and the second new line character are not selected, receiving second user input corresponding to a request to delete the second paragraph; and in response to receiving the second user input: deleting the second paragraph; and deleting a new line character selected from a group consisting of the first new line character and the second new line character.

An example electronic device includes a display device; one or more processors; and memory storing one or more programs configured to be executed by the one or more processors, the one or more programs including instructions for: displaying, via the display device, a document, the document including: a first paragraph of selectable text, a second paragraph of selectable text, a third paragraph of selectable text, a first new line character between the first paragraph and the second paragraph, and a second new line character between the second paragraph and the third paragraph; receiving first user input corresponding to selection of the second paragraph; in response to receiving the first user input: selecting the second paragraph; forgoing selection of the first new line character; and forgoing selection of the second new line character; while the second paragraph is selected and while the first new line character and the second new line character are not selected, receiving second user input corresponding to a request to delete the second paragraph; and in response to receiving the second user input: deleting the second paragraph; and deleting a new line character selected from a group consisting of the first new line character and the second new line character.

An example electronic device includes a display device; means for displaying, via the display device, a document, the document including: a first paragraph of selectable text, a second paragraph of selectable text, a third paragraph of selectable text, a first new line character between the first paragraph and the second paragraph, and a second new line character between the second paragraph and the third paragraph; means for receiving first user input corresponding to selection of the second paragraph; means for, in response to receiving the first user input: selecting the second paragraph; forgoing selection of the first new line character; and forgoing selection of the second new line character; means for, while the second paragraph is selected and while the first new line character and the second new line character are not selected, receiving second user input corresponding to a request to delete the second paragraph; and means for, in response to receiving the second user input: deleting the second paragraph; and deleting a new line character selected from a group consisting of the first new line character and the second new line character.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for selecting text, thereby increasing the effectiveness, efficiency, and user satisfaction with such devices. Such methods and interfaces may complement or replace other methods for selecting text.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIGS. 7A-7B illustrate a flow diagram for a method of moving an insertion marker using an electronic device in accordance with some embodiments.

FIG. 11 illustrates a flow diagram for a method of selecting content using an electronic device in accordance with some embodiments.

FIGS. 13A-13B illustrate a flow diagram for a method of modifying content using an electronic device in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for selecting text. For example, techniques for moving a text cursor can be provided. Such techniques can reduce the cognitive burden on a user who manipulates text, thereby enhancing productivity. Further, such techniques can reduce processor and battery power otherwise wasted on redundant user inputs.

Below, FIGS. 1A-1B, 2, 3, 4A-4B, and 5A-5H provide a description of exemplary devices for performing the techniques for selecting text.

Figure 6A:
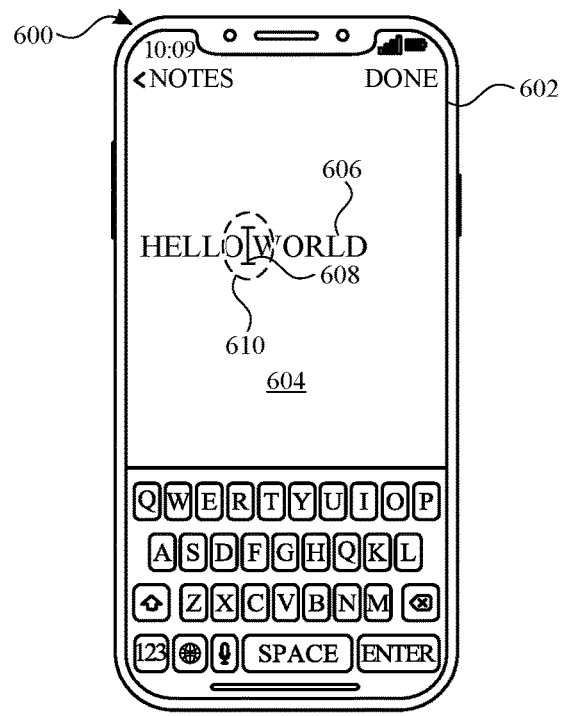
FIGS. 6A-6O depict techniques for moving an insertion marker, in accordance with some embodiments.
Figure 6B:
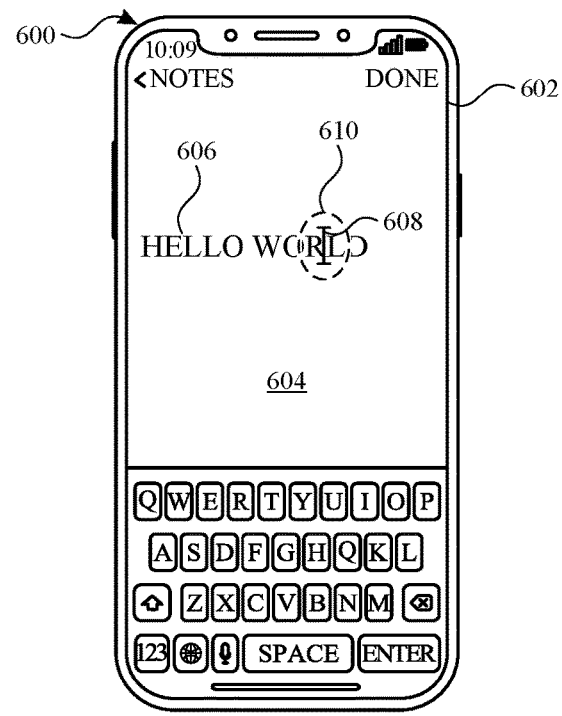
Figure 6C:
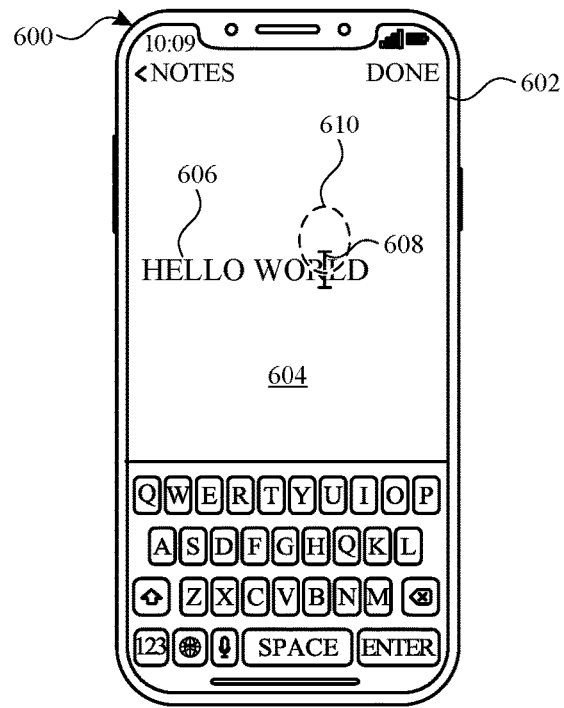
Figure 6D:
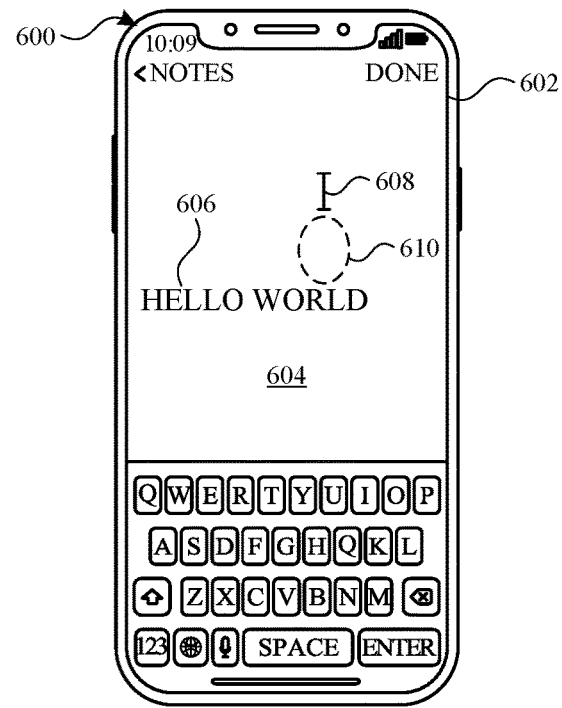
Figure 6E:
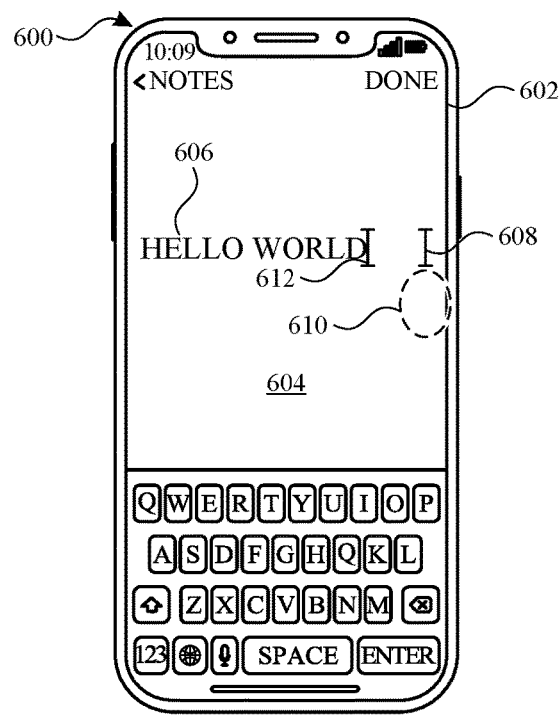
Figure 6F:
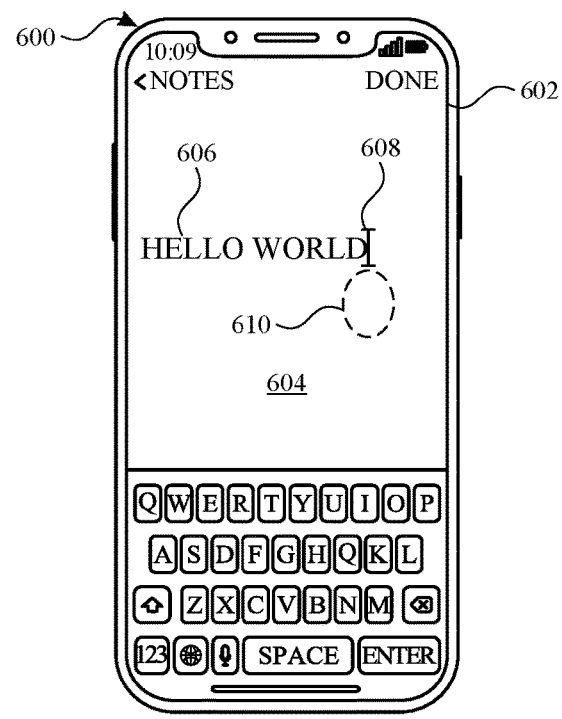
Figure 6G:
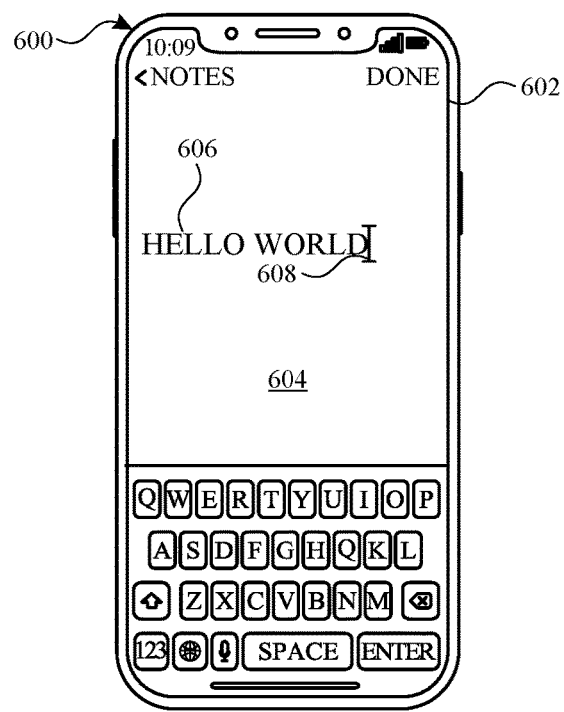
Figure 6H:
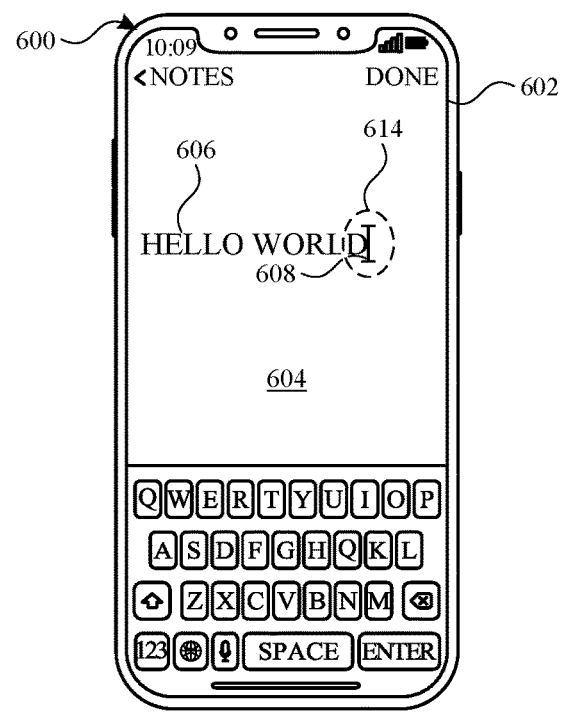
Figure 6I:
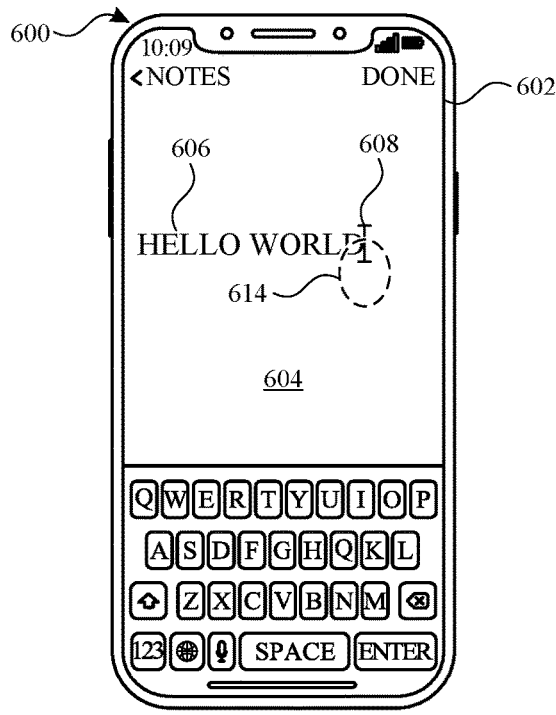
Figure 6J:
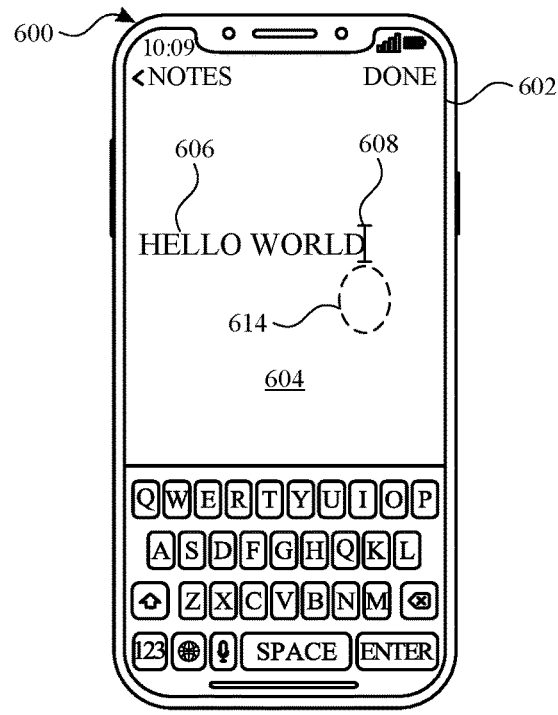
Figure 6K:
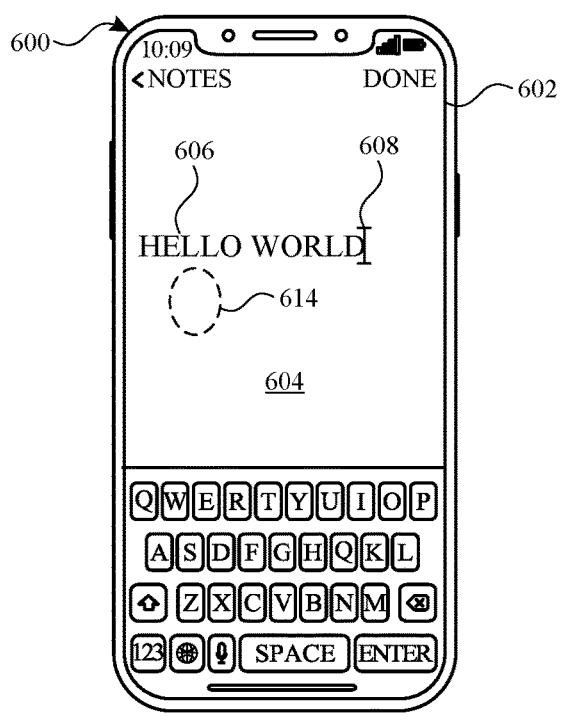
Figure 6L:
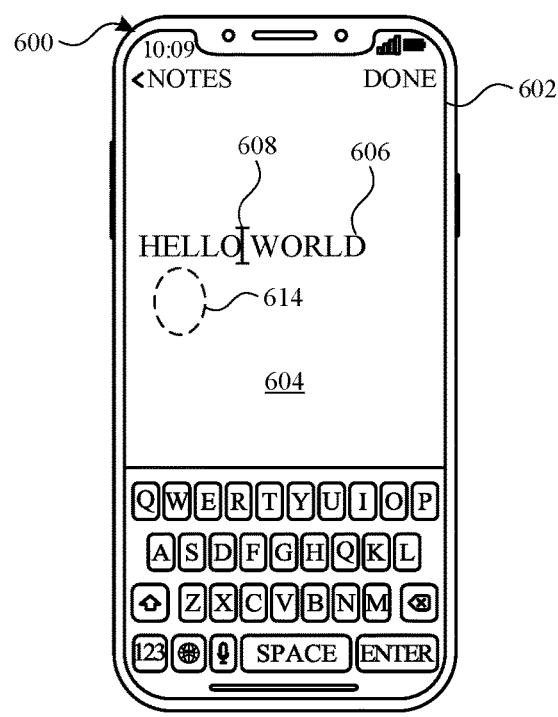
Figure 6M:
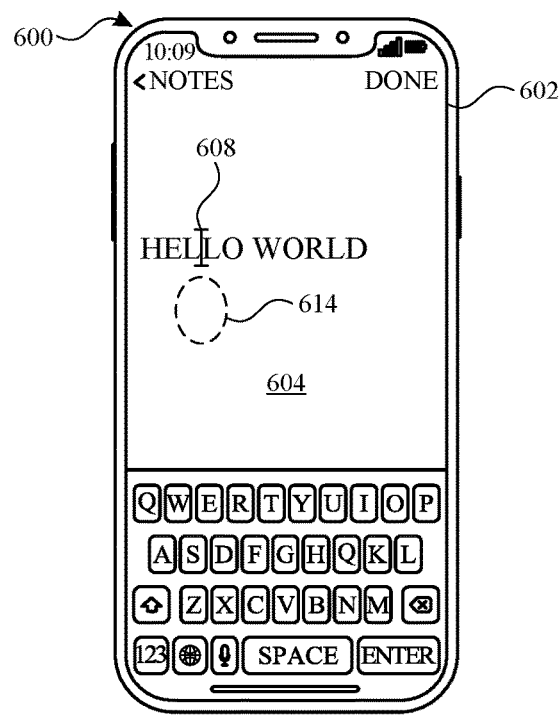
Figure 6N:
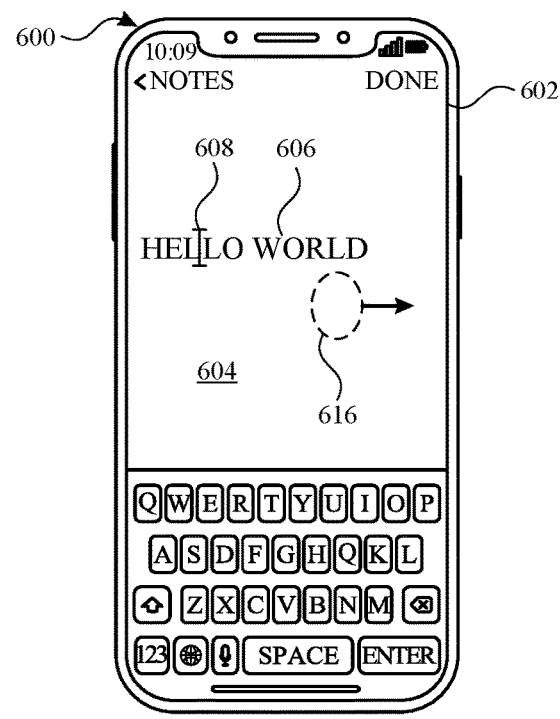
Figure 6O:
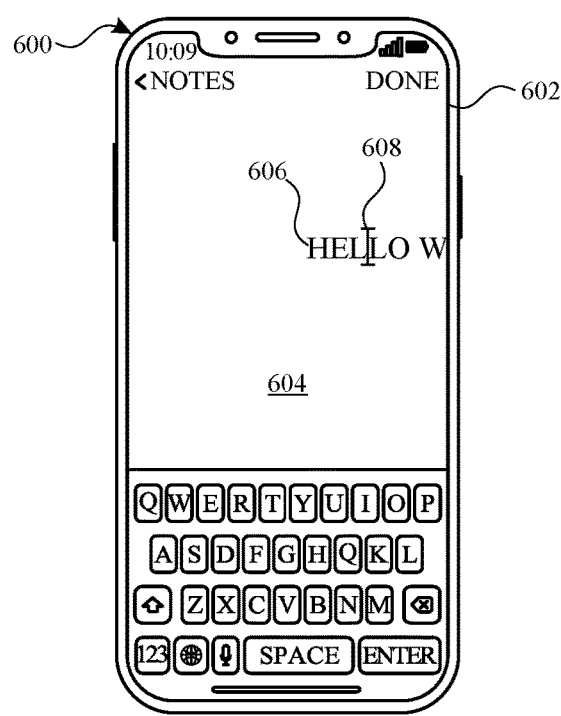
Figure 7B:
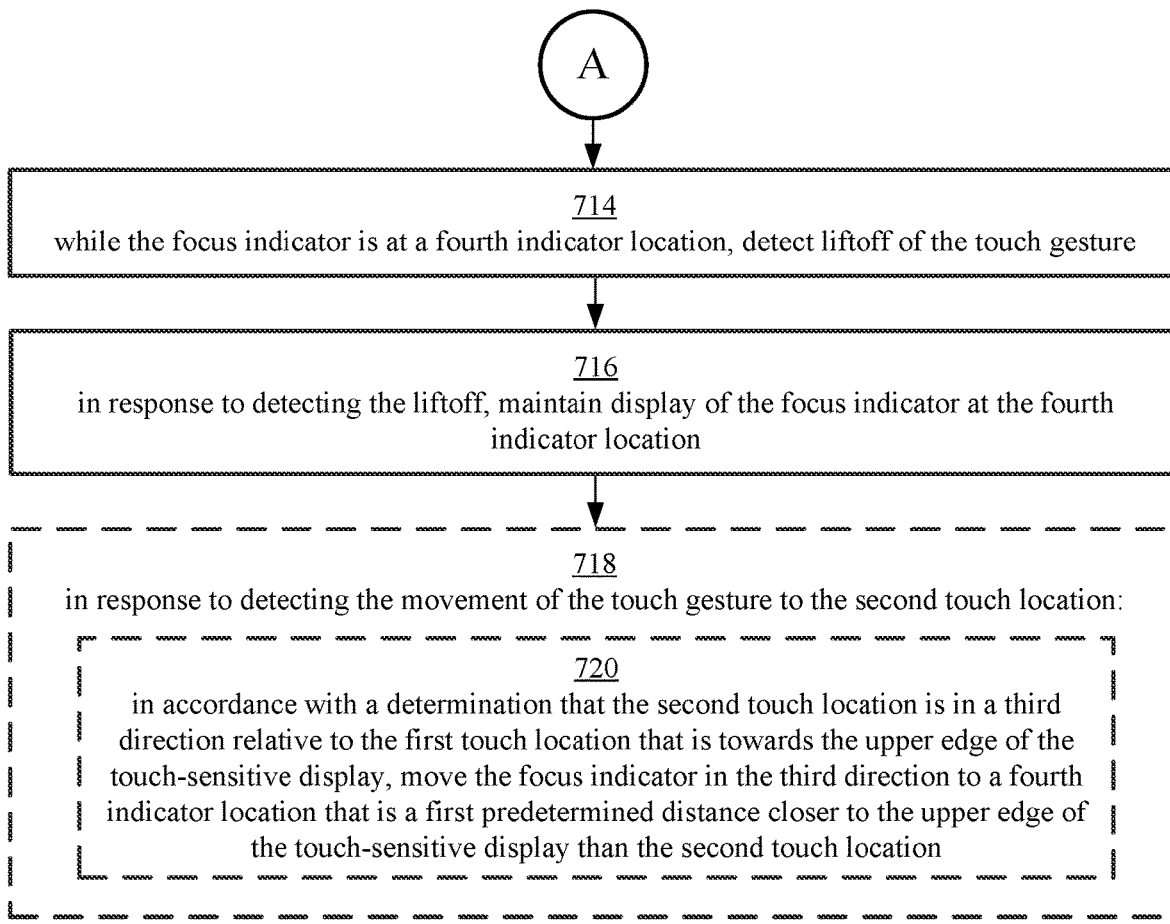

FIGS. 6A-6O illustrate exemplary user interfaces for moving an insertion marker. FIGS. 7A-7B illustrate a flow diagram for a method of moving an insertion marker using an electronic device in accordance with some embodiments. The user interfaces in FIGS. 6A-6O are used to illustrate the processes described below, including the processes in FIGS. 7A-7B.

FIGS. 8A-8K illustrate exemplary user interfaces for selecting content. FIGS. 9A-9B illustrate a flow diagram for a method of selecting content using an electronic device in accordance with some embodiments. The user interfaces in FIGS. 8A-8K are used to illustrate the processes described below, including the processes in FIGS. 9A-9B.

Figure 10A:
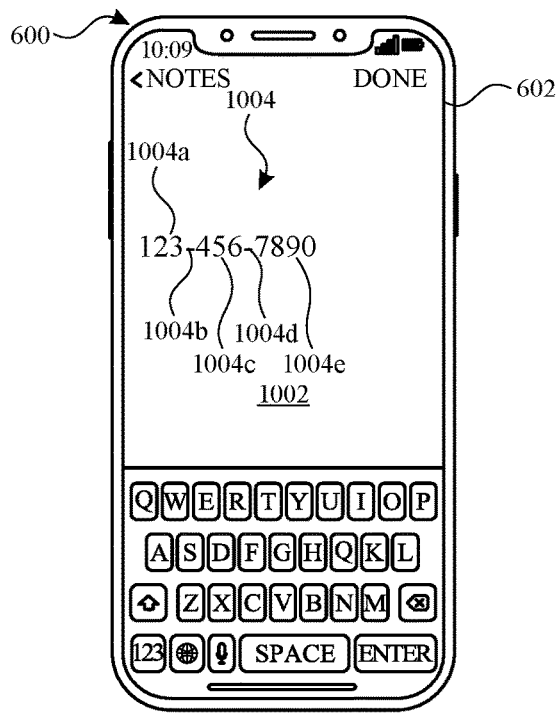
FIGS. 10A-10V illustrate exemplary user interfaces depicting techniques for selecting content, in accordance with some embodiments.
Figure 10B:
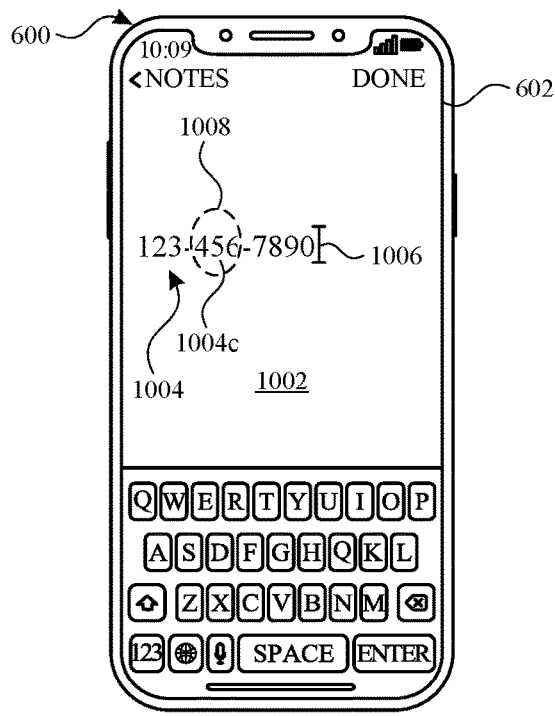
Figure 10C:
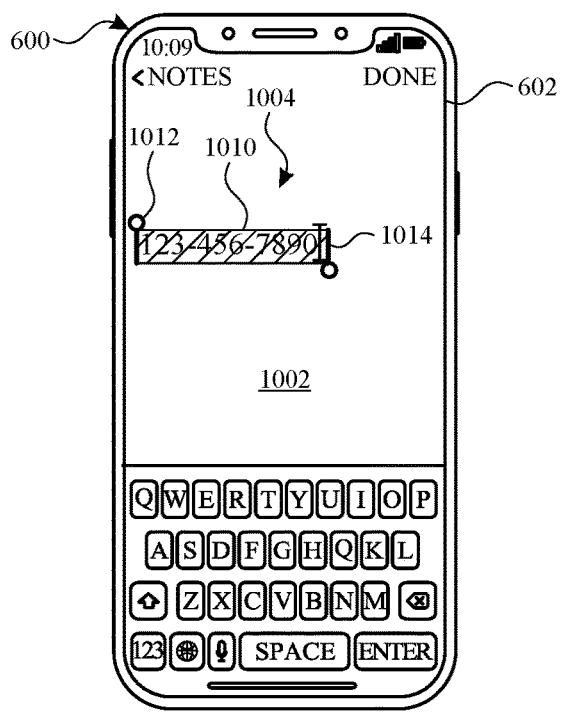
Figure 10D:
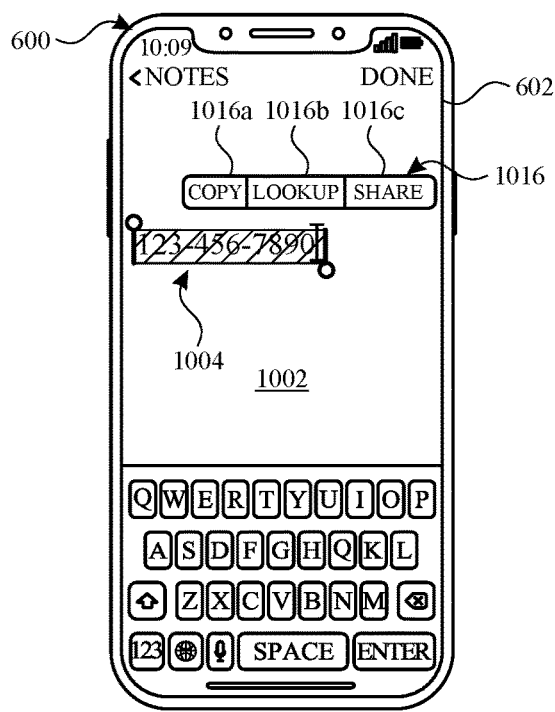
Figure 10I:
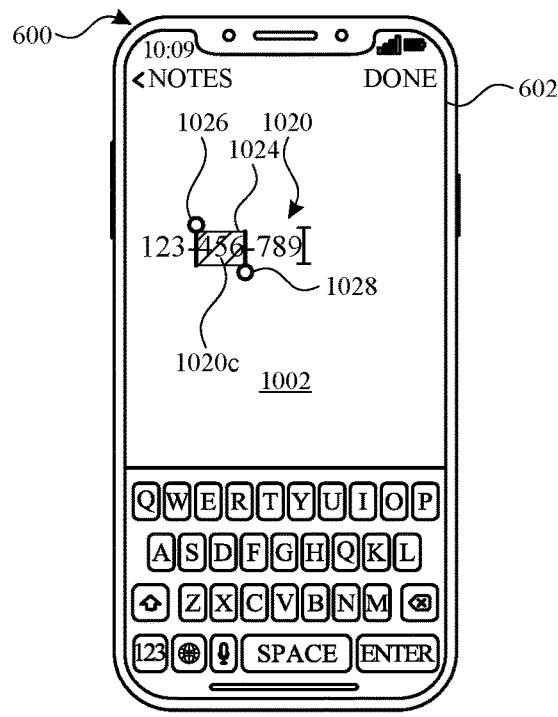
Figure 10J:
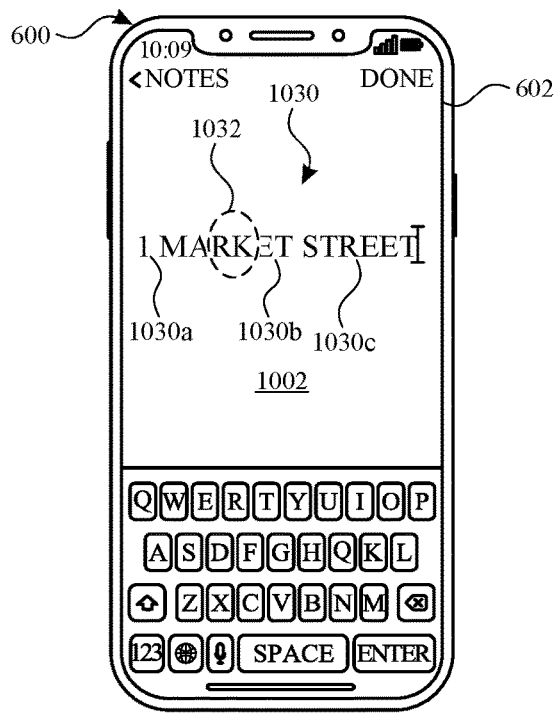
Figure 10K:
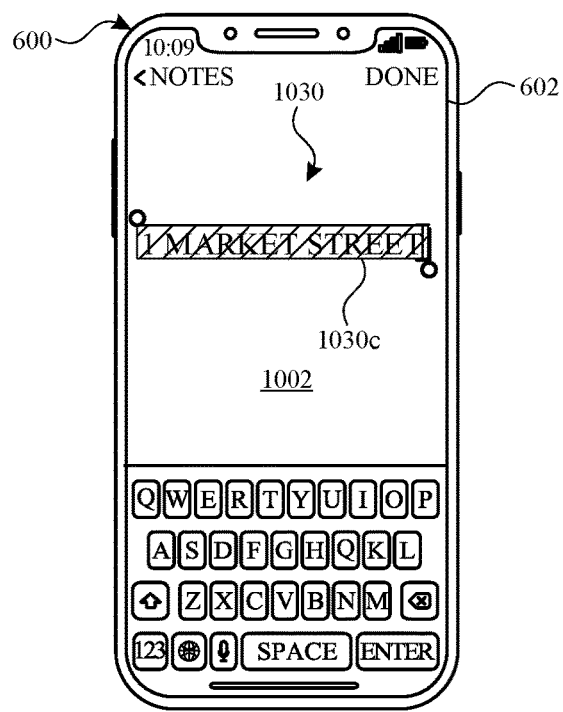
Figure 10L:
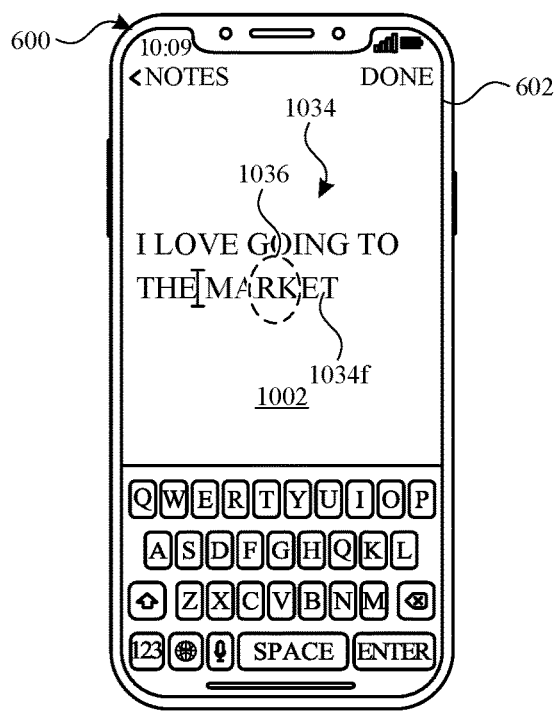
Figure 10M:
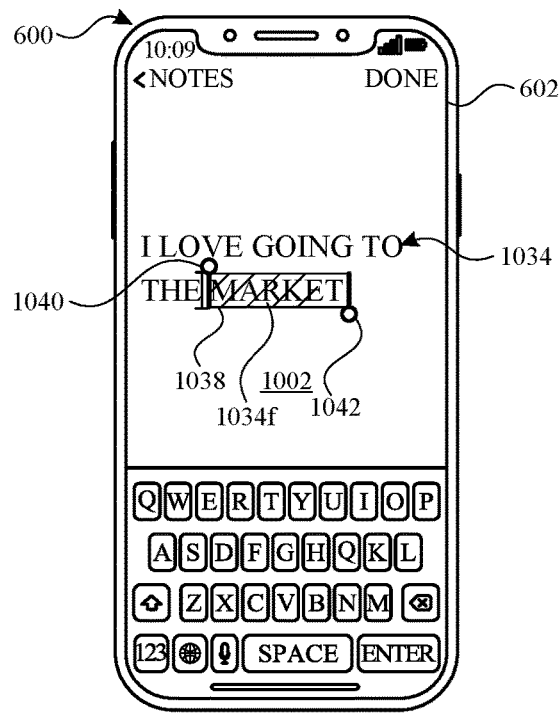
Figure 10N:
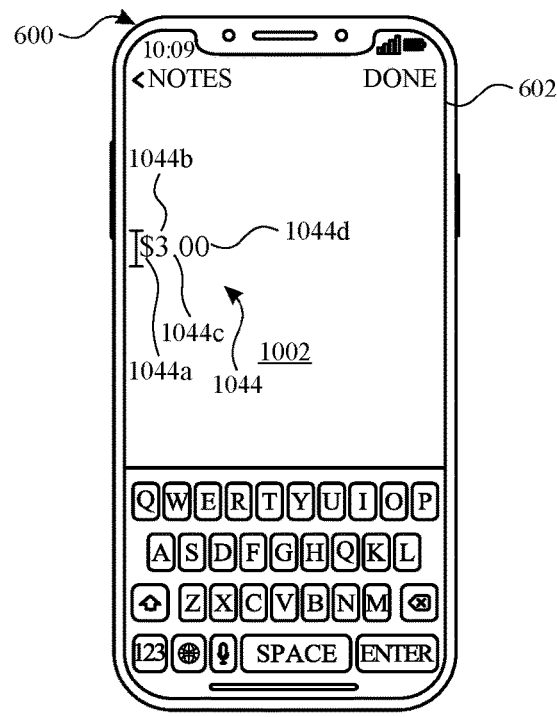
Figure 10O:
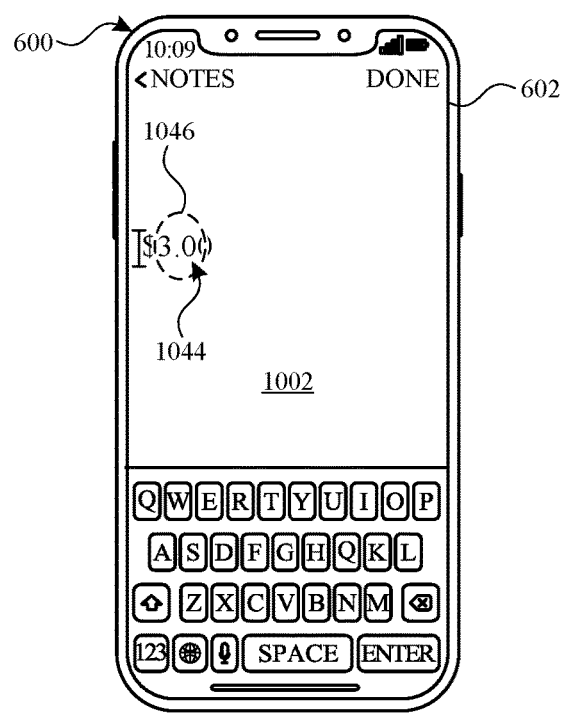
Figure 10P:
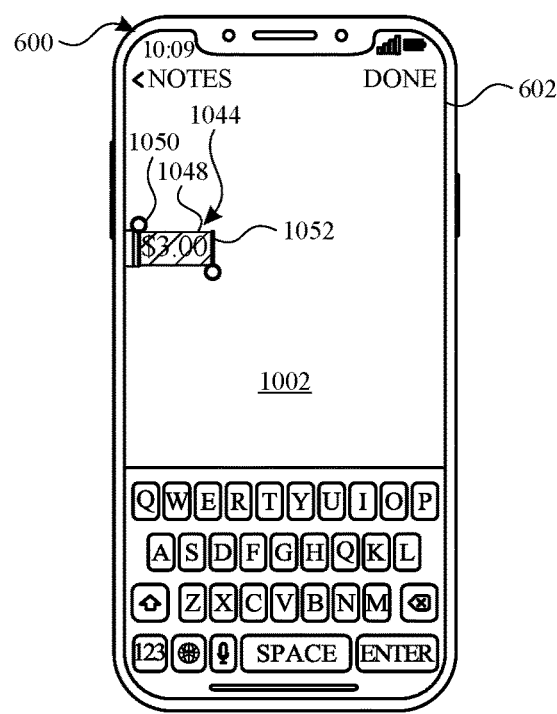
Figure 10Q:
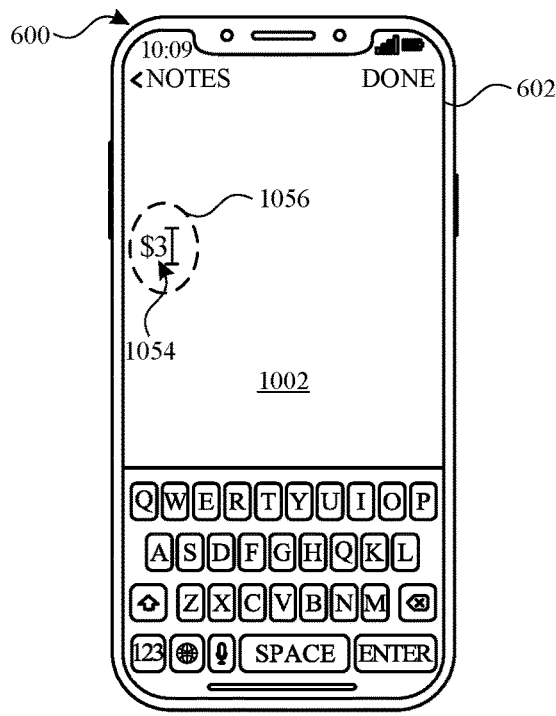
Figure 10R:
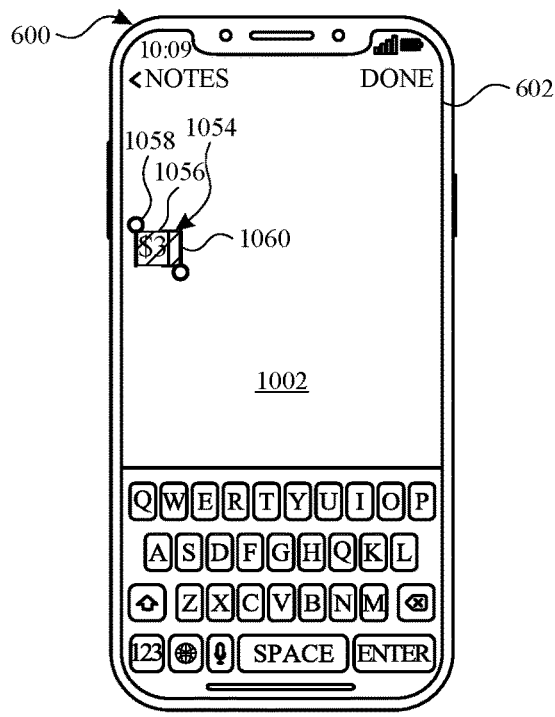

10A-10V illustrate exemplary user interfaces for selecting content. FIG. 11 illustrates a flow diagram for a method of selecting content using an electronic device in accordance with some embodiments. The user interfaces in FIGS. 10A-10V are used to illustrate the processes described below, including the processes in FIG. 11.

FIGS. 12A-12H illustrate exemplary user interfaces for modifying content. FIGS. 13A-13B illustrates a flow diagram for a method of modifying content using an electronic device in accordance with some embodiments. The user interfaces in FIGS. 12A-12H are used to illustrate the processes described below, including the processes in FIGS. 13A-13B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
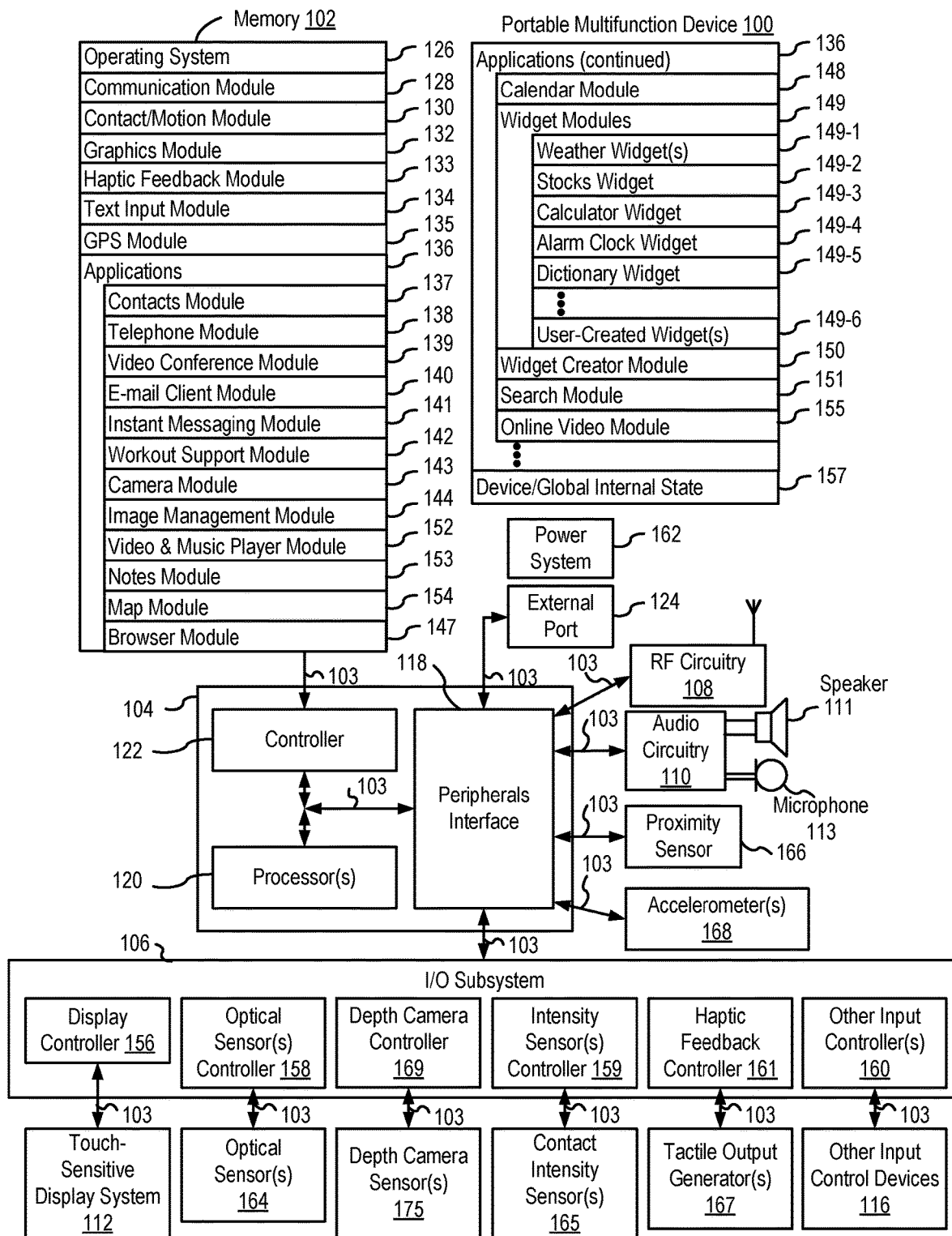
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointing device (sometimes referred to as a pointer device) such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), 6,570,557 (Westerman et al.), and/or 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
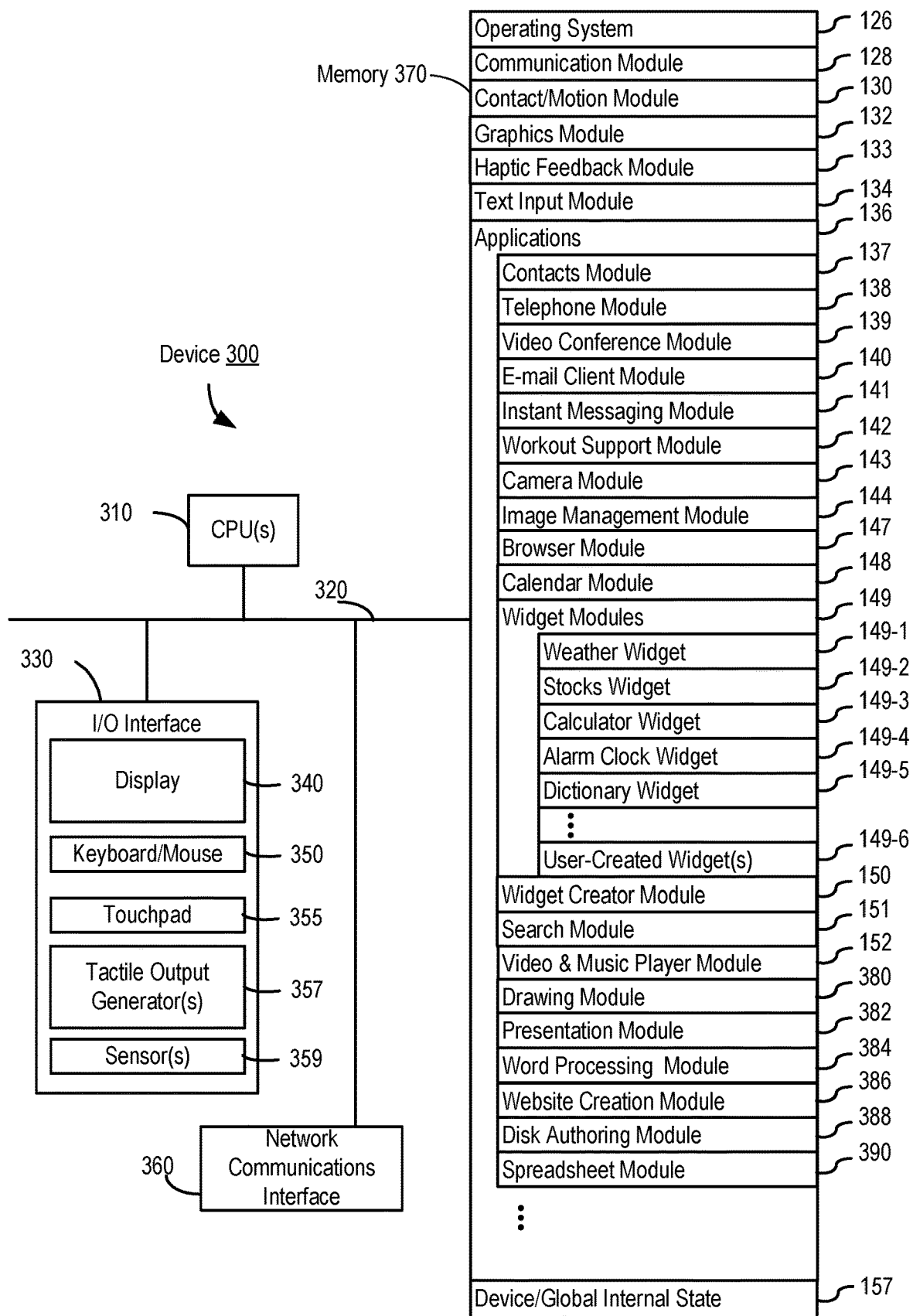
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
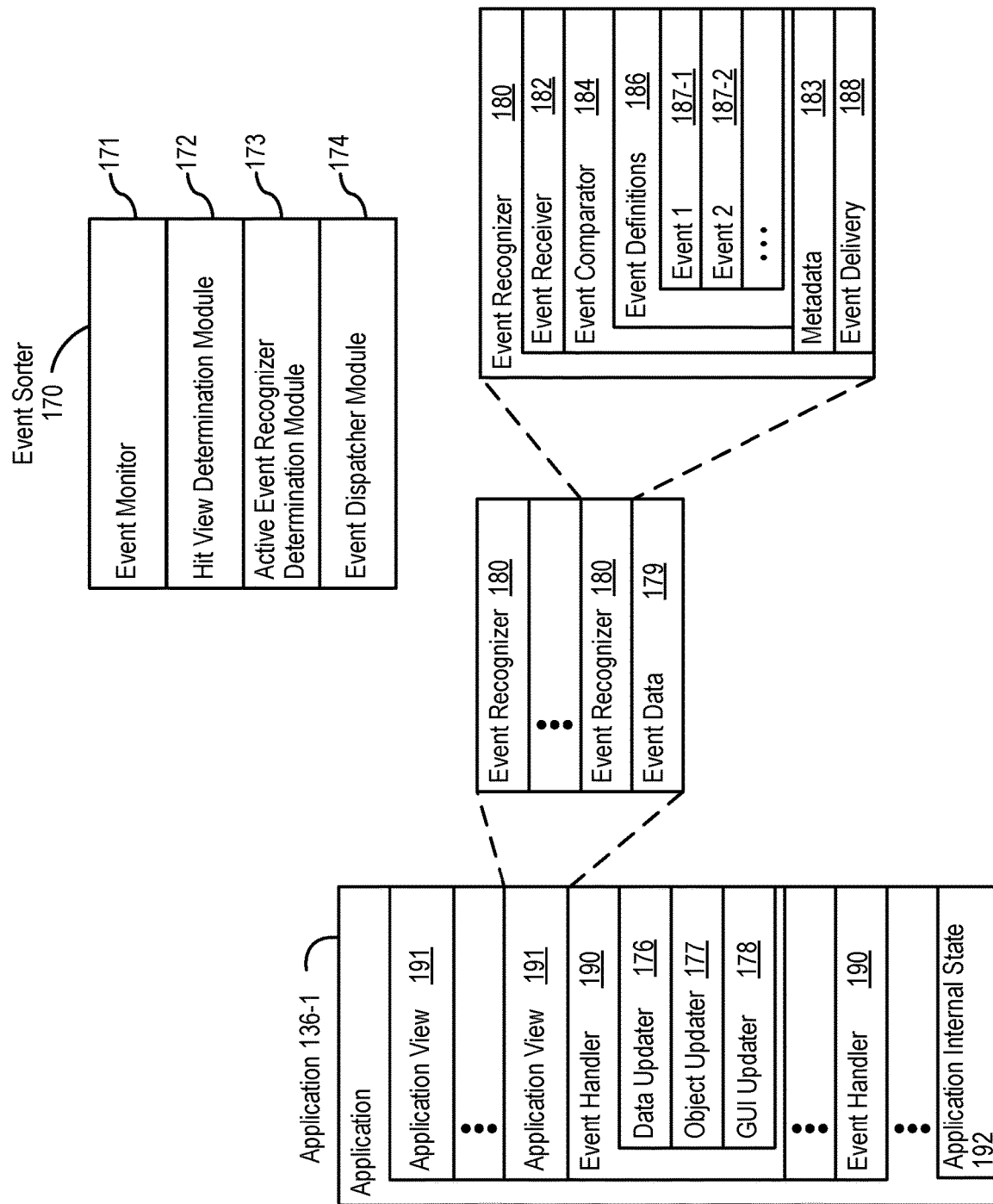
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
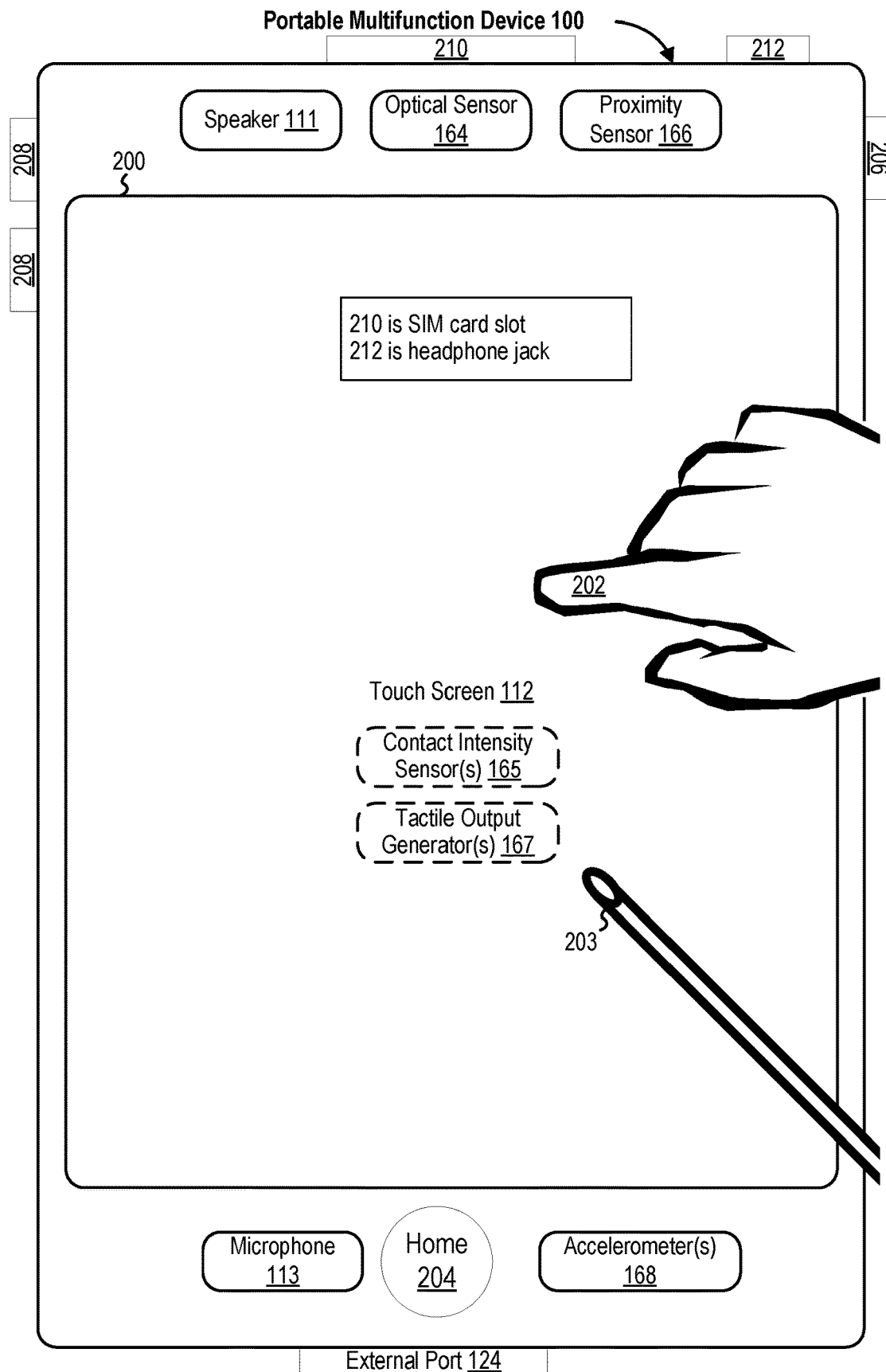
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
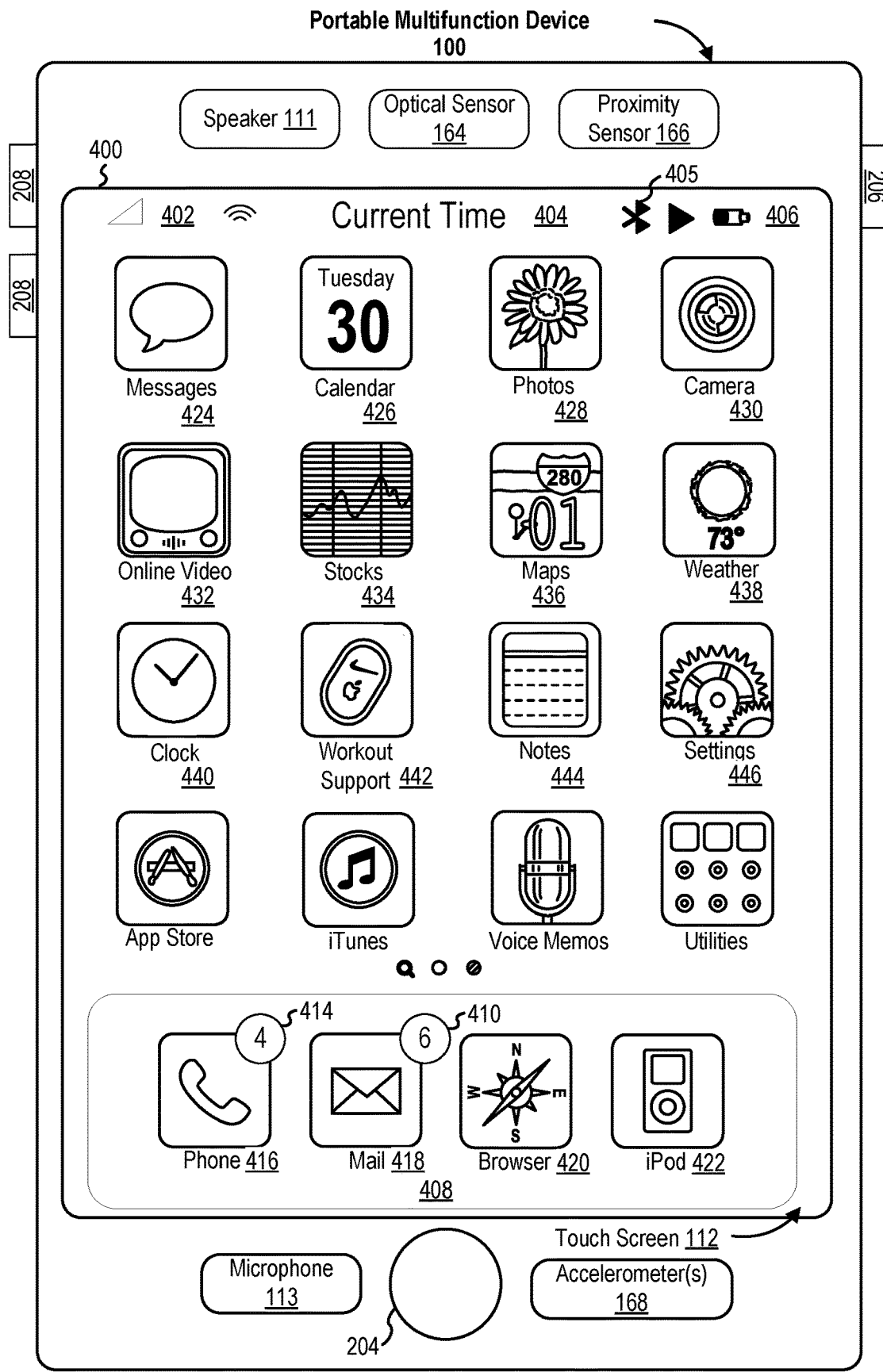
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
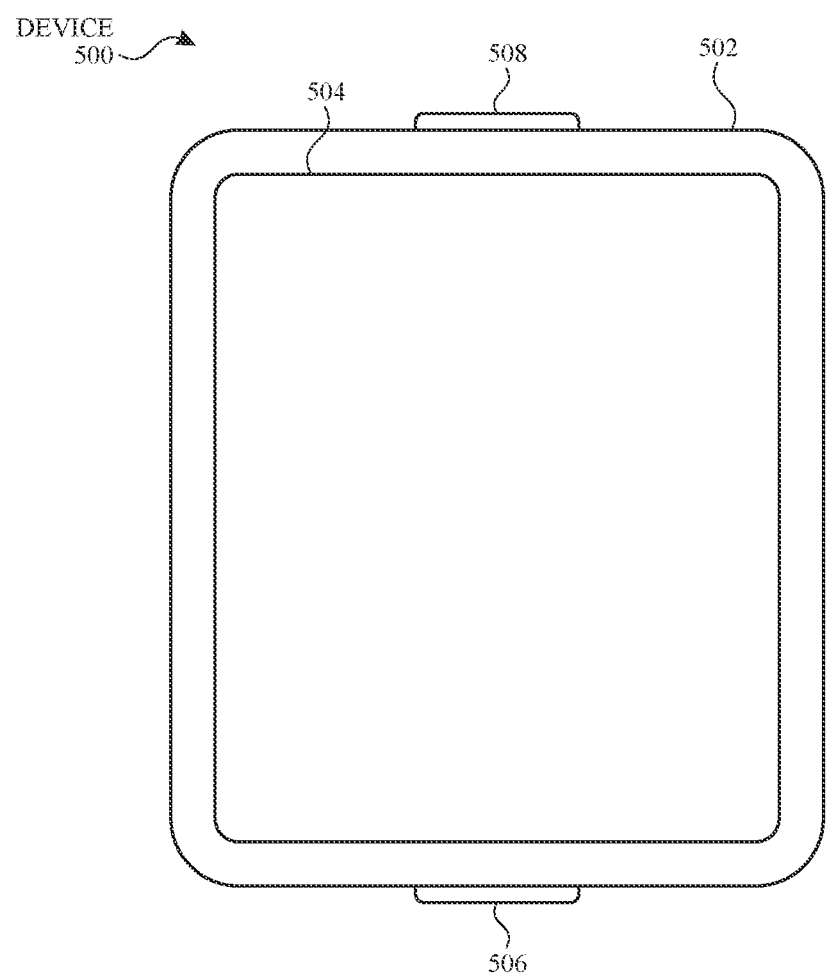
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
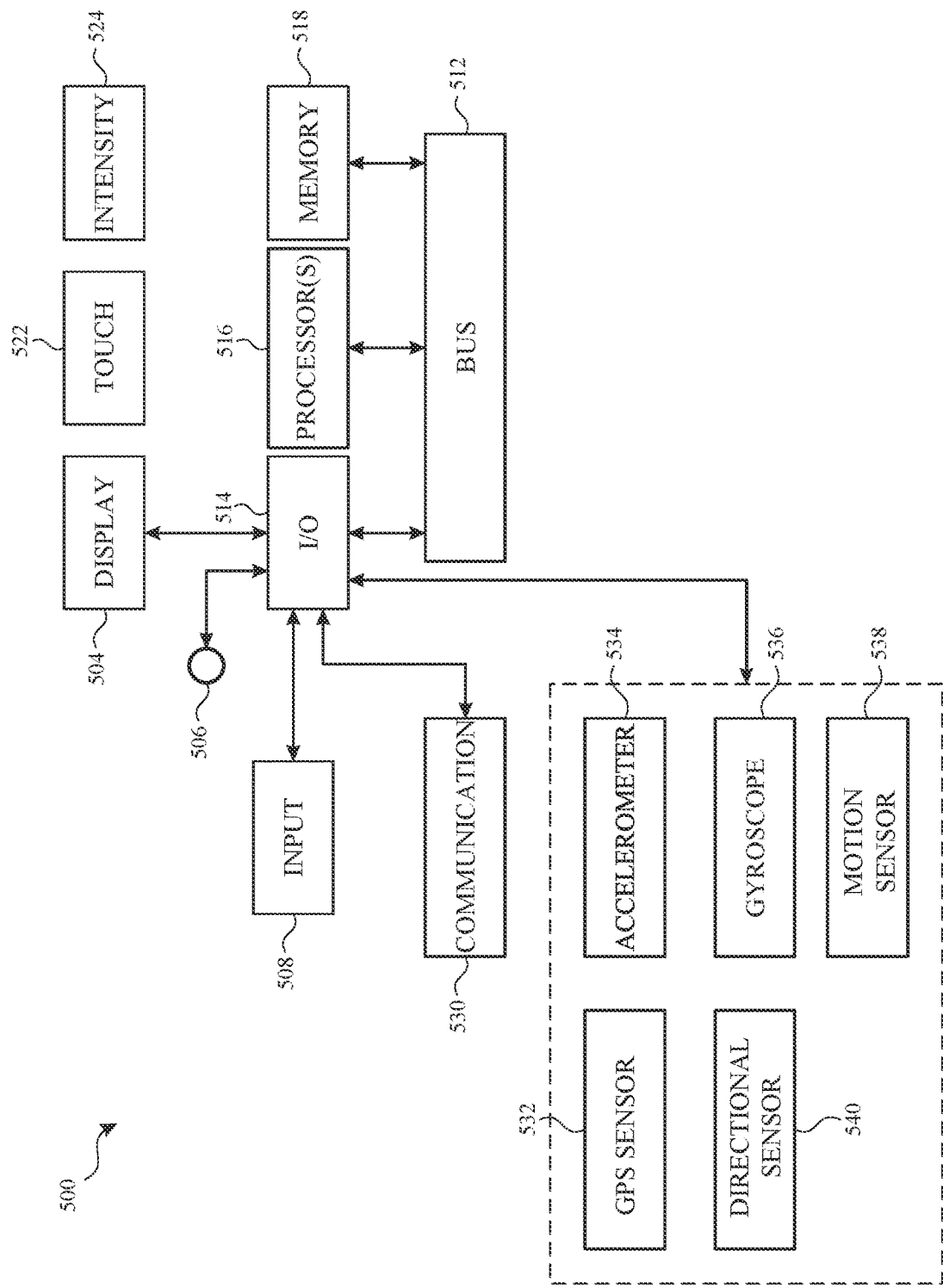
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100, 1300 (FIGS. 7A-7B, 9A-9B, 11, and 13A-13B). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5D:
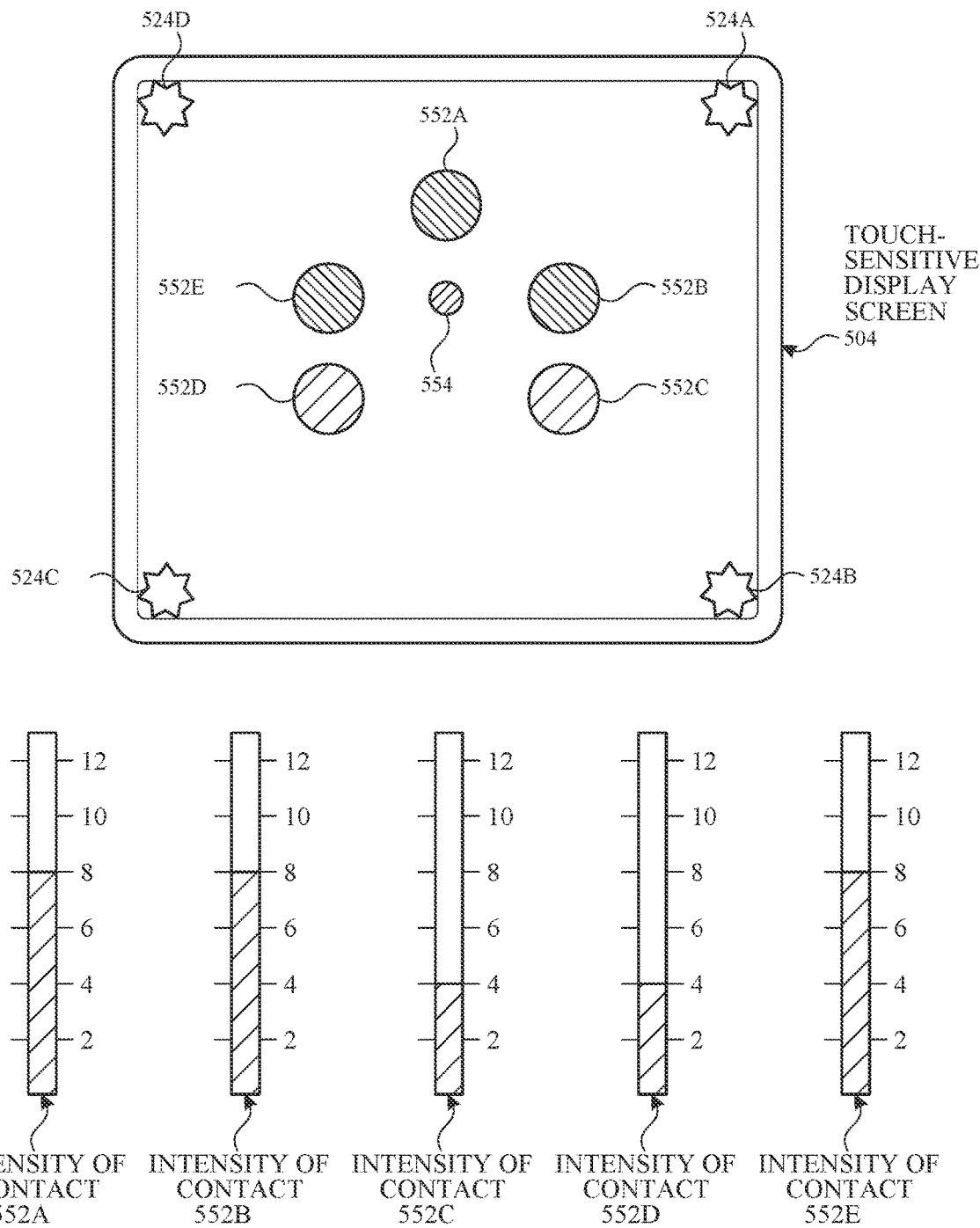

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity $I_j$ that is a portion of the aggregate intensity, A, in accordance with a predefined mathematical function, $I_j = A \cdot (D_j / \Sigma D_i)$, where $D_j$ is the distance of the respective contact j to the center of force, and $\Sigma D_i$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6O illustrate exemplary user interfaces depicting techniques for moving an insertion marker, in accordance with some embodiments. In some examples, an insertion marker indicates a location where additional content, if received, will be inserted. In other examples, an insertion marker is any visual indication on a user interface (e.g., a cursor or other user interface object that is movable via user input). The user interfaces in these figures are used to illustrate the processes described below, including the processes in FIGS. 7A-7B.

FIG. 6A depicts electronic device 600 displaying user interface 604 via touch-sensitive display device 602 at a first time. In some examples, electronic device 600 includes one or more features of devices 100, 300, or 500.

User interface 604 is depicted as corresponding to a notes application for entering and viewing content. In some examples, techniques described herein are implemented with other user interfaces (e.g., any user interface that displays content).

User interface 604 includes words 606 (e.g., "HELLO WORLD") and insertion marker 608. In some examples, words 606 are entered by a user using electronic device 600. For example, the user types the characters included in words 606 to cause words 606 to be displayed in user interface 604. In other examples, words 606 are provided in a different manner, such as when words 606 are included in a document being viewed on electronic device 600.

As depicted in FIG. 6A, electronic device 600 receives user input 610 corresponding to insertion marker 608. In one example, user input 610 is detected via touch-sensitive display device 602 as a finger press at a location corresponding to insertion marker 608. In some examples, user input 610 is another form of user input, including, for example, depression of a button on a pointing device such as a mouse.

In some examples, user input 610 corresponds to selection of insertion marker 608. In such examples, electronic device 600 determines that user input 610 corresponds to selection of insertion marker 608 by detecting that user input 610 remained at a location on touch-sensitive display device 602 corresponding to insertion marker 608 for an amount of time exceeding a threshold (sometimes referred to as a hold gesture).

In response to detecting user input 610, insertion marker 608 is selected and can be moved on touch-sensitive display device 602 by moving user input 610. In some examples, moving user input 610 in different directions causes different results (e.g., horizontal movement causes insertion marker 608 to be maintained within an area determined to be user input 610 until vertical movement over a threshold is received and vertical movement over the threshold causes insertion marker 608 to be moved outside an area determined to be user input 610), as further discussed below.

FIG. 6B depicts electronic device 600 displaying user interface 604 via touch-sensitive display device 602 at a second time after the first time. In FIG. 6B, user input 610 has moved horizontally to the right relative to where user input 610 was located in FIG. 6A. With such movement, insertion marker 608 is displayed in an area corresponding to user input 610. In some examples, insertion marker 608 is not displayed while user input 610 is detected (e.g., due to insertion marker 608 not needing to be displayed because a user's finger will be covering where insertion marker 608 would be displayed). While only illustrated as moving to the right, in some examples, insertion marker 608 would remain within the area corresponding to user input 610 when user input 610 is moved to the left and when moved up or down below a threshold.

FIG. 6C depicts electronic device 600 displaying user interface 604 via touch-sensitive display device 602 at a third time after the second time. In FIG. 6C, user input 610 has moved vertically relative to where user input 610 was located in FIG. 6B (e.g., in an upward direction). With such movement, insertion marker 608 is maintained at a location in words 606 (e.g., between the character "R" and the character "L"). Such functionality can be referred to as line stickiness, meaning that insertion marker 608 remains displayed on a line of text when user input has moved in a vertical direction below a threshold distance (in some examples, a non-zero threshold distance). In some examples, horizontal movement of insertion marker 608 in combination with vertical movement below the threshold distance causes insertion marker 608 to move horizontally in accordance with the horizontal movement.

FIG. 6D depicts electronic device 600 displaying user interface 604 via touch-sensitive display device 602 at a fourth time after the third time. In FIG. 6D, insertion marker 608 has been moved outside of an area determined to correspond to user input 610, to a location adjacent to the area determined to correspond to user input 610 (e.g., above the area determined to correspond to user input 610). In some examples, the area determined to correspond to user input 610 is determined based on a distance from a center point of user input 610.

While depicted as being above the area determined to correspond to user input 610, in some examples, insertion marker 608 is displayed in other locations outside of the area determined to correspond to user input 610. In some examples, insertion marker 608 is animated from a location as depicted in FIG. 6C to a location as depicted in FIG. 6D (e.g., insertion marker 608 is displayed at one or more locations between the location as depicted in FIG. 6C and the location as depicted in FIG. 6D). In other examples, insertion marker 608 is displayed at the location depicted in FIG. 6C and then, directly after, displayed at the location depicted in FIG. 6D (e.g., insertion marker 608 is not displayed at a location between the location as depicted in FIG. 6C and the location as depicted in FIG. 6D).

As depicted in FIG. 6D, insertion marker 608 is no longer displayed in a line of text but instead at a location relative to user input 610. This allows for a user to control where to place insertion marker 608 when the user releases user input 610.

FIG. 6E depicts electronic device 600 displaying user interface 604 via touch-sensitive display device 602 at a fifth time after the fourth time. In FIG. 6E, user input 610 has been moved vertically (e.g., downward) and horizontally (e.g., to the right) relative to as depicted in FIG. 6D. At the fifth time, insertion marker 608 remains above the area determined to correspond to user input 610. This illustrates that, once insertion marker 608 has been moved outside the area determined to correspond to user input 610, insertion marker 608 maintains a position relative to the area determined to correspond to user input 610 until liftoff of user input 610. For example, a horizontal or vertical movement of user input 610 would cause insertion marker 608 to remain outside of the area determined to correspond to user input 610 instead of moving within the area determined to correspond to user input 610 (as depicted in FIGS. 6A and 6B).

FIG. 6E further illustrates that, in some examples, second insertion marker 612 is displayed when insertion marker 608 exceeds a threshold distance away from content in user interface 604. In some examples, second insertion marker 612 is displayed at a closest point in the content (e.g., FIG. 6E depicts second insertion marker 612 after the character "D").

In another illustrative example, if insertion marker 608 was, for example, vertically aligned between the character "R" and the character "L," as depicted in FIG. 6D, and the distance from the characters "R" and "L" exceeds the threshold distance, second insertion marker 612 would be between the characters "R" and "L."

FIG. 6F depicts electronic device 600 displaying user interface 604 via touch-sensitive display device 602 at a sixth time after the fifth time. In FIG. 6F, user input 610 has been moved horizontally (e.g., to the left) relative to as depicted in FIG. 6E. At the sixth time, insertion marker 608 remains above the area determined to correspond to user input 610.

FIG. 6F further illustrates that, in some examples, second insertion marker 612 is no longer displayed when insertion marker 608 is less than the threshold distance away from content in user interface 604 (e.g., second insertion marker 612 is displayed in FIG. 6E and not in FIG. 6F). It should be recognized that techniques described herein might not include the functionality of second insertion marker 612 described in FIGS. 6E and 6F (e.g., a second insertion marker would never be displayed, no matter the distance from content).

FIG. 6G depicts electronic device 600 displaying user interface 604 via touch-sensitive display device 602 at a seventh time after the sixth time. In FIG. 6G, no user input is depicted (e.g., user input 610 has been liftoff of touch-sensitive display device 602). The liftoff of user input 610 causes insertion marker 608 to remain at a location between characters where it was located at the time that the liftoff occurred. For example, in FIG. 6F, insertion marker 608 is depicted after the character "D" in words 606. Then, in FIG. 6G, insertion marker 608 is depicted as remaining after the character "D" in words 606.

In some examples, an insertion marker (e.g., insertion marker 608) might not be located between characters when a user input (moving the insertion marker) is lifted off. In such examples, the insertion marker is inserted into content at a nearest location in content to the insertion marker when the user input is lifted off. Similar results occur when the insertion marker is not located exactly between two characters (e.g., the insertion marker might be a little up, a little down, or closer to one character than another).

FIG. 6H depicts electronic device 600 displaying user interface 604 via touch-sensitive display device 602 at an eighth time after the seventh time. In FIG. 6H, electronic device 600 receives user input 614 corresponding to selection of insertion marker 608. Similarly as described above, user input 614, in some examples, is a hold gesture. Also as discussed above, user input 614 can move laterally (e.g., to the left or to the right) while maintaining insertion marker 608 at a location corresponding to an area determined to be user input 614.

FIG. 6I depicts electronic device 600 displaying user interface 604 via touch-sensitive display device 602 at a ninth time after the eighth time. In FIG. 6I, user input 614 has moved vertically relative to where user input 614 was located in FIG. 6H (e.g., in a downward direction as opposed to an upward direction as depicted in FIG. 6C). With such movement, insertion marker 608 is maintained at a location in words 606 after the character "D." Such functionality can be referred to as line stickiness, meaning that insertion marker 608 remains displayed on a line of text when user input 614 has moved in a vertical direction below a threshold distance (in some examples, a non-zero threshold distance).

FIG. 6J depicts electronic device 600 displaying user interface 604 via touch-sensitive display device 602 at a tenth time after the ninth time. In FIG. 6J, insertion marker 608 is located outside of an area determined to correspond to user input 614, at a location adjacent to the area determined to correspond to user input 614 (e.g., above the area determined to correspond to user input 614). Unlike the situation discussed above for FIG. 6D, FIG. 6I depicts the situation where insertion marker 608 is located above the area determined to correspond to user input 614 without having to move insertion marker 608. Such functionality is accomplished because user input 614 is moving in a downward direction, revealing insertion marker 608 at the location adjacently above the area determined to correspond to user input 614. After insertion marker 608 is at the location adjacently above the area determined to correspond to user input 614, insertion marker 608 is maintained at the location adjacently above the area determined to correspond to user input 614.

In some examples, similar functionality as described above occurs if insertion marker 608 is maintained at different locations adjacent to the area determined to correspond to user input 614 (e.g., once an insertion marker is located at a maintaining position relative to user input, the insertion marker is maintained at the maintaining position when the user input is moved). For example, if insertion marker 608 is maintained at a location adjacently below the area determined to correspond to user input 614 (instead of adjacently above), insertion marker 608 is moved (e.g., animated) to the location adjacently below the area determined to correspond to user input 614 when user input 614 is in a downward direction (similar to as discussed above in FIG. 6D) and is maintained at the location adjacently below the area determined to correspond to user input 614 when user input 614 is in an upward direction (similar to as discussed above in FIG. 6I).

FIGS. 6K-6M depict electronic device 600 displaying user interface 604 via touch-sensitive display device 602 at an eleventh time after the tenth time. Across FIGS. 6J-6M, an animation is depicted when movement of user input 614 does not exceed a speed threshold, causing insertion marker 608 to be displayed such that it appears as if insertion marker 608 is moving sequentially (e.g., jumping) between characters to reach a location corresponding to user input 614. For example, FIG. 6J depicts user input 614 at a first location with insertion marker 608 directly above the area determined to correspond to user input 614. In FIG. 6J, insertion marker 608 is depicted after the character "D" in words 606.

FIG. 6K depicts user input 614 at a second location after moving at a speed less than the speed threshold. As depicted in FIG. 6K, insertion marker 608 has not maintained the same distance with user input 614 (e.g., a distance between insertion marker 608 and user input 614 has increased). Instead, FIG. 6K depicts insertion marker 608 maintaining its location after the character "D" in words 606.

FIG. 6L depicts insertion marker 608 displayed at a location corresponding to three character to the left relative to FIG. 6K (e.g., at a location between where insertion marker 608 was located in FIG. 6K and a location corresponding to user input 614). In particular, insertion marker 608 is located between the character "O" and the character "W" in words 606 in FIG. 6L.

Then, FIG. 6M depicts insertion marker 608 displayed at a location directly adjacent to user input 614 (e.g., maintaining the same distance from user input 614 as depicted in FIG. 6J, before movement of user input 614 depicted in FIG. 6K). In some examples, instead of iterating by three characters, insertion marker 608 iterates by one character or a number of characters other than three (e.g., a word, a fixed number of characters, percentage of characters included between a beginning and end location, or the like). In some examples, when movement of user input 614 exceeds the speed threshold, insertion marker 608 is displayed in locations maintaining a distance between insertion marker 608 and user input 614 such that it appears to a user that insertion marker 608 is maintained with user input 614, and does not iterate between characters.

FIG. 6N depicts electronic device 600 displaying user interface 604 via touch-sensitive display device 602 at a twelfth time after the eleventh time. In FIG. 6N, user input 614 has been liftoff of touch-sensitive display device 602. The liftoff of user input 614 causes insertion marker 608 to remain at a location between characters where it was located at the time that the liftoff occurred. For example, in FIG. 6M, insertion marker 608 is depicted between the character "L" and the character "L" in words 606. Then, in FIG. 6N, insertion marker 608 is depicted as remaining between the character "L" and the character "L" in words 606.

FIG. 6N further depicts electronic device 600 receiving user input 616 corresponding to a location not corresponding to insertion marker 608 (e.g., a location other than where insertion marker 608 is located). User input 616 includes movement to the right relative to an initial position of user input 616. In one example, user input 616 is detected via touch-sensitive display device 602 as a finger swipe on touch-sensitive display device 602. In some examples, user input 616 can be other forms of user input, including, for example, depression of a button on a pointing device (such as a mouse) and movement of the pointing device. User input 616 causes a scroll operation to be performed, as depicted in FIG. 6O.

FIG. 6O depicts electronic device 600 displaying user interface 604 via touch-sensitive display device 602 at a thirteenth time after the twelfth time. In FIG. 6O, content displayed in user interface 604 has been shifted (e.g., scrolled or moved) to the right. Such functionality is performed as result of user input being initiated at a location not corresponding to insertion marker 608. In some examples, the user input must be initiated at a location within content being shifted for such functionality (e.g., no on a displayed keyboard or other content). In some examples, while shifting user interface 604, insertion marker remains between the character "L" and the character "L" in words 606.

FIGS. 6A-6O depict that no overlay (e.g., a magnifying overlay that is positioned adjacent to an area determined to be a user input with a magnified view of what is under the user input) is used to show content under a user input.

FIGS. 7A-7B illustrate a flow diagram of a method for moving an insertion marker using an electronic device, in accordance with some embodiments. Method 700 is performed at a device (e.g., 100, 300, 500, 600) (e.g., a mobile device) with a touch-sensitive display device. Some operations in method 700 are, optionally, combined, the orders of some operations are, optionally, changed, and some operations are, optionally, omitted.

As described below, method 700 provides an intuitive way for moving an insertion marker. The method reduces the cognitive burden on a user for moving an insertion marker, thereby creating a more efficient human-machine interface. For battery-operated computing devices, enabling a user to move an insertion marker faster and more efficiently conserves power and increases the time between battery charges.

The electronic device displays (702), via the touch-sensitive display device, a focus indicator (e.g., a cursor or a text insertion marker) at a first indicator location (e.g., 608, as depicted in FIG. 6A) on the touch-sensitive display device.

While displaying the focus indicator at the first indicator location, the electronic device detects (704) a touch gesture (e.g., a hold on the focus indicator) (e.g., 610, as depicted in FIG. 6A) at a first touch location (e.g., a location that is the same, or near, the first indicator location) that corresponds to the focus indicator.

While continuing to detect the touch gesture on the touch-sensitive display device, the electronic device detects (706) movement of the touch gesture to a second touch location (e.g., location in FIGS. 6B, 6C, or 6D) that is different from the first touch location.

In response to (708) detecting the movement of the touch gesture to the second touch location, in accordance with a determination that the second touch location is in a first direction relative to the first touch location (e.g., a horizontal direction), the electronic device moves (710) (e.g., repositions) (e.g., while displaying an animation of the indicator moving) the focus indicator to a second indicator location (e.g., FIG. 6B) that has a first spatial relationship to the second touch location (e.g., the second indicator location is at the second touch location; the second indicator location is a predetermined distance (and predetermined direction) from the second touch location).

In response to (708) detecting the movement of the touch gesture to the second touch location, in accordance with a determination that the second touch location is in a second direction (e.g., different from the first direction, such as an upward direction) relative to the first touch location, the electronic device moves (712) the focus indicator to a third indicator location that has a second spatial relationship, different from the first spatial relationship, to the second touch location (e.g., FIG. 6D).

While the focus indicator is at a fourth indicator location (e.g., the second indicator location or the third indicator location) (e.g., FIG. 6F), the electronic device detects (714) liftoff of the touch gesture.

In response to detecting the liftoff, the electronic device maintains (716) display of the focus indicator at the fourth indicator location (e.g., FIG. 6G).

Selectively moving a focus indicator based on the direction of a gesture relative to a first touch location allows a user to intuitively and efficiently control the manner in which the focus indicator is moved. Allowing a user to move a focus indicator in this manner decreases the number of inputs and amount of time needed for the user to operate the electronic device (e.g., by helping the user provide proper inputs and reducing user mistakes when operating/interacting with the device), which, additionally, reduces power usage and improves battery life of the device.

In some embodiments, the touch-sensitive display has an upper edge and a lower edge (722). In some embodiments, in response to (718) detecting the movement of the touch gesture to the second touch location, in accordance with a determination that the second touch location is in a third direction (e.g., the first direction; a direction towards the upper edge of the display; an upwards direction) relative to the first touch location that is towards (e.g., directly towards; along an axis perpendicular to the upper edge of the display) the upper edge of the touch-sensitive display, the electronic device moves (720) (e.g., repositions) (e.g., without displaying an animation of the indicator moving) the focus indicator in the third direction to a fourth indicator location that is a first predetermined distance closer to the upper edge of the touch-sensitive display than the second touch location (e.g., moving the focus indicator in the third direction) (e.g., FIGS. 6B-6D). In some embodiments, the focus indicator is moved to a position along a vertical axis that is closer to the upper edge than the second touch location of the touch gesture. In some embodiments, movement of the focus indicator occurs with an animation of the indicator transitioning from the first indicator location to the third indicator location (e.g., the indicator jumps to the third location, directly).

In some embodiments, the touch-sensitive display has an upper edge and a lower edge. In some embodiments, in response to detecting the movement of the touch gesture to the second touch location, in accordance with a determination that the second touch location is in a fourth direction (e.g., the first direction; a direction that is substantially opposite of the third direction; a direction towards the lower edge of the display; a downward direction) relative to the first touch location that is towards (e.g., directly towards; along an axis perpendicular to the upper edge of the display) the lower edge of the touch-sensitive display and a determination that the second touch location is greater than a second predetermined distance (e.g., a distance substantially equal to the diameter of the contact area) from the first touch location, the electronic device moves (e.g., repositions) (e.g., without displaying an animation of the indicator moving) the focus indicator to a fifth indicator location that is along an axis perpendicular to the upper edge of the touch-sensitive display and that is a third predetermined distance (e.g., the first predetermined distance) closer to the upper edge than the second touch location (e.g., FIGS. 6H-6J). In some embodiments, in response to detecting the movement of the touch gesture to the second touch location, in accordance with a determination that the second touch location is in the fourth direction and a determination that the second touch location is less than the second predetermined distance from the first touch location, the electronic device moves (e.g., repositions) (e.g., without displaying an animation of the indicator moving) the focus indicator in the fourth direction to a sixth indicator location that is less than the third predetermined distance closer to the upper edge than the second touch location (e.g., the sixth indicator location is substantially the same as the second touch location).

In some embodiments, while displaying the focus indicator at the third indicator location, the electronic device detects movement of the touch gesture in a fifth direction parallel to the upper edge of the touch-sensitive display (e.g., a horizontal direction; left or right) to a third touch location. In some embodiments, in response to detecting movement of the touch gesture to the third touch location, the electronic device moves the focus indicator in the fifth direction to a seventh indicator location (e.g., a location that is along the same axis parallel to the upper edge of the display as the third indicator location) that is the first predetermined distance closer to the upper edge of the touch-sensitive display than the third touch location (e.g., FIG. 6E to FIG. 6F).

In some embodiments, the touch-sensitive display has an upper edge and a lower edge. In some embodiments, the first direction is parallel to the upper edge of the touch-sensitive display (e.g., a horizontal direction; left or right). In some embodiments, the first spatial relationship includes being a first distance (e.g., substantially zero distance; a fourth predetermined distance) from the second touch location. In some embodiments, while displaying the focus indicator at the second indicator location, the electronic device detects movement of the touch gesture in a sixth direction that is along an axis perpendicular to the upper edge of the touch-sensitive display (e.g., a horizontal direction; left or right) to a fourth touch location. In some embodiments, in response to detecting movement of the touch gesture to the fourth touch location, the electronic device moves the focus indicator in the sixth direction to an eighth indicator location (e.g., a location that is along the same axis parallel to the upper edge of the display as the third indicator location; a location that is closer to the upper edge of the display than the fourth touch location) that is greater than the first distance (e.g., a fifth predetermined distance) from the fourth touch location (e.g., FIG. 6M to 6N).

In some embodiments, the first spatial relationship includes: in accordance with a determination that the movement of the touch gesture to the second touch location has a first speed and a first movement distance, the second indicator location being a fourth predetermined distance from the second touch location; and in accordance with a determination that the movement of the touch gesture to the second touch location has a second speed, less than the first speed, and the first movement distance (e.g., the gesture moves the same distance, but at a slower speed), the second indicator location being a fifth predetermined distance from the second touch location that is greater than the fourth predetermined distance. In some embodiments, when the movement speed of the gesture is slower, the spatial separation between the location of the moved indicator and the touch location is greater than if the movement speed of the gesture was faster (e.g., FIGS. 6J-6M).

Moving a focus indicator based on the speed and movement distance of a gesture allows a user to intuitively and efficiently control the manner in which the focus indicator is moved. For example, a gesture having a relatively high speed can move the focus indicator a greater distance than a gesture having a relatively low speed. Allowing a user to move a focus indicator in this manner decreases the number of inputs and amount of time needed for the user to operate the electronic device (e.g., by helping the user provide proper inputs and reducing user mistakes when operating/ interacting with the device), which, additionally, reduces power usage and improves battery life of the device.

In some embodiments, as part of displaying the focus indicator (e.g., a positional focus indicator (e.g., a ghost indicator)) that follows the movement of the touch gesture) at the first indicator location, the electronic device displays a first text content (e.g., a body of text; a paragraph of text; a structured text document). In some embodiments, the first indicator location corresponds to a first text insertion position (e.g., a logical position (e.g., that is not visually distinguishable at all times) between two characters of the first text where newly entered text will be inserted into the first text content) at a first text insertion location in the first text content (In some embodiments, at certain points in time, the first indicator location is at the first text insertion location. In some embodiments, at other points in time, the first indicator location is not at the first text insertion location). In some embodiments, the focus indicator is moved to the second indicator location in response to detecting the movement of the touch gesture to the second touch location. In some embodiments, in response to detecting the movement of the touch gesture to the second touch location, the electronic device moves the first text insertion position from the first text insertion location to a second text insertion location (e.g., changing the position at which newly entered text will be entered in the first text content). In some embodiments, in response to detecting the movement of the touch gesture to the second touch location, in accordance with a determination that the second indicator location is separated from the second text insertion location by greater than a fifth predetermined distance, the electronic device displays a visual indication (e.g., 612) of the text insertion position at the second text insertion location (e.g., in addition to displaying the focus indicator at the second indicator location). In some embodiments, in response to detecting the movement of the touch gesture to the second touch location, in accordance with a determination that the second indicator location is separated from the second text insertion location by less than the fifth predetermined distance, the electronic device forgoes displaying a visual indication of the text insertion position at the second text insertion location (e.g., the text insertion position is not visible/visually distinguishable) (e.g., FIG. 6E).

In some embodiments, the electronic device displays, via the touch-sensitive display device, content. In some embodiments, the electronic device detects a second touch gesture (e.g., 616) starting at a fifth touch location (e.g., prior to detecting the touch gesture; after detecting the touch gesture) that includes a component of movement. In some embodiments, in response to detecting the second touch gesture, in accordance with a determination that the fifth touch location does not correspond to the focus indicator, the electronic device scrolls the content (e.g., FIG. 6O). In some embodiments, in response to detecting the second touch gesture, in accordance with a determination that the fifth touch location corresponds to the focus indicator, the electronic device forgoes scrolling the content. In some embodiments, the second gesture causes the movement of the focus indicator, according to the methods discussed herein, without scrolling the content.

In some embodiments, a distance between the third indicator location and the second touch location is more than a distance between the second indicator location and the second touch location (e.g., FIG. 6M to 6N).

In some embodiments, the touch-sensitive display has an upper edge and a lower edge wherein the third indicator location is closer to the upper edge of the touch-sensitive display than the second touch location.

Note that details of the processes described above with respect to method 700 (e.g., FIGS. 7A-7B) are also applicable in an analogous manner to the methods described below. For example, method 700 optionally includes one or more of the characteristics of the various methods described below with reference to method 900. For example, an insertion marker may be moved according to method 700 before selecting a word according to method 900. For example, method 700 optionally includes one or more of the characteristics of the various methods described below with reference to method 1100. For example, an insertion marker may be moved according to method 700 before selecting a word according to method 1100. For example, method 700 optionally includes one or more of the characteristics of the various methods described below with reference to method 1300. For example, an insertion marker may be moved according to method 700 before deleting a paragraph according to method 1300. For brevity, these details are not repeated below.

FIGS. 8A-8K illustrate exemplary user interfaces depicting techniques for selecting content, in accordance with some embodiments. The user interfaces in these figures are used to illustrate the processes described below, including the processes in FIGS. 9A-9B.

Figure 8A:
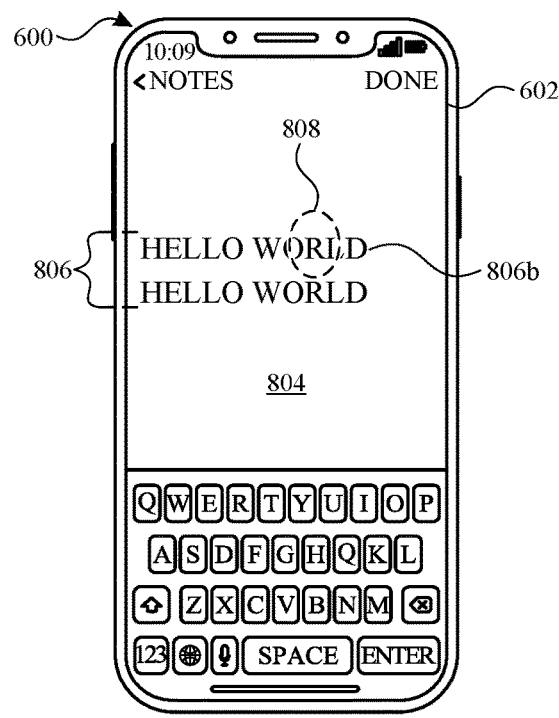
FIGS. 8A-8K illustrate exemplary user interfaces depicting techniques for selecting content, in accordance with some embodiments.
Figure 9A:
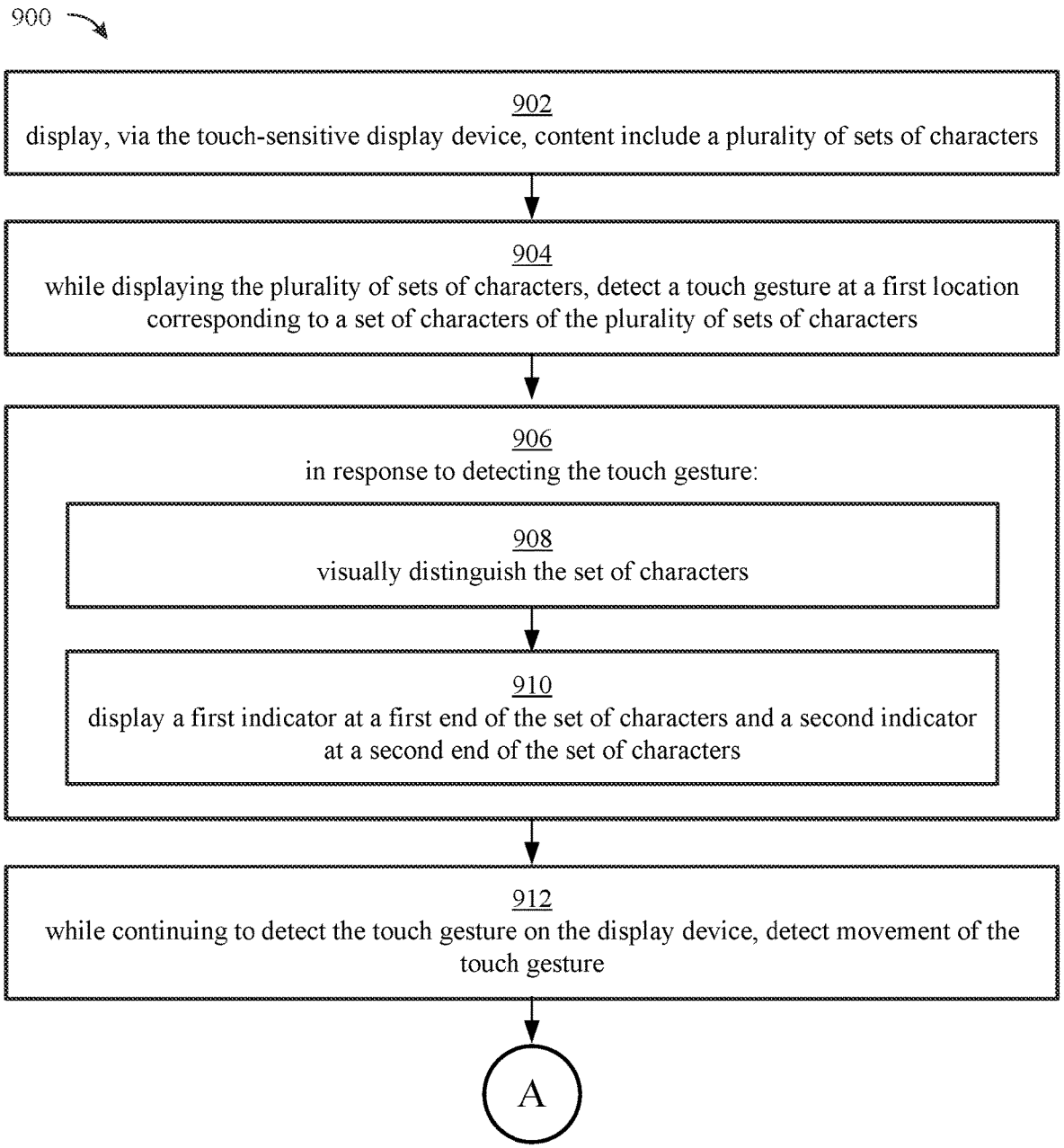
FIGS. 9A-9B illustrate a flow diagram for a method of selecting content using an electronic device in accordance with some embodiments.
Figure 9B:
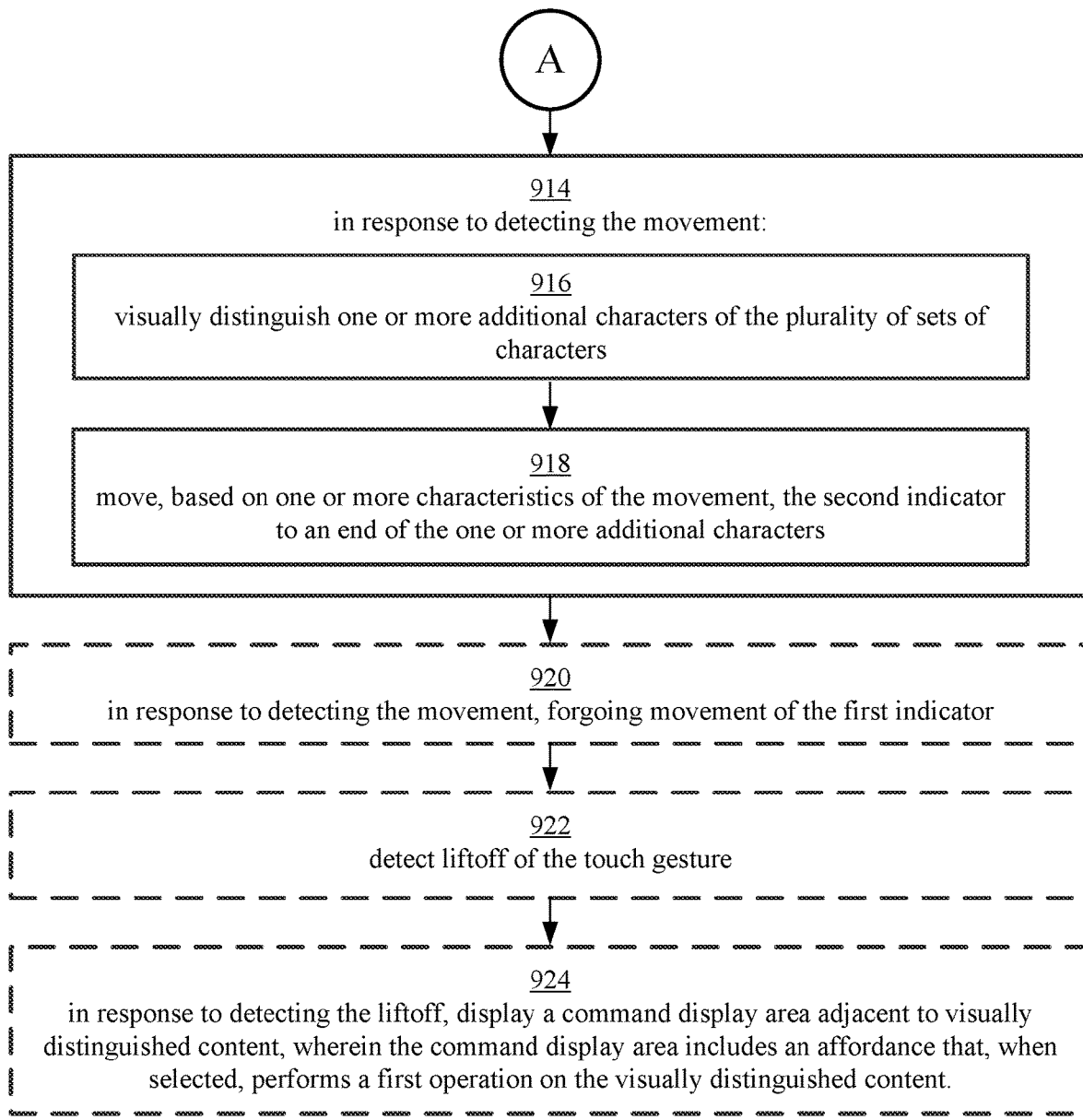

FIG. 8A depicts electronic device 600 displaying user interface 804 via touch-sensitive display device 602 at a first time. Similar to user interface 604, user interface 804 corresponds to a notes application for entering and viewing content. In some examples, techniques described herein are implemented with different user interfaces (e.g., any user interface that displays content).

User interface 804 includes words 806 (e.g., "HELLO WORLD HELLO WORLD"). In some examples, words 806 are entered by a user using electronic device 600. For example, the user can type the characters included in words 806 to cause words 806 to be displayed in user interface 804. In other examples, words 806 are provided in a different manner, such as when words 806 are included in a document being viewed on electronic device 600.

As depicted in FIG. 8A, electronic device 600 receives user input 808 corresponding to word 806*b* (e.g., "WORLD"). In one example, user input 808 is detected via touch-sensitive display device 602 as a finger gesture (e.g., a double tap gesture or a hold gesture) on touch-sensitive display device 602 at a location corresponding to word 806*b*. In some examples, a double tap gesture is required when first criteria are met (e.g., in an editable mode, where a user is able to add and remove content) and a hold gesture is required when second criteria are met (e.g., in a reading mode, where a user is able to view but not add/remove content). In some examples, user input 808 is another form of user input, including, for example, depression of a button on a pointing device such as a mouse.

In some examples, user input 808 corresponds to selection of word 806*b*. In such examples, electronic device 600 determines that user input 808 corresponds to selection of word 806*b* by detecting that user input 808 includes multiple user inputs (e.g., two) at a location on touch-sensitive display device 602 corresponding to word 806*b* (sometimes referred to as a double tap with a hold after the second tap) or a single user input that remained at the location for an amount of time exceeding a threshold (sometimes referred to as a hold gesture). In response to detecting user input 808, word 806*b* is selected, as depicted in FIG. 8D and further discussed below.

Figure 8B:
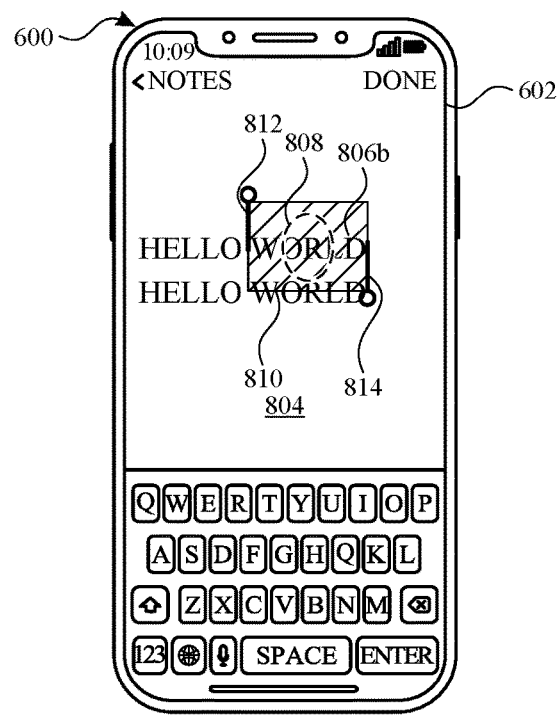
Figure 8C:
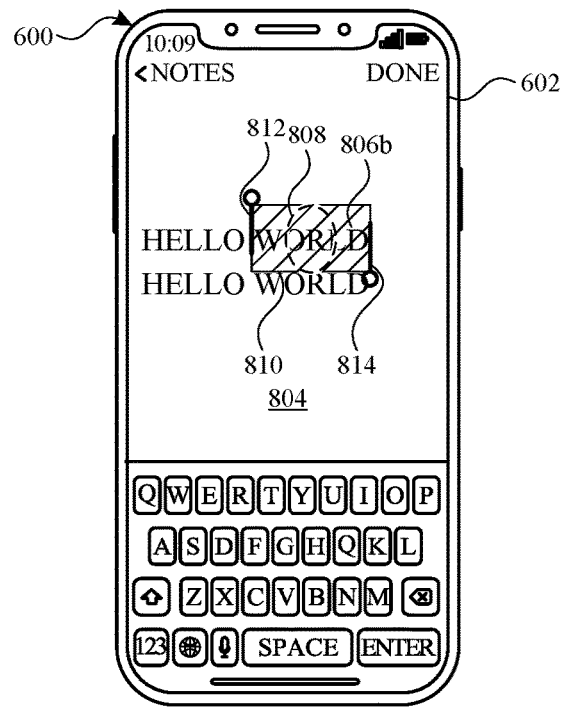
Figure 8D:
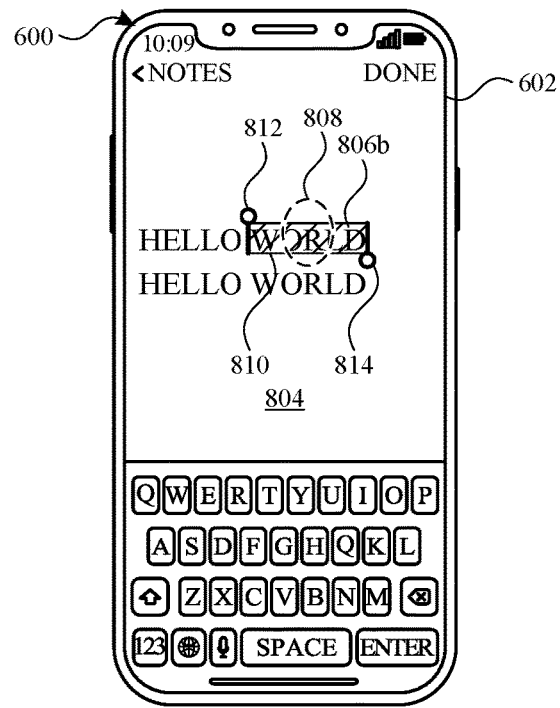

FIGS. 8B-8D depict electronic device 600 displaying user interface 804 via touch-sensitive display device 602 at a second time after the first time. Across FIGS. 8B-8D, an animation is depicted that is performed in response to detecting user input 808, causing word 806*b* to appear to be selected. The animation begins with a selection area (e.g., selection area 810) at an initial size and continues until the selection area is at a final size smaller than the initial size. For example, FIG. 8B depicts selection area 810 at a first size, the first size larger than an area determined to be user input 808 such that selection area 810 can be easily seen around user input 808. In some examples, selection area 810 initially includes content that will not be included when the animation is finished (not illustrated). In some examples, an area within selection area 810 is visually distinct (e.g., a different color or pattern) from other areas.

FIG. 8B further depicts start indicator 812 at a first side of selection area 810 and end indicator 814 at a second side of selection area 810, the second side opposite to the first side. Start indicator 812 and end indicator 814 indicate a beginning and an end of selection area 810 (respectively) and provide a visual indication where a user can touch to modify the size of selection area 810 and what is selected.

FIGS. 8C and 8D depict selection area 810 shrinking to a second size (in FIG. 8C, smaller than the first size) and then to a third size (in FIG. 8D, smaller than the second size). FIGS. 8C and 8D also depict start indicator 812 and end indicator 814 shrinking from a size depicted in FIG. 8B to a size depicted in FIG. 8D. In some examples start indicator 812 and end indicator 814 begin at the size depicted in FIG. 8D (either when selection area 810 is the first size (as depicted in FIG. 8B) or the third size (as depicted in FIG. 8D). In some examples, while FIGS. 8B-8D depict that user input 808 is maintained throughout the animation, user input 808 is released (e.g., liftoff or finished) before the animation beginning, at a time approximate to the animation beginning, or at some time after the animation begins.

Figure 8E:
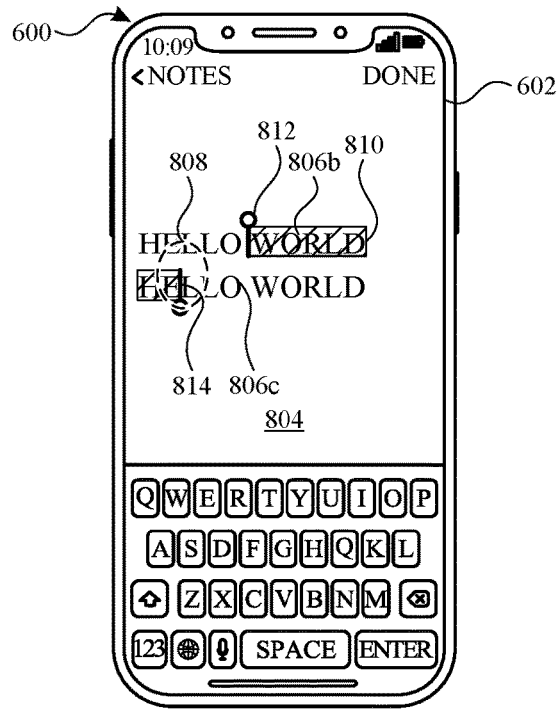

FIG. 8E depicts electronic device 600 displaying user interface 804 via touch-sensitive display device 602 at a third time after the second time. In FIG. 8E, user input 808 has moved horizontally to the right relative to where user input 808 was located in FIGS. 8A-8D. With such movement, electronic device 600 switches to a highlighter mode, where a location of user input 808 determines what is selected. For example, in FIG. 8E, user input 808 has moved to a location between the character "E" and the character "L" in word 806*c* causing word 806*b* and characters "H" and "E" of word 806*c* to be indicated as selected (e.g., selection area 810 encompasses such characters). As additional characters are selected to the right, start indicator 812 remains stationary while end indicator 814 moves with user input 808, to visually represent that the location of user input 808 represents where a user is dragging end indicator 814. In some examples, as additional characters are selected to the left, end indicator 814 remains stationary while start indicator 812 moves with user input 808, to visually represent that the location of user input 808 represents where a user is dragging start indicator 812.

In some examples, the switch to highlighter mode occurs when user input 808 passes an indicator (e.g., start indicator 812 or end indicator 814). In other examples, the switch to highlighter mode occurs when user input 808 moves over a highlighter threshold (e.g., a non-zero amount of distance from a start location of user input 808).

Figure 8F:
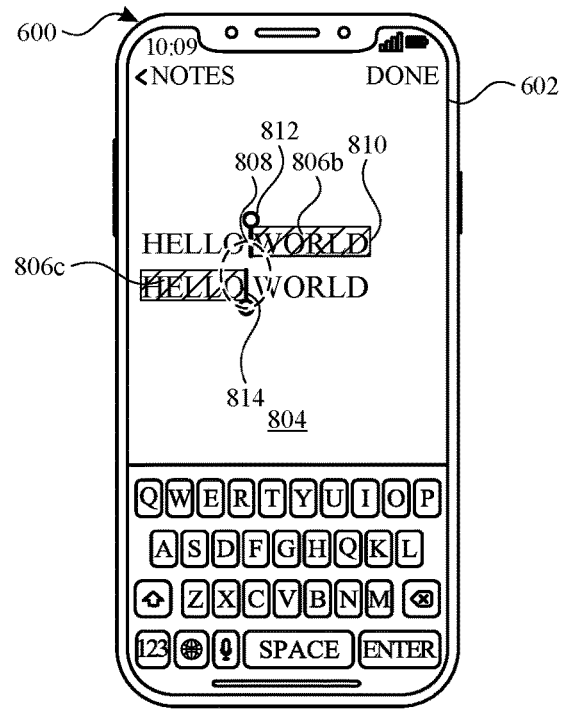

FIG. 8F depicts electronic device 600 displaying user interface 804 via touch-sensitive display device 602 at a fourth time after the third time. From the first time to the fourth time, user input 808 has remained in contact with touch-sensitive display device 602 (e.g., electronic device 600 has not detected liftoff of user input 808) (sometimes referred to as a single gesture). In FIG. 8F, user input 808 has moved horizontally to the right relative to where user input 808 was located in FIG. 8E. In particular, user input 808 has moved to a location between the character "O" in word 806c and the character "W" in word 806d, causing word 806b and word 806c to be indicated as selected (e.g., selection area 810 encompasses such characters).

In some examples, when user input 808 is moved horizontally to the left relative to where user input 808 was located in FIG. 8E, selection continues to reduce until either one character is selected (e.g., the character "W" in word 806b), no characters are selected (e.g., start indicator 812 and end indicator 814 overlap), or characters to the left of start indicator 812 are selected with start indicator 812 treated as the end of selected text (e.g., if user input 808 is moved to before the character "H" in word 806a, word 806a would be indicated as selected (e.g., selection area 810 encompasses the characters of word 806a)).

Figure 8G:
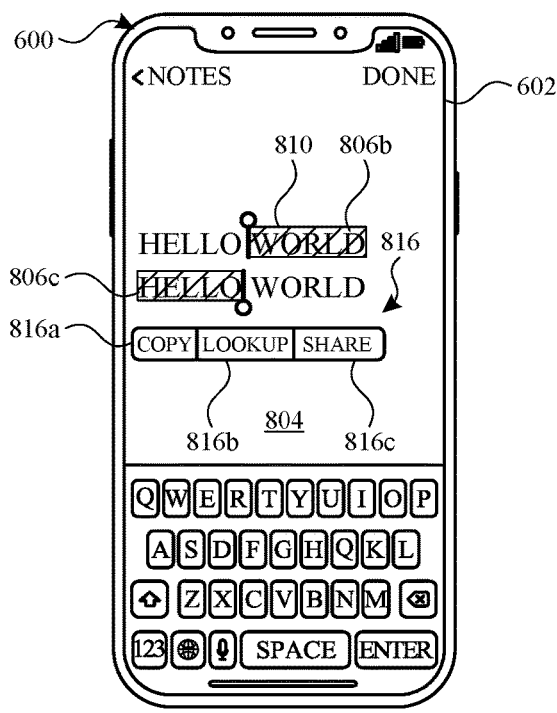

FIG. 8G depicts electronic device 600 displaying user interface 804 via touch-sensitive display device 602 at a fifth time after the fourth time. In FIG. 8G, no user input is depicted (e.g., user input 808 has been liftoff of touch-sensitive display device 602).

As depicted in FIG. 8G, liftoff of user input 808 causes selection area 810, start indicator 812, and end indicator 814 to remain where they were located at the time of liftoff (e.g., as depicted in FIG. 8F). For example, in FIG. 8F: start indicator 812 is located before the character "W" in word 806b, end indicator 814 is located after the character "O" in word 806c, and selection area 810 extends from start indicator 812 to end indicator 814 (encompassing the characters in word 806b and word 806c). Then, in FIG. 8G: start indicator 812 is depicted as remaining before the character "W" in word 806b, end indicator 814 is depicted as remaining after the character "O" in word 806c, and selection area 810 is depicted as remaining from start indicator 812 to end indicator 814 (encompassing the characters in word 806b and word 806c).

FIG. 8G further depicts user interface 804 including command area display 816 adjacent to selection area 810. In some examples, command area display 816 is displayed in response to detecting liftoff of user input 808 (e.g., when a liftoff has occurred while at least one character is indicated as selected).

Command area display 816 includes multiple affordances, each affordance corresponding to a different operation to be performed on currently-selected characters. In FIG. 8G, command area display 816 includes copy affordance 816a, lookup affordance 816b, and share affordance 816c. In some examples, command area display 816 includes more, less, and/or different affordances than depicted in FIG. 8G.

Copy affordance 816a, when selected (e.g., electronic device 600 receiving user input corresponding to copy affordance 816a), causes the currently-selected characters (e.g., "WORLD HELLO," as depicted in FIG. 8G) to be copied so that the currently-selected characters can be later pasted (e.g., inserted) at a location identified by a user. Lookup affordance 816b, when selected (e.g., electronic device 600 receiving user input corresponding to lookup affordance 816b), causes the currently-selected characters (e.g., "WORLD HELLO," as depicted in FIG. 8G) to be searched using a search engine, in one example, to identify a definition for the currently-selected characters. Share affordance 816c, when selected (e.g., electronic device 600 receiving user input corresponding to share affordance 816c), causes the currently-selected characters (e.g., "WORLD HELLO," as depicted in FIG. 8G) to be inserted into a message to be sent to a different device.

Figure 8H:
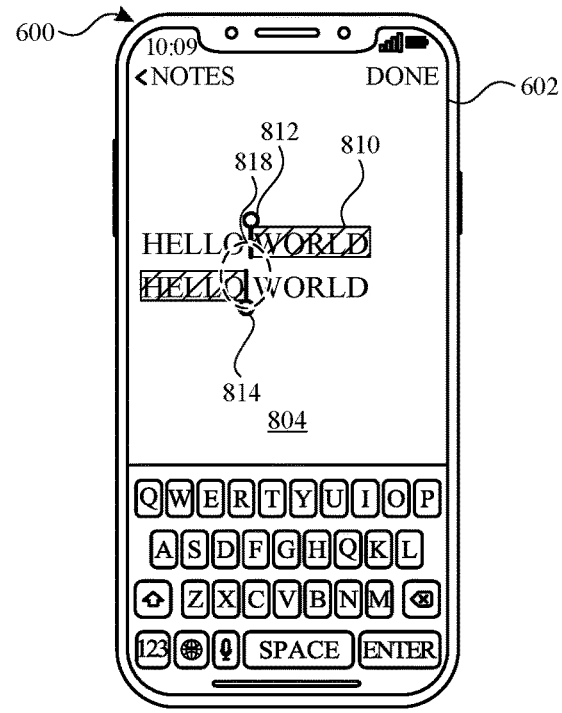

FIG. 8H depicts electronic device 600 displaying user interface 804 via touch-sensitive display device 602 at a sixth time after the fifth time. As depicted in FIG. 8H, electronic device 600 receives user input 818 corresponding to end indicator 814. In one example, user input 818 is detected via touch-sensitive display device 602 as a finger press on touch-sensitive display device 602 at a location corresponding to end indicator 814. In some examples, user input 818 is another form of user input, including, for example, depression of a button on a pointing device such as a mouse.

In some examples, user input 818 corresponds to selection of end indicator 814. In such examples, electronic device 600 determines that user input 818 corresponds to selection of end indicator 814 by detecting that user input 818 remained at a location on touch-sensitive display device 602 corresponding to end indicator 814 for an amount of time exceeding a threshold (sometimes referred to as a hold gesture). In response to detecting user input 818, end indicator 814 is selected and can be moved to change what is selected, as depicted in FIG. 8I.

Figure 8I:
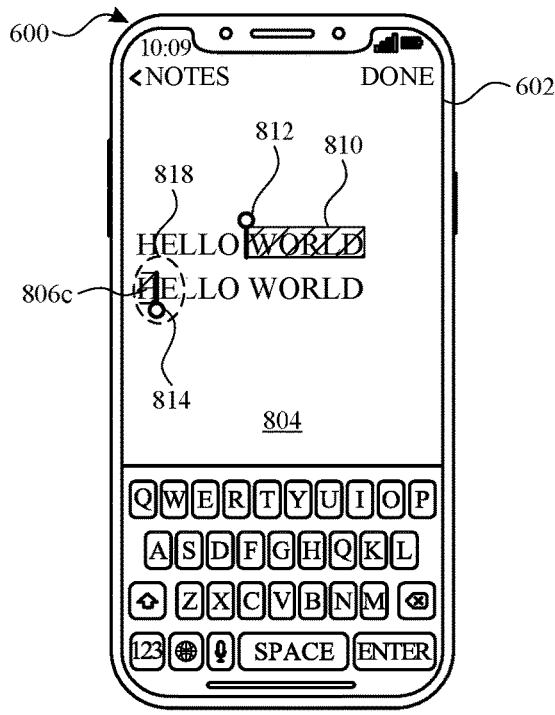
Figure 8J:
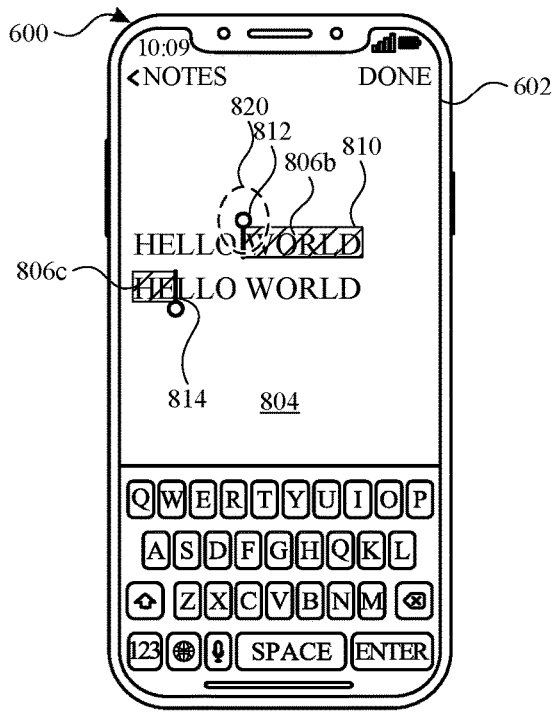
Figure 8K:
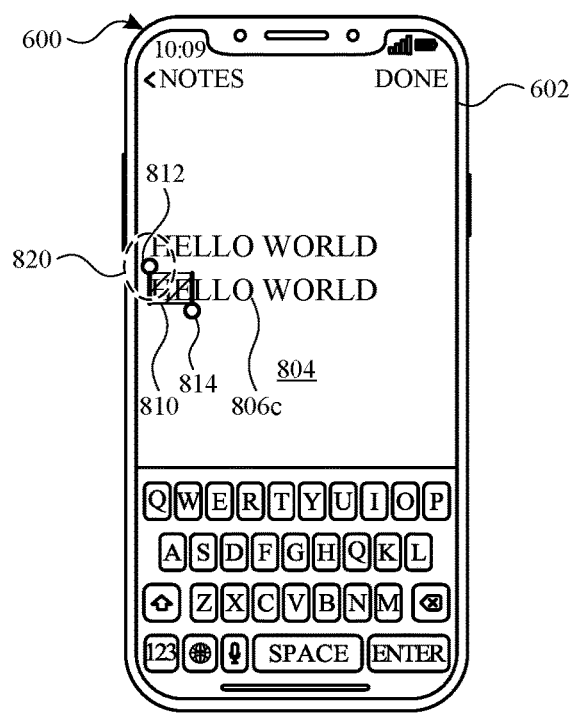

FIG. 8I depicts electronic device 600 displaying user interface 804 via touch-sensitive display device 602 at a seventh time after the sixth time. In FIG. 8I, user input 818 has moved horizontally to the left relative to where user input 818 was located in FIG. 8H. With such movement, selection area 810 is modified to depict that different content is being selected. For example, in FIG. 8I, user input 818 has moved to a location between the character "H" and the character "E" in word 808c, causing end indicator 814 to be located at the location, start indicator 812 to remain before the character "W" in word 806b, and selection area 810 to encompass content between the character "W" in word 806b and the character "E" in word 806c (e.g., word 806b and the character "H" in word 806c). As different characters are selected by moving user input 818, start indicator 812 remains stationary while end indicator 814 moves based on user input 818, to visually represent that the location of user input 818 represents where a user is dragging end indicator 814. Moving end indicator 814 as depicted in FIG. 8I can perform similarly to as described above for FIG. 8E. FIGS. 8J-8K depict similar functionality to when start indicator 812 is selected.

In some examples, simultaneous, distinct user inputs cause a selection mode to be activated, where the selection mode causes content to be selected with movement. For example, a first user input can correspond to activation of a key (on a physical keyboard) or an affordance (in a virtual keyboard) and a second user input can correspond to movement of a cursor (e.g., using a mouse or using multiple fingers on track pad) to cause content to be selected based on the movement. In such an example, the key or the affordance is a functional input that turns on selection mode. In one example, the user input includes depression of a shift key that allows movement of the cursor to select content. It should be recognized that other keys or affordances can be used as the functional input.

FIGS. 9A-9B illustrate a flow diagram of a method for selecting content using an electronic device, in accordance with some embodiments. Method 900 is performed at a device (e.g., 100, 300, 500, 600) (e.g., a mobile device) with a touch-sensitive display device. Some operations in method 900 are, optionally, combined, the orders of some operations are, optionally, changed, and some operations are, optionally, omitted.

As described below, method 900 provides an intuitive way for selecting content. The method reduces the cognitive burden on a user for selecting content, thereby creating a more efficient human-machine interface. For battery-operated computing devices, enabling a user to select content faster and more efficiently conserves power and increases the time between battery charges.

The electronic device displays (902), via the touch-sensitive display device, content (e.g., a text document) (e.g., 806) include a plurality of sets of characters (e.g., a plurality of words).

While displaying the plurality of sets of characters, the electronic device detects (904) a touch gesture (e.g., 808) (e.g., a hold) at a first location corresponding to a set of characters of the plurality of sets of characters (e.g., 806b) (e.g., a first word).

In response to (906) detecting the touch gesture, the electronic device visually distinguishes (908) (e.g., selects) the set of characters (e.g., 810).

In response to (906) detecting the touch gesture, the electronic device displays (910) a first indicator (e.g., 812) (e.g., a beginning indicator, such as a lollipop) at a first end (e.g., a beginning) of the set of characters and a second indicator (e.g., 814) (e.g., an ending indicator, such as a lollipop) at a second end (e.g., an ending) of the set of characters.

While continuing to detect the touch gesture on the display device, the electronic device detects (912) movement of the touch gesture (e.g., FIGS. 8E to 8F).

In response to (914) detecting the movement, the electronic device visually distinguishes (916) (e.g., while continuing to visually distinguish the set of characters) (e.g., selects) one or more additional characters of the plurality of sets of characters. In some embodiments, the one or more additional characters is a word, such that movement causes new words to be selected (e.g., 806c).

Selecting text according to a touch gesture in the manner described allows a user to intuitively and efficiently select text to thereafter perform one or more operations, for instance, using affordances of a command display area. Accordingly, allowing a user to select text in this manner decreases the number of inputs and amount of time needed for the user to operate the electronic device (e.g., by helping the user provide proper inputs and reducing user mistakes when operating/interacting with the device), which, additionally, reduces power usage and improves battery life of the device.

In response to (914) detecting the movement, the electronic device moves (918), based on one or more characteristics (e.g., direction, magnitude) of the movement, the second indicator to an end (e.g., an end) of the one or more additional characters (e.g., FIGS. 8E to 8F).

In some embodiments, in response to detecting the movement, the electronic device forgoes (920) movement of the first indicator (e.g., maintaining the first indicator at the first of the set of characters) (e.g., FIGS. 8E to 8F).

In some embodiments, the touch gesture includes a portion (e.g., an initial portion) that includes maintaining a stationary contact for more than a predetermined time (e.g., FIGS. 8B to 8D).

In some embodiments, the one or more additional characters includes a first word and a second word different from the first word. In some embodiments, as part of visually distinguishing the one or more additional characters, at a first time, the electronic device visually distinguishes the first word. In some embodiments, as part of visually distinguishing the one or more additional characters, at a second time after the first time, the electronic device visually distinguishes the second word, wherein a character of the one or more additional characters is not visually distinguished between the first time and the second time (e.g., FIGS. 8E to 8F).

Distinguishing the second word after distinguishing the first word without distinguishing one or more additional characters in between the first time and the second time allows a user to select text at a word level in an intuitive and efficient manner. Selecting text in this manner can, for instance, increase the precision of selecting specific words correctly. Accordingly, allowing a user to select text in this manner decreases the number of inputs and amount of time needed for the user to operate the electronic device (e.g., by helping the user provide proper inputs and reducing user mistakes when operating/interacting with the device), which, additionally, reduces power usage and improves battery life of the device.

In some embodiments, the electronic device visually distinguishes the set of characters includes an animation of a selection representation that starts at a first size and finishes at a second size smaller than the first size (e.g., FIGS. 8B to 8D).

In some embodiments, the electronic device detects (922) liftoff of the touch gesture. In some embodiments, in response to detecting the liftoff, the electronic device displays (924) a command display area (e.g., 816) adjacent to visually distinguished content, wherein the command display area includes an affordance that, when selected, performs a first operation (e.g., cut, copy) on the visually distinguished content (e.g., 816a, 816b, 816c) (e.g., without performing the first operation on content that is not the visually distinguished content).

In some embodiments, in accordance with a determination that the plurality of sets of characters are editable, the predetermined time is a first value. In some embodiments, in accordance with a determination that the plurality of sets of characters are not editable, the predetermined time is a second value less than the first value.

In some embodiments, while displaying the first indicator and the second indicator, the electronic device detects a second touch gesture (e.g., a hold) at the second indicator. In some embodiments, while displaying the first indicator and the second indicator, after detecting the second touch gesture at the second indicator, the electronic device detects movement of the second touch gesture. In some embodiments, while displaying the first indicator and the second indicator, in response to detecting the movement of the second touch gesture, the electronic device changes a number of characters in the plurality of sets of characters that are visually distinguished (e.g., FIGS. 8H to 8I).

In some embodiments, while displaying one or more visually distinguished characters in the content, the electronic device receives a command to perform a second operation (e.g., copy or cut). In some embodiments, in response to receiving the command, the electronic device performs the operation on the one or more visually distinguished characters. In some embodiments, in response to receiving the command, the electronic device forgoes performance of the operation on one or more characters that are not visually distinguished in the content (e.g., FIG. 8G).

Note that details of the processes described above with respect to method 900 (e.g., FIGS. 9A-9B) are also applicable in an analogous manner to the methods described below and above. For example, method 900 optionally includes one or more of the characteristics of the various methods described above with reference to method 700. For example, after selecting a word according to method 900, a finger input can be lowered below the word and then moved such that the end indicator is maintained at a location above the finger input according to method 700. For example, method 900 optionally includes one or more of the characteristics of the various methods described below with reference to method 1100. For example, after selecting a set of words according to method 1100, a highlighter mode can be engaged according to method 900. For example, method 900 optionally includes one or more of the characteristics of the various methods described below with reference to method 1300. For example, after selecting a paragraph according to method 700, the paragraph can be cut and pasted in another location according to method 1300. For brevity, these details are not repeated below.

Figure 10S:
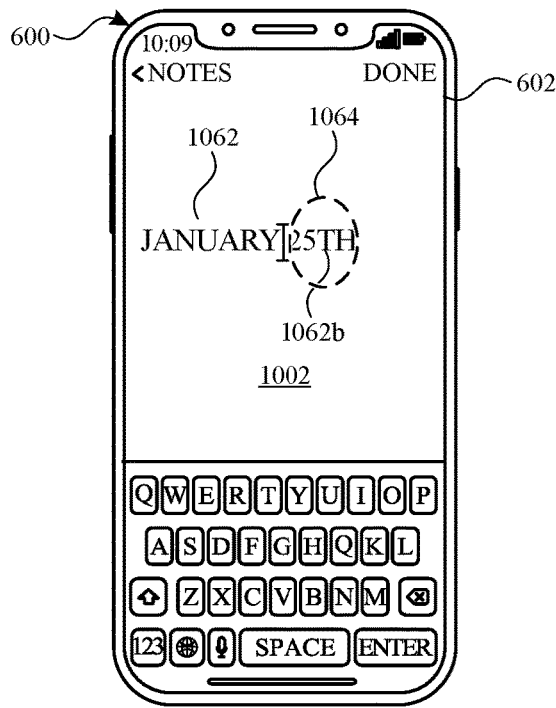
Figure 10T:
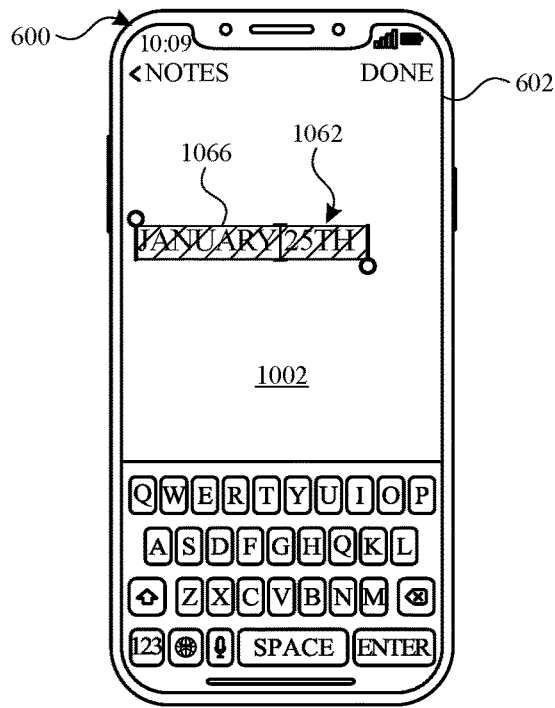
Figure 10U:
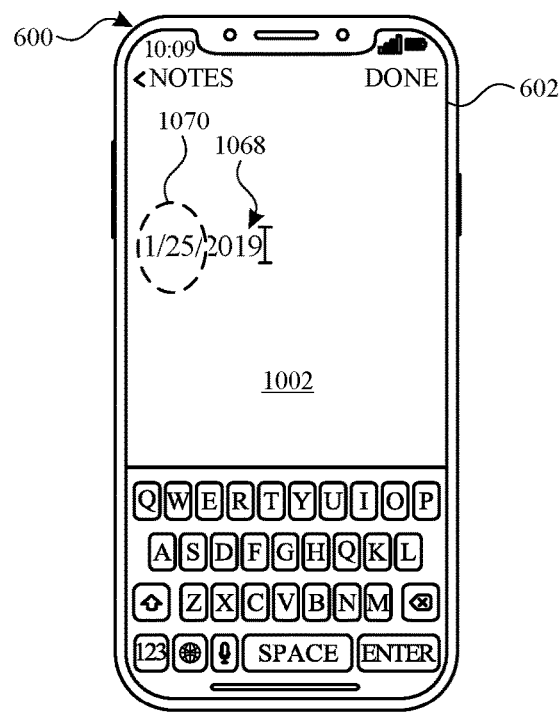
Figure 10V:
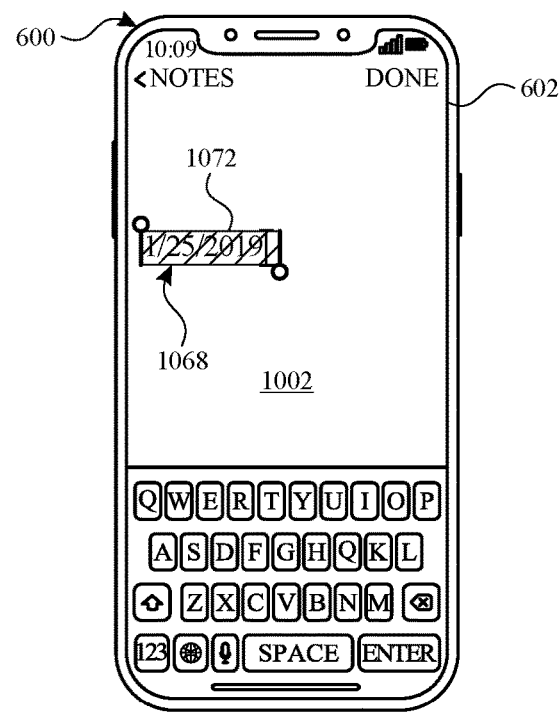

FIGS. 10A-10S illustrate exemplary user interfaces depicting techniques for selecting content, in accordance with some embodiments. The user interfaces in these figures are used to illustrate the processes described below, including the processes in FIG. 11.

FIG. 10A depicts electronic device 600 displaying user interface 1002 via touch-sensitive display device 602 at a first time. User interface 1002 is depicted as corresponding to a notes application for entering and viewing content. In some examples, techniques described herein are implemented with different user interfaces (e.g., any user interface that displays content).

User interface 1002 includes phone number 1004 (e.g., "123-456-7890"), which includes area code 1004a (e.g., "123"), dash 1004b (e.g., "-"), middle numbers 1004c (e.g., "456"), dash 1004d (e.g., "-"), and end numbers 1004e (e.g., "7890"). In some examples, phone number 1004 was entered by a user using electronic device 600. For example, the user can type the characters included in phone number 1004 to cause phone number 1004 to be displayed in user interface 1002. In other examples, phone number 1004 is provided in a different manner, such as when phone number 1004 is included in a document being viewed on electronic device 600.

FIG. 10B depicts electronic device 600 displaying user interface 1002 via touch-sensitive display device 602 at a second time after the first time. In FIG. 10B, electronic device 600 receives user input 1008 corresponding to middle numbers 1004c (e.g., "456"). In one example, user input 1008 is detected via touch-sensitive display device 602 as a finger gesture (e.g., a double tap gesture or a hold gesture) on touch-sensitive display device 602 at a location corresponding to middle numbers 1004c. In some examples, a double tap gesture is required when first criteria are met (e.g., in an editable mode, where a user is able to add and remove content) and a hold gesture is required when second criteria are met (e.g., in a reading mode, where a user is able to view but not add/remove content). In some examples, user input 1008 is another form of user input, including, for example, depression of a button on a pointing device such as a mouse. In response to detecting user input 1008, phone number 1004 is selected (instead of just middle numbers 1004c), as depicted in FIG. 10C and further discussed below.

FIG. 10C depicts electronic device 600 displaying user interface 1002 via touch-sensitive display device 602 at a third time after the second time. As mentioned above, FIG. 10C depicts phone number 1004 being selected instead of just middle numbers 1004c, even though there are special characters separating groups of characters in phone number 1004 (e.g., dash 1004b separates area code 1004a from middle numbers 1004c and dash 1004d separates middle numbers 1004c from end numbers 1004e). In some examples, a special character is a non-alphanumeric character, such as "@", "#", "$", "%", "/", "&", "*", "+", "-", " ", ",", ";", or ".".

In some examples, phone number 1004 is selected instead of just middle numbers 1004c in accordance with a determination that phone number 1004 meets group selection criteria (e.g., that phone number 1004 corresponds to a designated group of characters). For example, phone number 1004 is determined to be a phone number and therefore is selected in its entirety instead of the set of contiguous alphanumeric characters corresponding to user input 1008 (e.g., "456").

FIG. 10D depicts electronic device 600 displaying user interface 1002 via touch-sensitive display device 602 at a fourth time after the third time. In FIG. 10D, no user input is depicted (e.g., user input 1008 has been liftoff of touch-sensitive display device 602).

As depicted in FIG. 10D, liftoff of user input 1008 causes selection area 1010 to remain where it was located at the time of liftoff (e.g., as depicted in FIG. 10C). For example, in FIG. 10C, selection area 1010 extends from before character "1" in phone number 1004 to after character "0" in phone number 1004 (encompassing the characters in phone number 1004). Then, in FIG. 10C, selection area 1010 is depicted as remaining from before character "1" in phone number 1004 to after character "0" in phone number 1004 (encompassing the characters in phone number 1004).

FIG. 10D further depicts user interface 1002 including command area display 1016 adjacent to selection area 1010. In some examples, command area display 1016 is displayed in response to detecting liftoff of user input 1008 (e.g., when a liftoff has occurred while at least one character is indicated as selected).

Command area display 1016 includes multiple affordances, each affordance corresponding to a different operation to be performed on currently-selected characters. In FIG. 10D, command area display 1016 includes copy affordance 1016a, lookup affordance 1016b, and share affordance 1016c. In some examples, command area display 1016 includes more, less, and/or different affordances than depicted in FIG. 10D.

Copy affordance 1016a, when selected (e.g., electronic device 600 receiving user input corresponding to copy affordance 1016a), causes the currently-selected characters (e.g., "123-456-7890," as depicted in FIG. 10D) to be copied so that the currently-selected characters can be later pasted (e.g., inserted) at a location identified by a user. Lookup affordance 1016b, when selected (e.g., electronic device 600 receiving user input corresponding to lookup affordance 1016b), causes the currently-selected characters (e.g., "123-456-7890," as depicted in FIG. 10D) to be searched using a search engine, in one example, to identify a definition for the currently-selected characters. Share affordance 1016c, when selected (e.g., electronic device 600 receiving user input corresponding to share affordance 1016c), causes the currently-selected characters (e.g., "123-456-7890," as depicted in FIG. 10D) to be inserted into a message to be sent to a different device.

FIGS. 10E-10F depict that end indicator 1014 can be moved to change an amount selected to less (or more) than the entire portion of phone number 1004 (e.g., FIG. 10F depicts 1004a, 1004b, and 1004c selected but not 1004d and 1004e). Similar functionality can be performed using start indicator 1012.

FIGS. 10G-10I depict when a set of characters (e.g., characters 1020) do not meet group selection criteria. For example, similar to FIG. 10B, FIG. 10H depicts user input 1022 corresponding to a subset of characters consisting of "456" with dashes on either side of the set of characters. However, instead of selecting all of characters 1020, FIG. 10I depicts only the subset of characters being selected. In some examples, only the subset of characters is selected because characters 1020 does not represent a phone number due to their only being 9 numbers instead of 10 (e.g., 1020*e* includes 3 numbers ("789") instead of 4 numbers (as depicted in end numbers 1004*e* in FIGS. 10A-10F).

FIGS. 10J-10K, 10N-10P, and 10S-10V depict that group selection criteria can be used for other special characters (e.g., a space, a period, a dollar sign, or a slash, respectively), other than a dash. For example, FIG. 10J depicts user input 1032 corresponding to word 1030*b*. Instead of selecting only word 1030*b*, FIG. 10K depicts address 1030 being selected, which includes street number 1030*a*, word 1030*b*, word 1030*c*, a first space (e.g., a special character) between word 1030*a* and word 1030*b*, and a second space (e.g., a special character) between word 1030*b* and word 1030*c*.

To contrast FIGS. 10J-10K, FIGS. 10L-10M depict user input 1036 corresponding to word 1034*f* (which is the same as word 1030*b*), which results in only word 1034*b* being selected instead of sentence 1034 (e.g., "I LOVE GOING TO THE MARKET").

FIGS. 10Q-10R depict that group selection criteria can be used for a single character and a single special character.

FIG. 11 illustrates a flow diagram of a method for selecting content using an electronic device, in accordance with some embodiments. Method 1100 is performed at a device (e.g., 100, 300, 500, 600) (e.g., a mobile device) with a display device. Some operations in method 1100 are, optionally, combined, the orders of some operations are, optionally, changed, and some operations are, optionally, omitted.

As described below, method 1100 provides an intuitive way for selecting content. The method reduces the cognitive burden on a user for selecting content, thereby creating a more efficient human-machine interface. For battery-operated computing devices, enabling a user to select content faster and more efficiently conserves power and increases the time between battery charges.

The electronic device displays (1102), via the display device, a first set of characters (e.g., 1004*a*, 1004*c*, 1004*e*, 1034*f*, 1044*c*, 1062*a*, 1062*b*) (e.g., a first word, such as January, or a first set of numbers, such as 123) (In some embodiments, the first set of characters consists of one or more alphabetic or numeric characters), a second set of characters (e.g., 1004*a*, 1004*c*, 1004*e*, 1034*f*, 1044*c*, 1062*a*, 1062*b*) (e.g., a second word, such as twenty-fifth, or a second set of numbers, such as 456 or 1) (In some embodiments, the first set of characters consists of one or more alphabetic or numeric characters), and a special character (e.g., 1004*b*, 1004*d*, 1044*a*) (e.g., a space or a punctuation mark) (In some embodiments, the special character is non-alphabetic and non-numeric character) between the first set of characters and the second set of characters.

The electronic device receives (1104) user input (e.g., a tap or a mouse click; 1008) corresponding to selection of the first set of characters.

In response to (1106) receiving the user input, in accordance with a determination that a set of grouping criteria (in some embodiments, a grouping criterion is based on whether the first set of characters and the second set of characters are included in a defined group (e.g., entity), such as a phone number, physical address, email address, currency value, or date) are met, the electronic device visually distinguishes (1108) the first set of characters and the second set of characters. In some embodiments, the electronic device visually distinguishes the special character (e.g., FIG. 10C).

In response to (1106) receiving the user input, in accordance with (1110) a determination that the set of grouping criteria (e.g., determined to not be a defined group) are not met, the electronic device visually distinguishes (1112) the first set of characters (e.g., FIG. 10I).

In response to (1106) receiving the user input, in accordance with (1110) a determination that the set of grouping criteria (e.g., determined to not be a defined group) are not met the electronic device forgoes (1114) visually distinguishing the second set of characters (e.g, FIG. 10I).

Visually distinguishing characters based on grouping criteria allows a user to intuitively and efficiently select various types of character groupings. For example, a user may select phone numbers, addresses, dates, and currency values while also selecting one or more characters (e.g., dash) associated with the type of character grouping (e.g., phone number). Allowing a user to select text in this manner decreases the number of inputs and amount of time needed for the user to operate the electronic device (e.g., by helping the user provide proper inputs and reducing user mistakes when operating/interacting with the device), which, additionally, reduces power usage and improves battery life of the device.

In some embodiments, the set of grouping criteria includes a criterion that is met when a focus indicator (e.g.,1006) is currently displayed.

In some embodiments, the special character is not an alphanumeric character (e.g., as seen in FIG. 10B).

In some embodiments, the set of grouping criteria includes a criterion that is met when the first set of characters and the second set of characters, together, represent a character string selected from the group consisting of: at least a portion of a phone number (e.g., 1004), at least a portion of mailing address (e.g., 1030), at least a portion of an email address, at least a portion of a currency value (e.g., 1044, 1054), and at least a portion of a date (e.g., 1062, 1068).

In some embodiments, in response to receiving the user input, the electronic device displays a command display area (e.g., 1016) adjacent to the first set of characters and the second set of characters. In some embodiments, the command display area includes an affordance (e.g., 1016*a*, 1016*b*, 1016*c*) that, when selected, for applying a command (e.g., copy or cut) performs a first operation (e.g., cut, copy) on the first set of characters and the second set of characters.

In some embodiments, as part of visually distinguishing the first set of characters and the second set of characters, the electronic device displays a first indicator (e.g., 1012) (e.g., a beginning indicator, such as a lollipop) at a first end (e.g., a beginning) of the first set of characters and the second set of characters and a second indicator (e.g., an ending indicator, such as a lollipop) at a second end (e.g., 1014) (e.g., an ending) of the first set of characters and the second set of characters. In some embodiments, as part of visually distinguishing the first set of characters and forgoing visually distinguishing the second set of characters, the electronic device displays a first indicator (e.g., a beginning indicator, such as a lollipop) at a first end (e.g., a beginning) of the first set of characters and a second indicator (e.g., an ending indicator, such as a lollipop) at a second end (e.g., an ending) of the first set of characters.

In some embodiments, the electronic device includes a touch-sensitive input device (e.g., the display device is a touch-sensitive display device) and the user input is a touch gesture on the touch-sensitive surface (e.g., FIG. 10B).

In some embodiments, while displaying one or more visually distinguished characters, the electronic device receives a command to perform a second operation (e.g., copy or cut). In some embodiments, in response to receiving the command, the electronic device performs the second operation on the one or more visually distinguished characters. In response to receiving the command, the electronic device forgoes performance of the second operation on one or more characters that are not visually distinguished (e.g., FIG. 10D).

In some embodiments, the determination that the set of grouping criteria are met includes a determination that the first set of characters and the second set of characters meet the set of grouping criteria (e.g., FIG. 10C).

Note that details of the processes described above with respect to method 1100 (e.g., FIG. 11) are also applicable in an analogous manner to the methods described below and above. For example, method 1100 optionally includes one or more of the characteristics of the various methods described above with reference to method 700. For example, method 1100 optionally includes one or more of the characteristics of the various methods described above with reference to method 900. For example, method 1100 optionally includes one or more of the characteristics of the various methods described below with reference to method 1300.

FIGS. 12A-12H illustrate exemplary user interfaces depicting techniques for deleting content, in accordance with some embodiments. The user interfaces in these figures are used to illustrate the processes described below, including the processes in FIGS. 13A-13B.

Figure 12A:
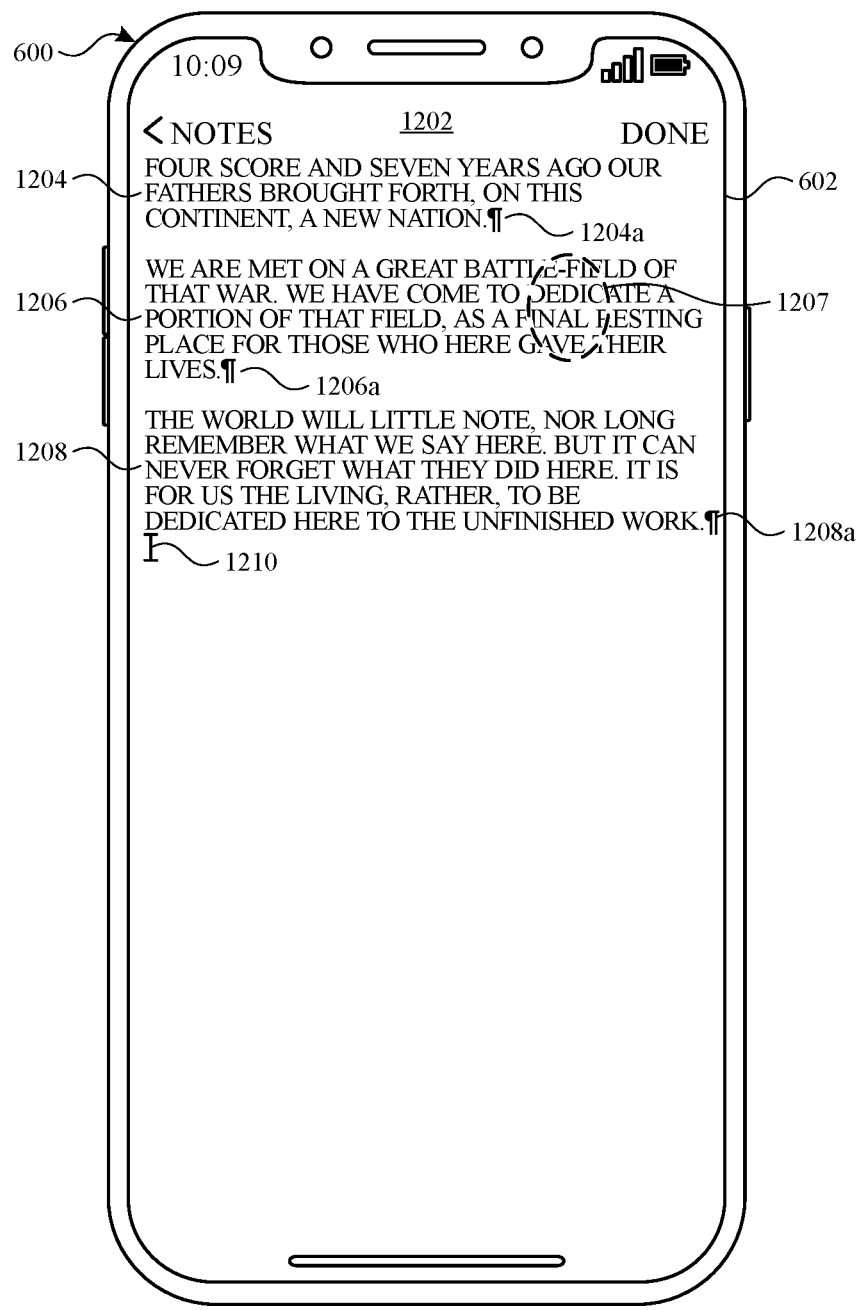
FIGS. 12A-12H illustrate exemplary user interfaces depicting techniques for modifying content, in accordance with some embodiments.
Figure 13B:
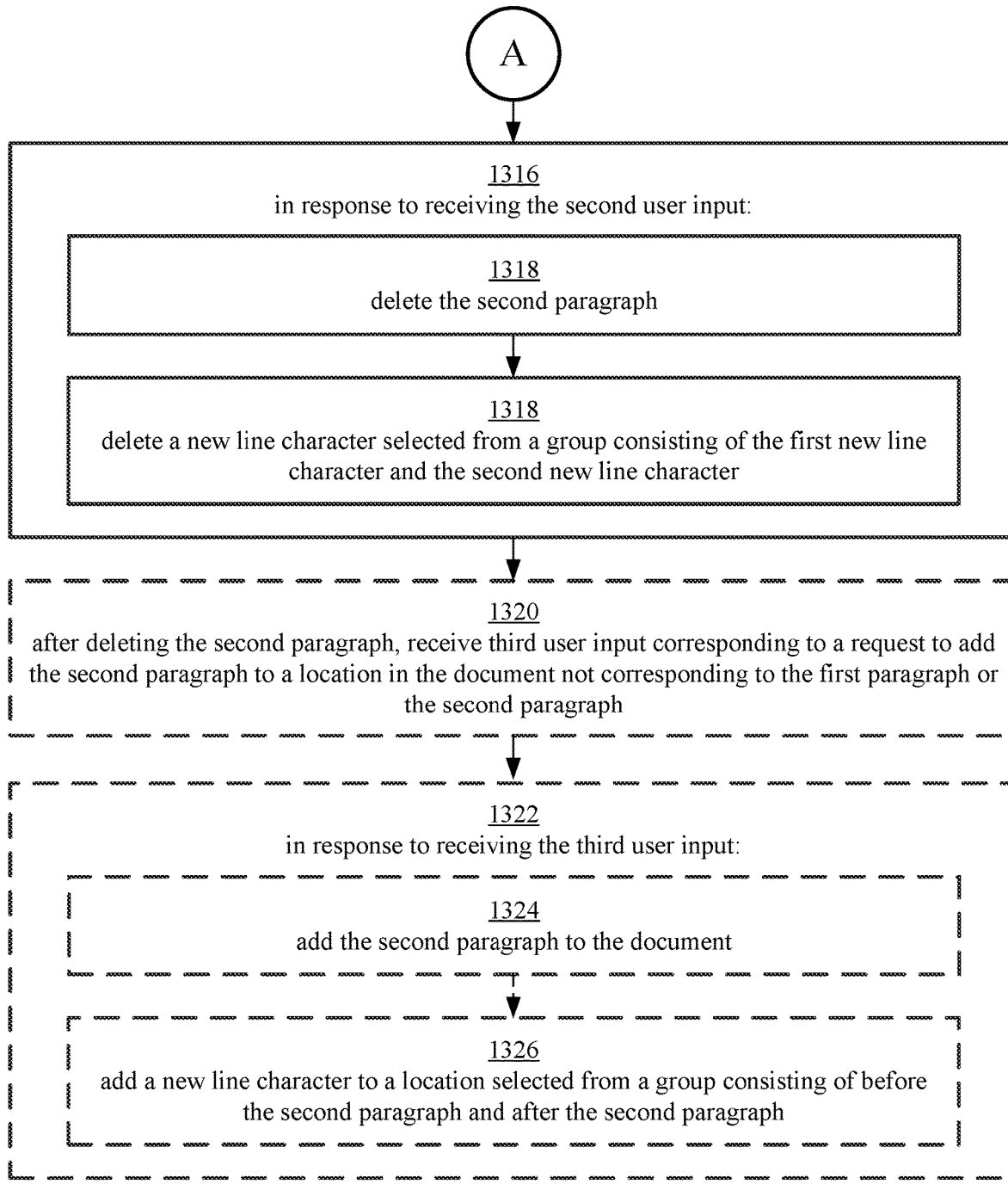

FIG. 12A depicts electronic device 600 displaying user interface 1202 via touch-sensitive display device 602 at a first time. Similar to user interface 604, user interface 1202 corresponds to a notes application for entering and viewing content. In some examples, techniques described herein are implemented with different user interfaces (e.g., any user interface that a user may edit content).

User interface 1202 includes three paragraphs (e.g., first paragraph 1204, second paragraph 1206, and third paragraph 1208) and insertion marker 1210. Each paragraph includes a paragraph character (e.g., first paragraph character 1204a, second paragraph character 1206a, and third paragraph character 1208a) to indicate an end of a current line and the start of a new paragraph on a next line. In some examples, a new line character is used instead of a paragraph character. In some examples, such characters (such as paragraph characters and new line characters) are not visible. In such examples, the behavior of the editing interface will make it clear whether such a character is either invisible or impliedly inserted (e.g., in some examples, instead of characters, Hypertext Markup Language (HTML) code or other markup language objects can be used to indicate a new line). As depicted in FIG. 12A, insertion marker 1210 is after third paragraph character 1208a (e.g., insertion marker 1210 is on a next line after third paragraph 1208).

Figure 12B:
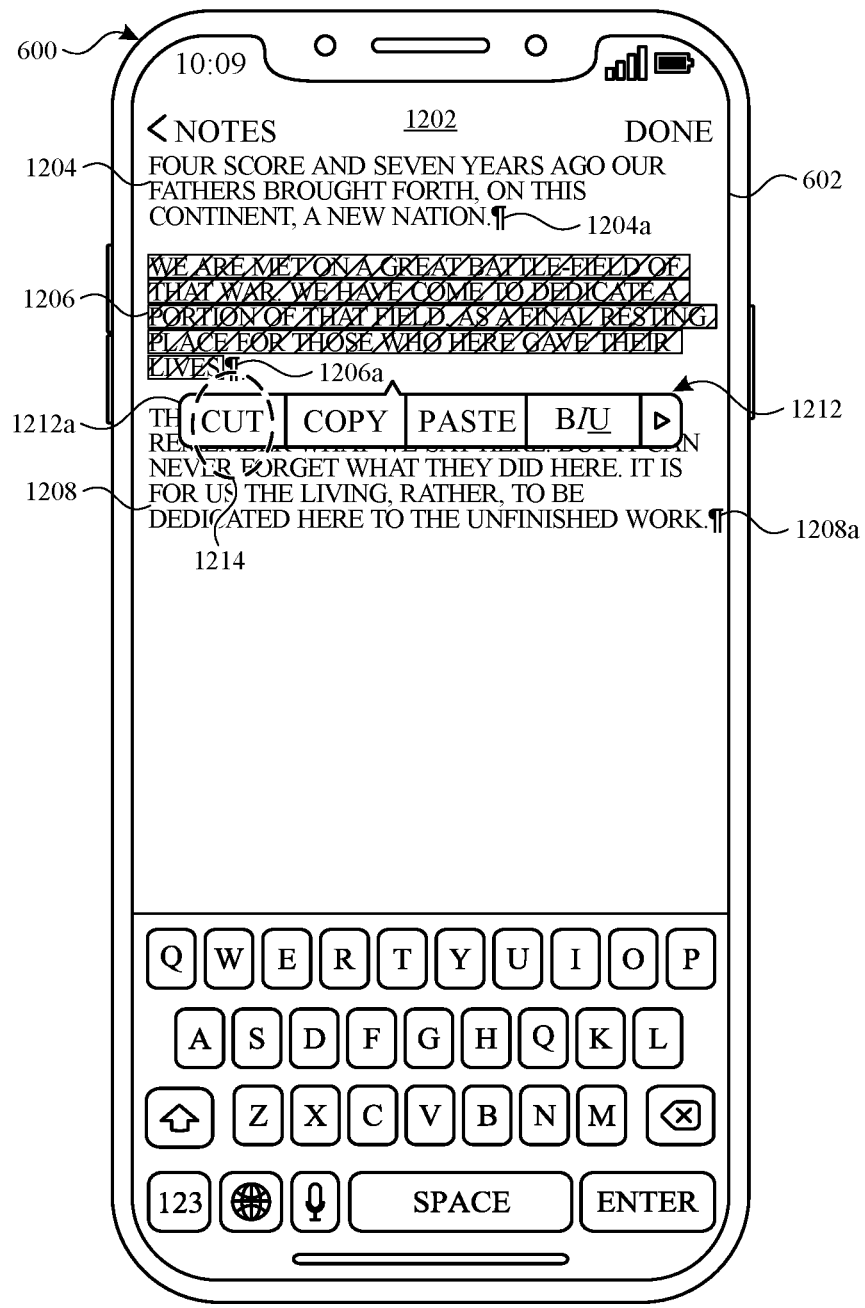

FIG. 12B depicts electronic device 600 displaying user interface 1202 via touch-sensitive display device 602 at a second time after the first time. At the second time, second paragraph 1206 and not second paragraph character 1206a is selected (e.g., selection area encompasses second paragraph 1206 and not second paragraph character 1206a). In some examples, second paragraph 1206 is selected using one or more of the techniques described above (or some other technique for selecting content) (e.g., a hold gesture (e.g., 1207) on second paragraph 1206 and then a motion to select the paragraph, according to method 900).

FIG. 12B further depicts user interface 1202 including command area display 1212 adjacent to second paragraph 1206. In some examples, command area display 1212 is displayed in response to detecting liftoff of a user input, as discussed above.

Command area display 1212 includes multiple affordances, each affordance corresponding to a different operation to be performed on currently-selected content. In FIG. 12B, command area display 1212 includes cut affordance 1212a, a copy affordance, and a paste affordance. In some examples, command area display 1212 includes more, less, and/or different affordances than depicted in FIG. 12B.

Cut affordance 1212a, when selected (e.g., electronic device 600 receiving user input corresponding to cut affordance 1212a), causes currently-selected content (e.g., second paragraph 1206) to be copied and deleted so that the currently-selected content can be later inserted at a location identified by a user. The copy affordance, when selected (e.g., electronic device 600 receiving user input corresponding to the copy affordance), causes the currently-selected content to be copied so that the currently-selected content can be later pasted at a location identified by a user. The paste affordance, when selected (e.g., electronic device 600 receiving user input corresponding to the paste affordance), causes copied content to be inserted at a location identified by a user.

FIG. 12B further depicts receiving user input 1214 corresponding to cut affordance 1212a. In one example, user input 1214 is detected via touch-sensitive display device 602 as a finger press and liftoff (e.g., tap gesture) on touch-sensitive display device 602 at a location corresponding to cut affordance 1212a. In some examples, user input 1214 is another form of user input, including, for example, depression and release of a button on a pointing device such as a mouse. In some examples, user input 1214 results in performance of a cut operation (e.g., second paragraph 1206 is copied and deleted), a result of which is depicted in FIG. 12C.

Figure 12C:
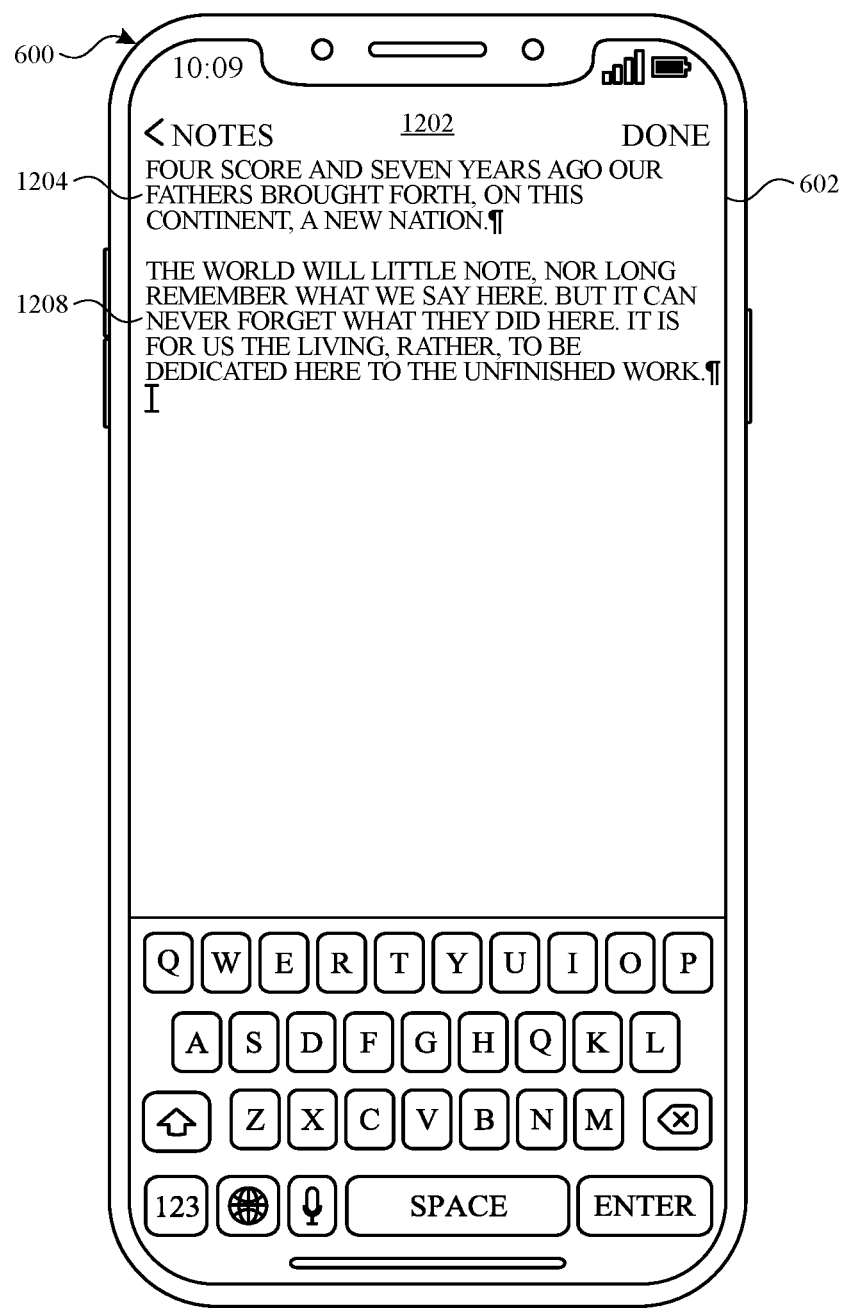

FIG. 12C depicts electronic device 600 displaying user interface 1202 via touch-sensitive display device 602 at a third time after the second time. At the third time, second paragraph 1206 and second paragraph character 1206a have been deleted. In some examples, second paragraph 1206 and second paragraph character 1206a are deleted in response to user input 1214, even though second paragraph character 1206a was not selected when the cut operation corresponding to user input 1214 was performed.

Figure 12D:
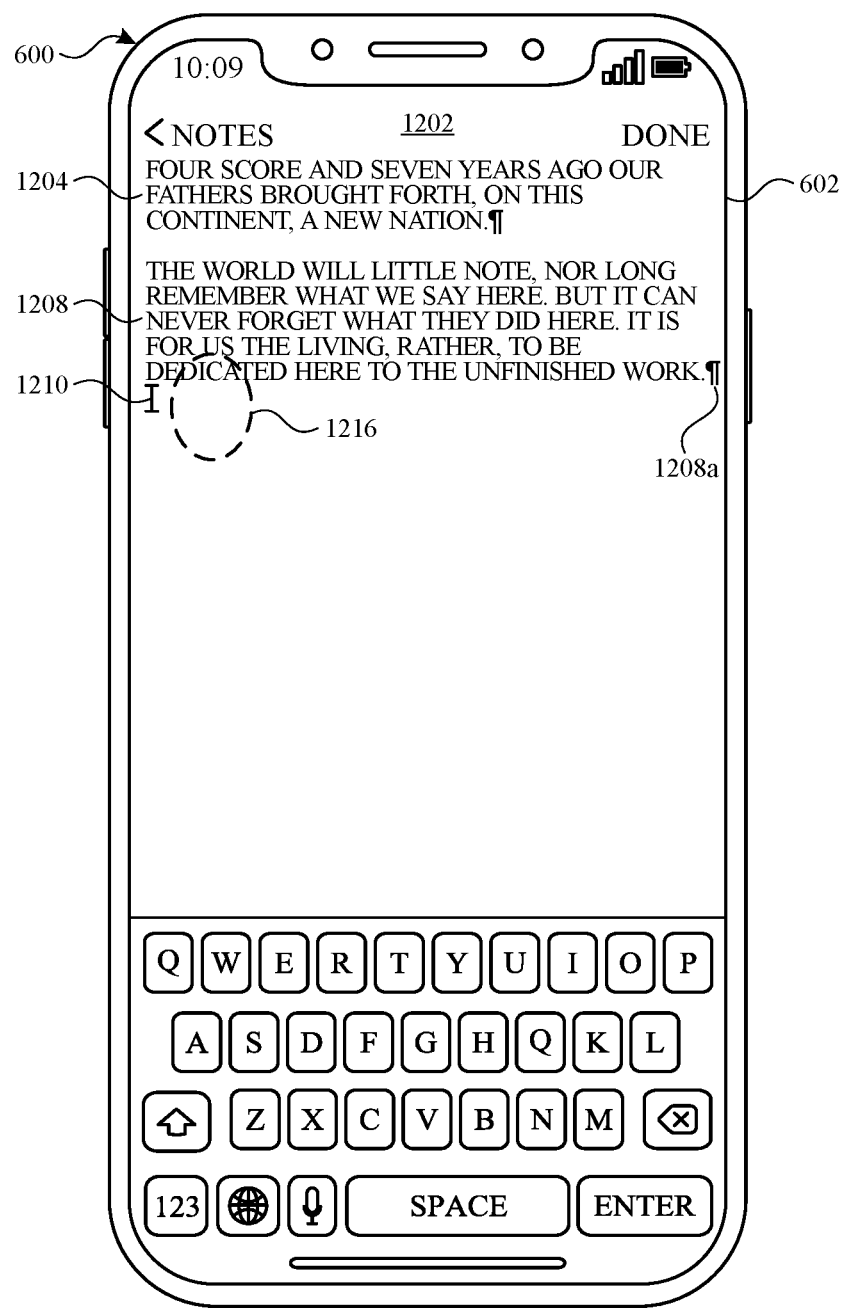

FIG. 12D depicts electronic device 600 displaying user interface 1202 via touch-sensitive display device 602 at a fourth time after the third time. At the fourth time, electronic device 600 receives user input 1216 corresponding to a location after third paragraph character 1208a. In one example, user input 1216 is detected via touch-sensitive display device 602 as a finger press and liftoff (e.g., tap or a hold gesture with a liftoff) on touch-sensitive display device 602. In some examples, user input 1216 is another form of user input, including, for example, depression and release of a button on a pointing device such as a mouse. In some examples, user input 1216 results in display of a command area display adjacent to user input 1216, as depicted in FIG. 12E.

Figure 12E:
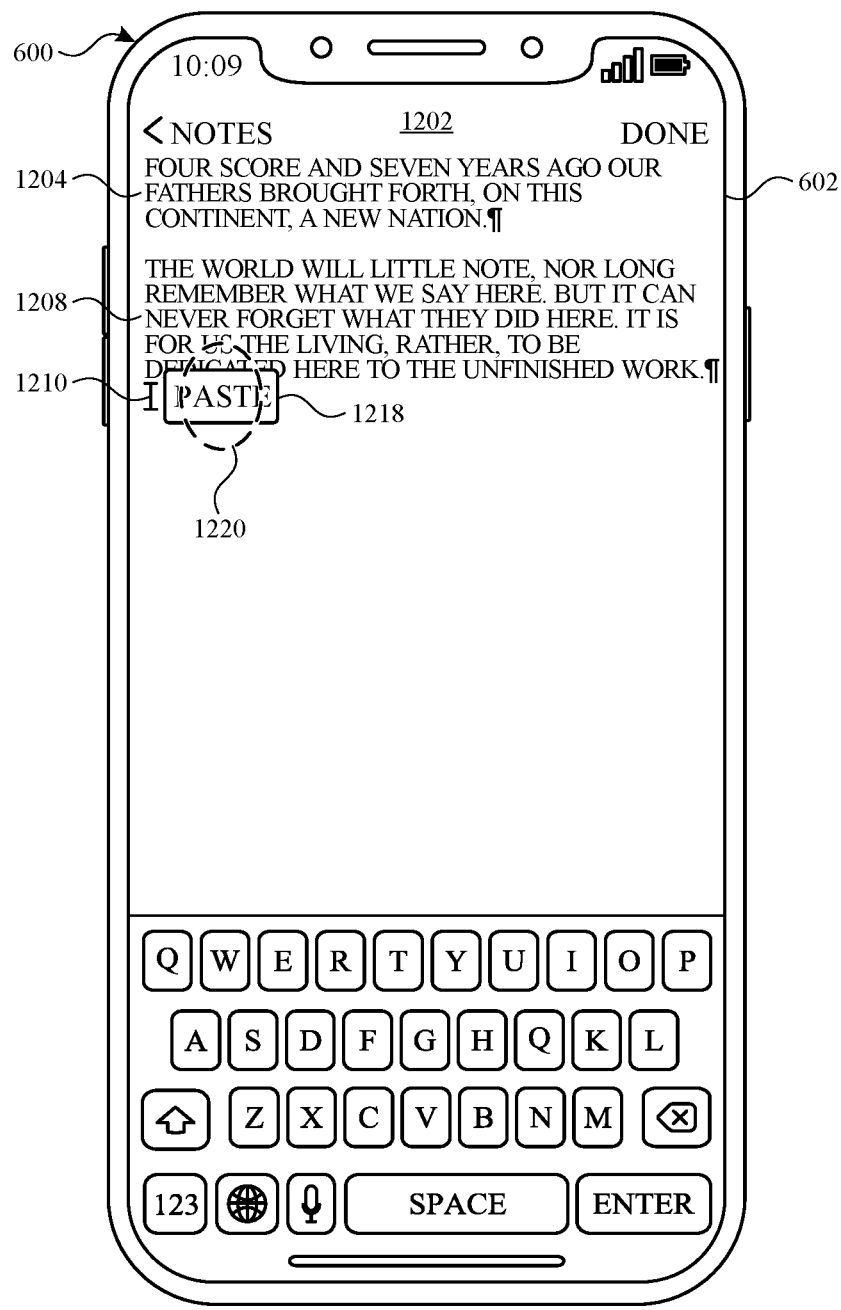

FIG. 12E depicts electronic device 600 displaying user interface 1202 via touch-sensitive display device 602 at a fifth time after the fourth time. At the fifth time, electronic device 600 displays command area display 1218 adjacent to the location of user input 1216 (as depicted in FIG. 12D).

Command area display 1218 includes a paste affordance corresponding to a paste operation to be performed at a current location of insertion marker 1210. In some examples, command area display 1218 includes more, less, and/or different affordances than depicted in FIG. 12E.

FIG. 12E further depicts receiving user input 1220 corresponding to the paste affordance in command area display 1218. In one example, user input 1220 is detected via touch-sensitive display device 602 as a finger press and liftoff (e.g., tap) on touch-sensitive display device 602 at a location corresponding to the paste affordance in command area display 1218. In some examples, user input 1220 is another form of user input, including, for example, depression and release of a button on a pointing device such as a mouse. In some examples, user input 1220 results in performance of a paste operation (e.g., copied content (e.g., second paragraph 1206 and not second paragraph character 1206*a*) is inserted at a location corresponding to insertion marker 1210), a result of which is depicted in FIG. 12F.

Figure 12F:
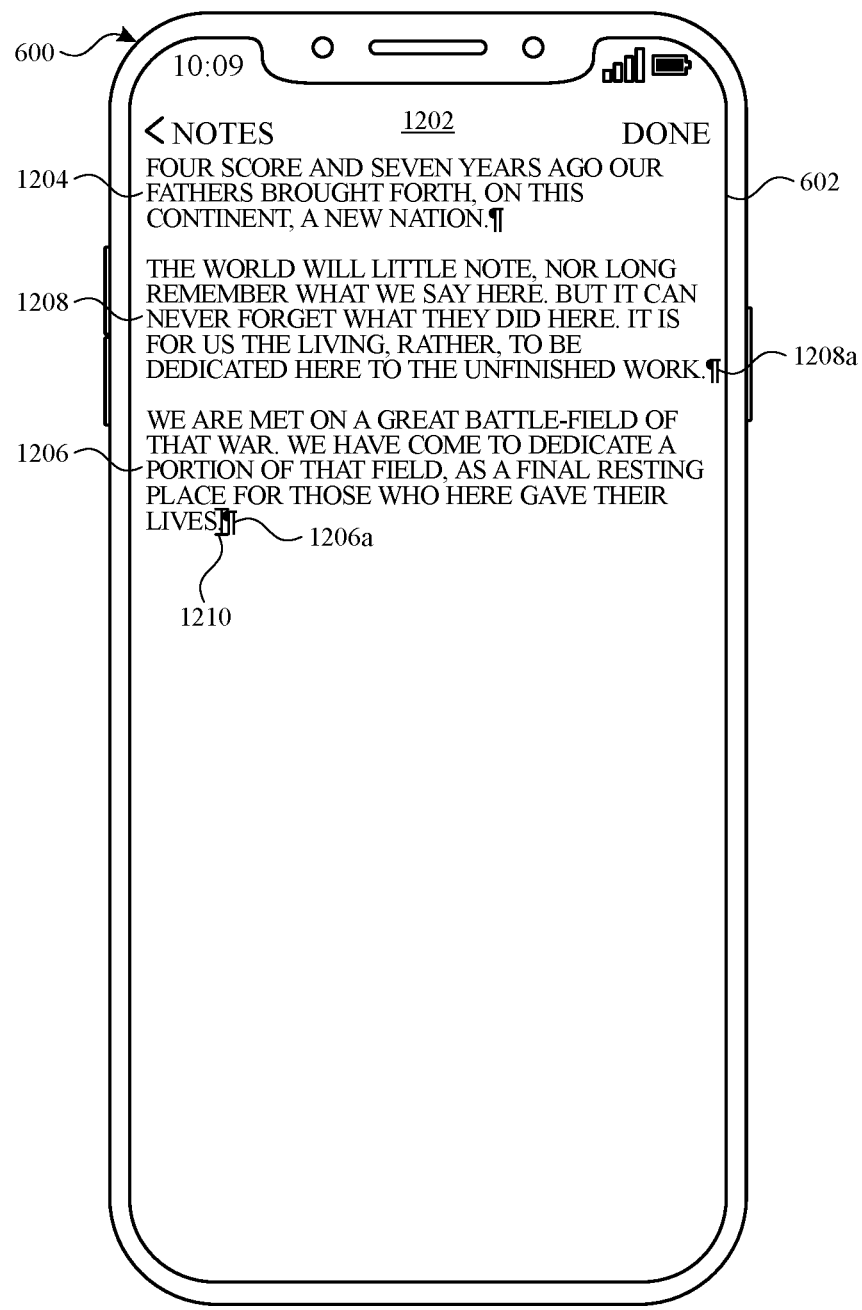

FIG. 12F depicts electronic device 600 displaying user interface 1202 via touch-sensitive display device 602 at a sixth time after the fifth time. At the sixth time, second paragraph 1206 and second paragraph character 1206*a* have been inserted after third paragraph character 1208*a*, even though the copied content did not include second paragraph character 1206*a* (see description for FIG. 12B). Such a result is due to the system determining that a user likely intended to have second paragraph character 1206*a* included after second paragraph 1206.

Figure 12G:
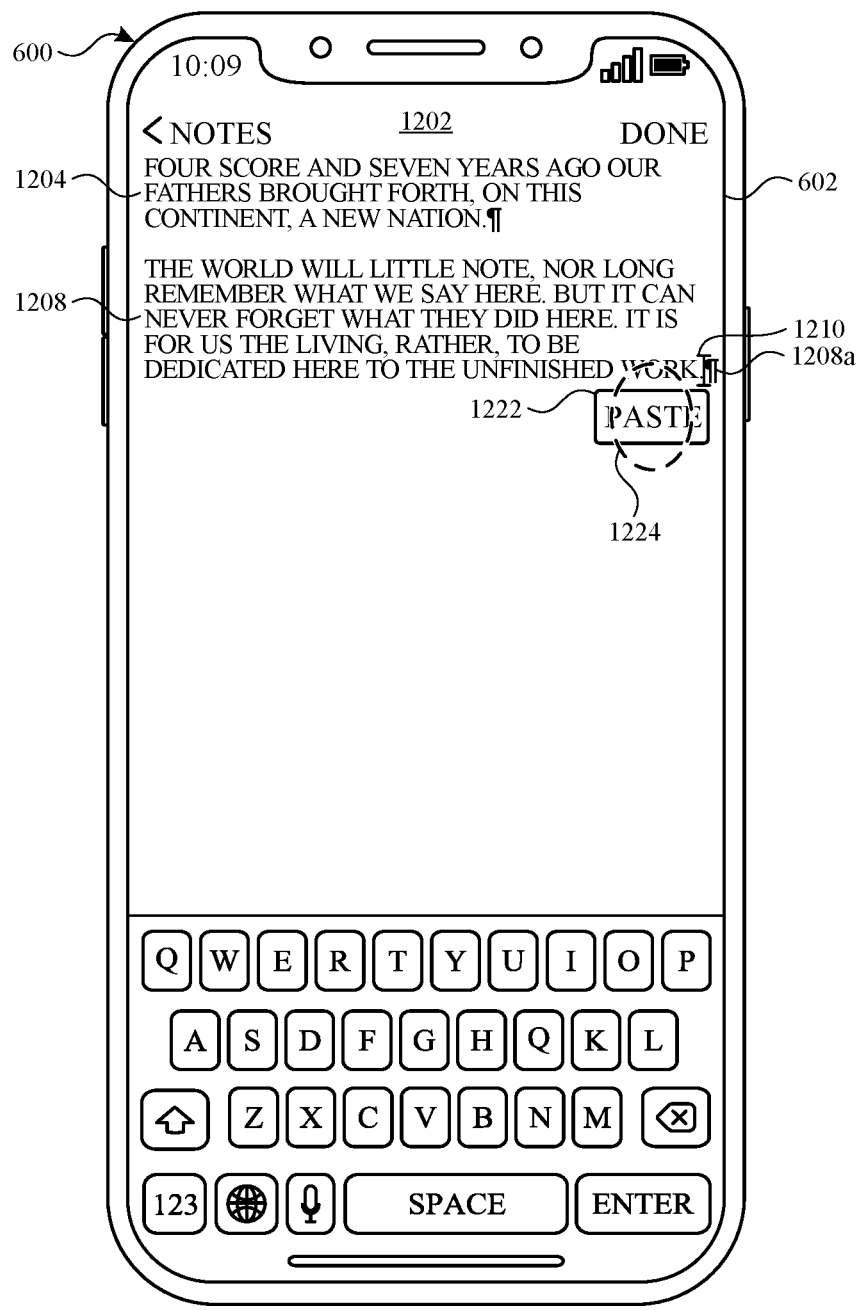
Figure 12H:
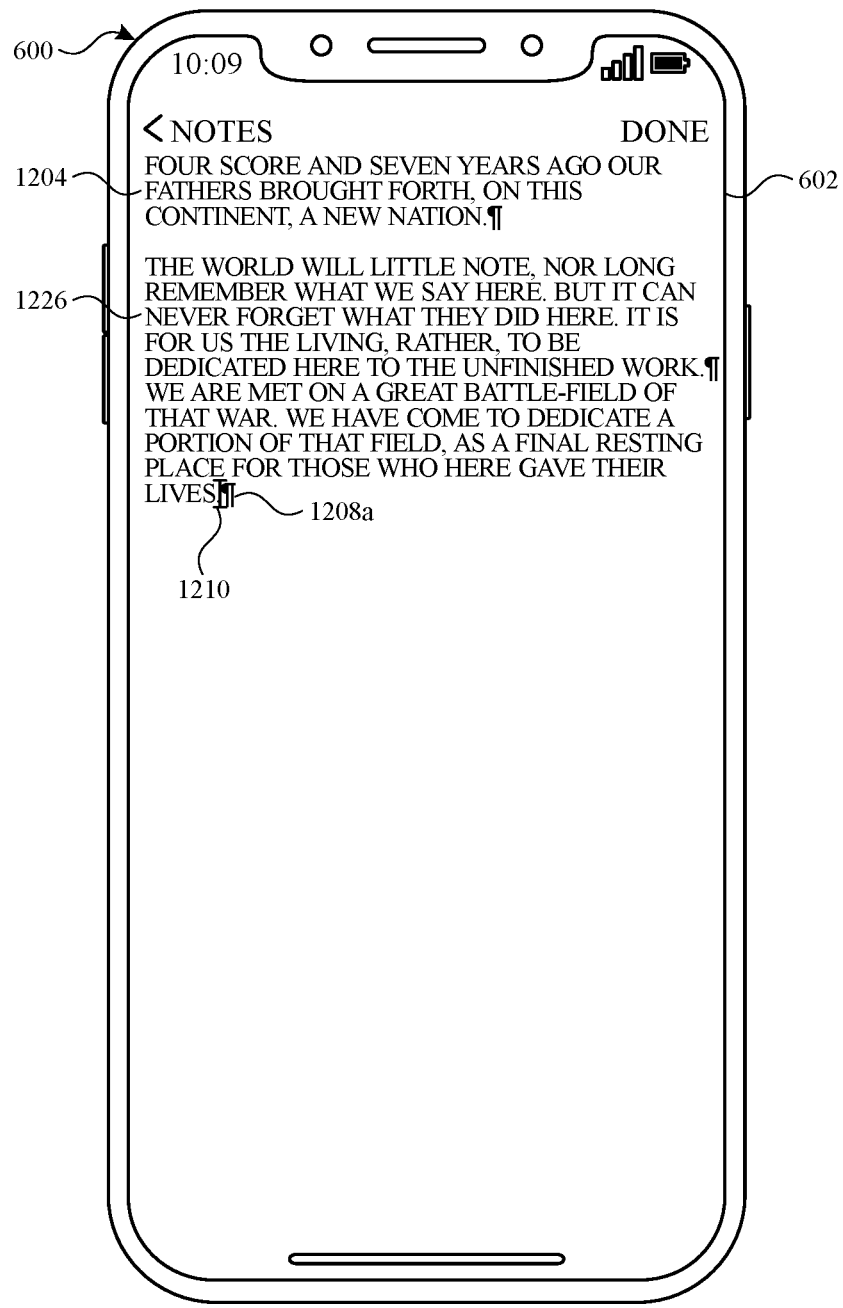

FIGS. 12G-12H depict a different result when insertion marker 1210 is before third paragraph character 1208*a* instead of after third paragraph character 1208*a*. In such circumstances, second paragraph character 1206*a* will not be added after second paragraph 1206. Such a result is due to the system determining that a user likely intended to not have second paragraph character 1206*a* included after content from second paragraph 1206, and instead wanted to combine third paragraph 1208 and second paragraph 1206 into combined paragraph 1226 with a single paragraph character after combined paragraph 1226 (e.g., third paragraph character 1208*a*.

FIGS. 13A-13B is a flow diagram illustrating a method for modifying content using an electronic device in, accordance with some embodiments. Method 1300 is performed at a device (e.g., 100, 300, 500, 600) (e.g., a mobile device) with a display device. Some operations in method 1300 are, optionally, combined, the orders of some operations are, optionally, changed, and some operations are, optionally, omitted.

As described below, method 1300 provides an intuitive way for modifying content. The method reduces the cognitive burden on a user for modifying content, thereby creating a more efficient human-machine interface. For battery-operated computing devices, enabling a user to modify content faster and more efficiently conserves power and increases the time between battery charges.

The electronic device displays (1302), via the display device, a document (e.g., a text document), the document. In some embodiments, the document includes a first paragraph (e.g., 1204) of selectable text. In some embodiments, the first paragraph includes one or more words, each word including a set of one or more characters. In some embodiments, the document includes a second paragraph (e.g., 1206) of selectable text. In some embodiments, the second paragraph includes one or more words, each word including a set of one or more characters. In some embodiments, the document includes a third paragraph (e.g., 1208) of selectable text. In some embodiments, the third paragraph includes one or more words, each word including a set of one or more characters. In some embodiments, the document includes a first new line character between the first paragraph and the second paragraph (e.g., 1204*a*). In some embodiments, the first new line character is a new paragraph character. In some embodiments, the first new line character is not visibly displayed. In some embodiments, the document includes a second new line character (e.g., 1206*a*) between the second paragraph and the third paragraph. In some embodiments, the second new line character is a new paragraph character.

The electronic device receives (1304) first user input (e.g., a tap, a double tap, a triple tap, a mouse click, or selection of a select button) (e.g., 1207) corresponding to selection of the second paragraph.

In response to (1306) receiving the first user input, the electronic device selects (1308) the second paragraph. In some embodiments, selecting the second paragraph includes visually distinguishing the second paragraph (e.g., FIG. 12B).

In response to (1306) receiving the first user input, the electronic device forgoes (1310) selection of the first new line character (e.g., 1206*a*).

In response to (1306) receiving the first user input, the electronic device forgoes (1312) selection of the second new line character (e.g., the selected second paragraph does not include a new line character) (e.g., FIG. 12B).

While the second paragraph is selected and while the first new line character and the second new line character are not selected (in some embodiments, selected content is visually distinguished from unselected content), the electronic device receives (1314) second user input (in some embodiments, the user input includes one or more user inputs to navigate to a cut or delete operation) (e.g., 1214) corresponding to a request to delete the second paragraph (e.g., delete the selected content).

In response to (1316) receiving the second user input, the electronic device deletes (1318) the second paragraph (e.g., FIG. 12C).

In response to (1316) receiving the second user input, the electronic device deletes (1320) a new line character (e.g., 1204*a* or 1206*a*) selected from a group consisting of the first new line character and the second new line character (e.g., without deleting the other new line character). In some embodiments, while the second paragraph is selected and while the first new line character and the second new line character are not selected, the electronic device receives second user input corresponding to a request to perform an operation. In some embodiments, in response to receiving the second user input, in accordance with a determination that the operation is a first type (e.g., a request to delete the second paragraph), the electronic device performs the operation on the second paragraph and a new line character selected from a group consisting of the first new line character and the second new line character. In some embodiments, in response to receiving the second user input, in accordance with a determination that the operation is a second type (e.g., a request to copy the second paragraph), the electronic device performs the operation on the second paragraph and not the first new line character or the second new line character (in other words, first type performs operation on paragraph and a new line character while second type performs operation on paragraph and not a new line character).

Deleting a new line character in this manner (e.g., without input specifying that the new line character is to be deleted)

allows a user to intuitively and efficiently edit text without having to specifically select a new line character for deletion. Allowing a user to delete text in this manner decreases the number of inputs and amount of time needed for the user to operate the electronic device (e.g., by helping the user provide proper inputs and reducing user mistakes when operating/interacting with the device), which, additionally, reduces power usage and improves battery life of the device.

In some embodiments, the request to delete the second paragraph is a delete or cut operation (e.g., FIG. 12B).

In some embodiments, after deleting the second paragraph, the electronic device receives (1320) third user input (e.g., one or more user inputs to navigate to a paste operation) corresponding to a request to add the second paragraph to a location in the document not corresponding to the first paragraph or the second paragraph (e.g., at a location that is not within any paragraph of the document). In some embodiments, in response to (1322) receiving the third user input, the electronic device adds (1324) the second paragraph to the document. In some embodiments, in response to (1322) receiving the third user input, the electronic device adds (1326) a new line character to a location selected from a group consisting of before the second paragraph and after the second paragraph (e.g., FIGS. 12D to 12F).

Adding a new line character in this manner (e.g., without input specifying that the new line character is to be added) allows a user to intuitively and efficiently edit text without having to specifically select a new line character for addition. Allowing a user to insert text in this manner decreases the number of inputs and amount of time needed for the user to operate the electronic device (e.g., by helping the user provide proper inputs and reducing user mistakes when operating/interacting with the device), which, additionally, reduces power usage and improves battery life of the device.

In some embodiments, the electronic device receives fourth user input (e.g., one or more user inputs to navigate to a paste operation) (e.g., 1224) corresponding to a request to add the second paragraph to a location in the document corresponding to (e.g., within) a fourth paragraph (e.g., the first paragraph or the second paragraph). In some embodiments, in response to receiving the fourth user input, the electronic device adds the second paragraph to a location within the fourth paragraph. In some embodiments, in response to receiving the fourth user input, the electronic device forgoes addition of a new line character to the document.

In some embodiments, the electronic device receives fifth user input (e.g., a tap, a double tap, a triple tap, a mouse click, or selection of a select button) corresponding to selection of a sub-portion of a fifth paragraph (e.g., the first paragraph or the third paragraph) (e.g., the sub-portion of the paragraph is not all of the paragraph). In some embodiments, in response to receiving the fifth user input, the electronic device selects the sub-portion of the fifth paragraph. In some embodiments, selecting the sub-portion of the paragraph includes visually distinguishing the portion of the second paragraph). In some embodiments, while the sub-portion of the fifth paragraph is selected, the electronic device receives a sixth user input (e.g., one or more user inputs to navigate to a cut or delete operation) corresponding to a request to delete the sub-portion of the fifth paragraph (e.g., delete the selected content). In some embodiments, in response to receiving the sixth user input, the electronic device deletes the sub-portion of the fifth paragraph. In some embodiments, in response to receiving the sixth user input: the electronic device forgoes deletion of a new line character associated with the fifth paragraph (e.g., at the end or the beginning of the fifth paragraph).

In some embodiments, while the second paragraph is selected and before receiving the second user input, the electronic device receives a seventh user input corresponding to perform an operation. In some embodiments, the seventh user input includes one or more user inputs to perform an operation, such as copy. In some embodiments, in response to receiving the seventh user input, the electronic device performs the operation on the second paragraph. In some embodiments, in response to receiving the seventh user input, the electronic device forgoes performance of the operation on the first new line character and the second new line character (e.g., FIG. 12B).

Note that details of the processes described above with respect to method 1300 (e.g., FIGS. 13A-13B) are also applicable in an analogous manner to the methods described above. For example, method 1300 optionally includes one or more of the characteristics of the various methods described above with reference to method 700. For example, the movement of insertion cursor of method 1100 can be used to select a paragraph before deleting the paragraph according to method 1300. For example, method 1300 optionally includes one or more of the characteristics of the various methods described above with reference to method 900. For example, the selection of method 900 can be used to select a paragraph before deleting the paragraph according to method 1300. For example, method 1300 optionally includes one or more of the characteristics of the various methods described above with reference to method 1100. For example, the selection of method 1100 can be used to select a paragraph before deleting the paragraph according to method 1300. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the selection of text. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to better identify groups of characters (e.g., phone numbers, addresses, etc.). Accordingly, use of such personal information data enables more intuitive selection methods. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of text selection, the present technology can be configured to allow users to select to "opt in" or "opt out" of participation in the collection of personal information data during registration for services or anytime thereafter. In another example, users can select not to provide personal data for targeted selection services. In yet another example, users can select to limit the length of time personal data is maintained or entirely prohibit the development of a baseline selection profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the text selection services, or publicly available information.

What is claimed is:

1. An electronic device, comprising:
   a touch-sensitive display device;
   one or more processors; and
   memory storing one or more programs configured to be executed by the one or more processors, the one or more programs including instructions for:
      displaying, via the touch-sensitive display device, content include a plurality of sets of characters;
      while displaying the plurality of sets of characters, detecting a touch gesture at a first location corresponding to a set of characters of the plurality of sets of characters, wherein an initial portion of the touch gesture includes maintaining a stationary contact at the first location for more than a predetermined time;
      in response to detecting the initial portion of the touch gesture:
         displaying an animation of a selection representation around the set of characters that starts at a first size and finishes at a second size, smaller than the first size, to visually distinguish the set of characters without changing a size of the set of characters; and
         displaying a first indicator at a first end of the set of characters and a second indicator at a second end of the set of characters;
      while detecting that the touch gesture is maintained on the touch-sensitive display device, detecting a second portion of the touch gesture that includes movement of the touch gesture; and
      in response to detecting the movement of the touch gesture:
         visually distinguishing one or more additional characters of the plurality of sets of characters; and
         moving, based on one or more characteristics of the movement, the second indicator to an end of the one or more additional characters.

2. The electronic device of claim 1, wherein the one or more programs further include instructions for:

in response to detecting the movement of the touch gesture, forgoing movement of the first indicator.

3. The electronic device of claim 1, wherein the one or more additional characters includes a first word and a second word different from the first word, and wherein visually distinguishing the one or more additional characters includes:
  at a first time, visually distinguishing the first word; and
  at a second time after the first time, visually distinguishing the second word, wherein a character of the one or more additional characters is not visually distinguished between the first time and the second time.

4. The electronic device of claim 1, wherein the one or more programs further include instructions for:
  detecting liftoff of the touch gesture; and
  in response to detecting the liftoff, displaying a command display area adjacent to visually distinguished content, wherein the command display area includes an affordance that, when selected, performs a first operation on the visually distinguished content.

5. The electronic device of claim 1, wherein:
  in accordance with a determination that the plurality of sets of characters are editable, the predetermined time is a first value; and
  in accordance with a determination that the plurality of sets of characters are not editable, the predetermined time is a second value less than the first value.

6. The electronic device of claim 1, wherein the one or more programs further include instructions for:
  while displaying the first indicator and the second indicator:
    detecting a second touch gesture at the second indicator;
    after detecting the second touch gesture at the second indicator, detecting movement of the second touch gesture; and
    in response to detecting the movement of the second touch gesture, changing a number of characters in the plurality of sets of characters that are visually distinguished.

7. The electronic device of claim 1, wherein the one or more programs further include instructions for:
  while displaying one or more visually distinguished characters in the content, receiving a command to perform a second operation; and
  in response to receiving the command:
    performing the second operation on the one or more visually distinguished characters; and
    forgoing performance of the second operation on one or more characters that are not visually distinguished in the content.

8. The electronic device of claim 1, wherein the initial portion of the touch gesture is a tap-and-hold gesture or a double-tap gesture.

9. A method, comprising:
  at an electronic device with a touch-sensitive display device:
    displaying, via the touch-sensitive display device, content include a plurality of sets of characters;
    while displaying the plurality of sets of characters, detecting a touch gesture at a first location corresponding to a set of characters of the plurality of sets of characters, wherein an initial portion of the touch gesture includes maintaining a stationary contact at the first location for more than a predetermined time;
    in response to detecting the initial portion of the touch gesture:
      displaying an animation of a selection representation around the set of characters that starts at a first size and finishes at a second size, smaller than the first size, to visually distinguish the set of characters without changing a size of the set of characters; and
      displaying a first indicator at a first end of the set of characters and a second indicator at a second end of the set of characters;
    while detecting that the touch gesture is maintained on the touch-sensitive display device, detecting a second portion of the touch gesture that includes movement of the touch gesture; and
    in response to detecting the movement of the touch gesture:
      visually distinguishing one or more additional characters of the plurality of sets of characters; and
      moving, based on one or more characteristics of the movement, the second indicator to an end of the one or more additional characters.

10. The method of claim 9, further comprising:
  in response to detecting the movement of the touch gesture, forgoing movement of the first indicator.

11. The method of claim 9, wherein the one or more additional characters includes a first word and a second word different from the first word, and wherein visually distinguishing the one or more additional characters includes:
  at a first time, visually distinguishing the first word; and
  at a second time after the first time, visually distinguishing the second word, wherein a character of the one or more additional characters is not visually distinguished between the first time and the second time.

12. The method of claim 9, further comprising:
  detecting liftoff of the touch gesture; and
  in response to detecting the liftoff, displaying a command display area adjacent to visually distinguished content, wherein the command display area includes an affordance that, when selected, performs a first operation on the visually distinguished content.

13. The method of claim 9, wherein:
  in accordance with a determination that the plurality of sets of characters are editable, the predetermined time is a first value; and
  in accordance with a determination that the plurality of sets of characters are not editable, the predetermined time is a second value less than the first value.

14. The method of claim 9, further comprising:
  while displaying the first indicator and the second indicator:
    detecting a second touch gesture at the second indicator;
    after detecting the second touch gesture at the second indicator, detecting movement of the second touch gesture; and
    in response to detecting the movement of the second touch gesture, changing a number of characters in the plurality of sets of characters that are visually distinguished.

15. The method of claim 9, further comprising:
  while displaying one or more visually distinguished characters in the content, receiving a command to perform a second operation; and
  in response to receiving the command:
    performing the second operation on the one or more visually distinguished characters; and forgoing performance of the second operation on one or more characters that are not visually distinguished in the content.

16. The method of claim 9, wherein the initial portion of the touch gesture is a tap-and-hold gesture or a double-tap gesture.

17. A non-transitory computer-readable storage medium storing one or more programs configured to be executed by one or more processors of an electronic device with a touch-sensitive display device, the one or more programs including instructions for:
displaying, via the touch-sensitive display device, content include a plurality of sets of characters;
while displaying the plurality of sets of characters, detecting a touch gesture at a first location corresponding to a set of characters of the plurality of sets of characters, wherein an initial portion of the touch gesture includes maintaining a stationary contact at the first location for more than a predetermined time;
in response to detecting the initial portion of the touch gesture:
displaying an animation of a selection representation around the set of characters that starts at a first size and finishes at a second size, smaller than the first size, to visually distinguish the set of characters without changing a size of the set of characters; and
displaying a first indicator at a first end of the set of characters and a second indicator at a second end of the set of characters;
while detecting that the touch gesture is maintained on the touch-sensitive display device, detecting a second portion of the touch gesture that includes movement of the touch gesture; and
in response to detecting the movement of the touch gesture:
visually distinguishing one or more additional characters of the plurality of sets of characters; and
moving, based on one or more characteristics of the movement, the second indicator to an end of the one or more additional characters.

18. The non-transitory computer-readable storage medium of claim 17, wherein the one or more programs further include instructions for:
in response to detecting the movement of the touch gesture, forgoing movement of the first indicator.

19. The non-transitory computer-readable storage medium of claim 17, wherein the one or more additional characters includes a first word and a second word different from the first word, and wherein visually distinguishing the one or more additional characters includes:
at a first time, visually distinguishing the first word; and
at a second time after the first time, visually distinguishing the second word, wherein a character of the one or more additional characters is not visually distinguished between the first time and the second time.

20. The non-transitory computer-readable storage medium of claim 17, wherein the one or more programs further include instructions for:
detecting liftoff of the touch gesture; and
in response to detecting the liftoff, displaying a command display area adjacent to visually distinguished content, wherein the command display area includes an affordance that, when selected, performs a first operation on the visually distinguished content.

21. The non-transitory computer-readable storage medium of claim 17, wherein:
in accordance with a determination that the plurality of sets of characters are editable, the predetermined time is a first value; and
in accordance with a determination that the plurality of sets of characters are not editable, the predetermined time is a second value less than the first value.

22. The non-transitory computer-readable storage medium of claim 17, wherein the one or more programs further include instructions for:
while displaying the first indicator and the second indicator:
detecting a second touch gesture at the second indicator;
after detecting the second touch gesture at the second indicator, detecting movement of the second touch gesture; and
in response to detecting the movement of the second touch gesture, changing a number of characters in the plurality of sets of characters that are visually distinguished.

23. The non-transitory computer-readable storage medium of claim 17, wherein the one or more programs further include instructions for:
while displaying one or more visually distinguished characters in the content, receiving a command to perform a second operation; and
in response to receiving the command:
performing the second operation on the one or more visually distinguished characters; and
forgoing performance of the second operation on one or more characters that are not visually distinguished in the content.

24. The non-transitory computer-readable storage medium of claim 17, wherein the initial portion of the touch gesture is a tap-and-hold gesture or a double-tap gesture.

* * * * *